United States Patent
Gunawardena et al.

(10) Patent No.: US 10,061,756 B2
(45) Date of Patent: Aug. 28, 2018

(54) MEDIA ANNOTATION VISUALIZATION TOOLS AND TECHNIQUES, AND AN AGGREGATE-BEHAVIOR VISUALIZATION SYSTEM UTILIZING SUCH TOOLS AND TECHNIQUES

(75) Inventors: Ananda Gunawardena, Pittsburgh, PA (US); David Kaufer, Pittsburgh, PA (US); Alexander R. W. Cheek, Doha (QA); Joanna Wolfe, Louisville, KY (US)

(73) Assignees: Carnegie Mellon University, Pittsburgh, PA (US); University of Louisville Research Foundation, Inc., Louisville, KY (US)

( * ) Notice: Subject to any disclaimer, the term of this patent is extended or adjusted under 35 U.S.C. 154(b) by 551 days.

(21) Appl. No.: 13/825,741

(22) PCT Filed: Sep. 23, 2011

(86) PCT No.: PCT/US2011/053071
§ 371 (c)(1),
(2), (4) Date: Mar. 22, 2013

(87) PCT Pub. No.: WO2012/040621
PCT Pub. Date: Mar. 29, 2012

(65) Prior Publication Data
US 2013/0185657 A1 Jul. 18, 2013

Related U.S. Application Data

(60) Provisional application No. 61/403,944, filed on Sep. 23, 2010.

(51) Int. Cl.
*G06F 17/24* (2006.01)
*H04L 29/06* (2006.01)
*G06F 17/30* (2006.01)

(52) U.S. Cl.
CPC ...... *G06F 17/241* (2013.01); *G06F 17/30038* (2013.01)

(58) Field of Classification Search
CPC ............ G06F 17/241; G06F 17/30424; G06F 17/30699; G06F 17/30716; G06F 11/0709;
(Continued)

(56) References Cited

U.S. PATENT DOCUMENTS

| 5,146,552 A | 9/1992 | Cassorla et al. |
| 6,256,663 B1 * | 7/2001 | Davis ..................... G06Q 30/02 370/260 |

(Continued)

OTHER PUBLICATIONS

Hirotsu et al. "Cmew/U—A Multimedia Web Annotation Sharing System", NTT Network Innovation Laboratories—Japan, IEEE, 1999, pp. 356-359.
(Continued)

*Primary Examiner* — Tadeese Hailu
(74) *Attorney, Agent, or Firm* — Downs Rachlin Martin PLLC

(57) ABSTRACT

Methods of facilitating the discovery of relationships between/among participants within systems for annotating visual media objects to create new associations, communities, and other relationships. These methods include processing annotations, metadata, and/or other information using one or more aggregate-behavior-visualization algorithms and displaying aggregate-behavior visualizations to users. These visualizations allow users to seek out and discover relationships and provide unique knowledge assets useful for a variety of purposes, including creating smart documents and fostering learning.

58 Claims, 33 Drawing Sheets

(58) Field of Classification Search
CPC ........ G06F 17/30038; G06F 17/30994; G06Q 50/01; H04L 65/403; H04L 65/4038; H04L 12/1818; H04L 12/1822; H04L 12/1827; H04L 67/306; H04N 7/15; H04N 21/4788; H04N 7/157
USPC ........ 715/753, 731, 733, 200, 205; 707/705, 707/706, E17.065
See application file for complete search history.

(56) References Cited

U.S. PATENT DOCUMENTS

| | | |
|---|---|---|
| 6,950,982 B1 | 9/2005 | Dourish |
| 6,973,616 B1 | 12/2005 | Cottrille et al. |
| 7,032,182 B2 | 4/2006 | Prabhu et al. |
| 7,318,193 B2 | 1/2008 | Kim et al. |
| 7,506,246 B2 | 3/2009 | Hollander et al. |
| 7,551,780 B2 | 6/2009 | Nudd et al. |
| 7,594,187 B2 | 9/2009 | Baird et al. |
| 7,596,549 B1* | 9/2009 | Issa ................... G06F 17/30038 |
| 7,636,883 B2 | 12/2009 | Albornoz et al. |
| 7,664,825 B2 | 2/2010 | Yeung et al. |
| 2001/0028364 A1* | 10/2001 | Fredell .................... G06Q 10/06 715/751 |
| 2002/0082901 A1* | 6/2002 | Dunning ........... G06F 17/30017 705/26.63 |
| 2003/0050927 A1* | 3/2003 | Hussam ............ G06F 17/30696 |
| 2003/0196206 A1* | 10/2003 | Shusman ............... G06Q 30/02 725/91 |
| 2004/0032486 A1* | 2/2004 | Shusman ............... G06Q 30/02 348/14.09 |
| 2005/0081159 A1* | 4/2005 | Gupta ..................... G06F 17/22 715/751 |
| 2005/0256867 A1* | 11/2005 | Walther ............ G06F 17/30696 |
| 2006/0085734 A1* | 4/2006 | Balnaves ....................... 715/512 |
| 2006/0143214 A1* | 6/2006 | Teicher ............. G06F 17/30867 |
| 2007/0055926 A1* | 3/2007 | Christiansen ......... G06F 17/241 715/210 |
| 2007/0081197 A1 | 4/2007 | Omoigui |
| 2008/0016164 A1* | 1/2008 | Chandra ........... G06F 17/30899 709/206 |
| 2008/0184122 A1* | 7/2008 | Grant ................ G06F 17/30056 715/723 |
| 2008/0235024 A1* | 9/2008 | Goldberg et al. ............ 704/260 |
| 2009/0043846 A1* | 2/2009 | Inoue ........................ G06F 3/14 709/204 |
| 2009/0052645 A1* | 2/2009 | Bansal ................ H04L 12/1827 379/202.01 |
| 2009/0055724 A1* | 2/2009 | Van ham ............... G06F 17/241 715/233 |
| 2009/0210779 A1 | 8/2009 | Badoiu |
| 2009/0300547 A1* | 12/2009 | Bates ................ G06F 17/30873 715/825 |
| 2010/0011282 A1* | 1/2010 | Dollard et al. ............... 715/233 |
| 2010/0023851 A1* | 1/2010 | Schormann ................... 715/232 |
| 2010/0112105 A1* | 5/2010 | Hoyt .................... A61K 36/906 424/756 |
| 2010/0153440 A1* | 6/2010 | Hubert .......................... 707/769 |
| 2010/0153832 A1* | 6/2010 | Markus ............. G06F 17/30424 715/205 |
| 2012/0166316 A1* | 6/2012 | Messina ............. G06Q 30/0641 705/27.1 |

OTHER PUBLICATIONS

Kuo et al., "A Synchronization Scheme for Multimedia Annotation", Multimedia Information Networking Laboratory, Tamkang University—Taiwan, IEEE, 1997, pp. 594-598.
International Search Report and Written Opinion dated Feb. 16, 2012, in connection with related PCT/US11/53071 filed Sep. 23, 2011.

* cited by examiner

CLASSROOM SALON

CLASSROOM SALON

FIG. 29

CLASSROOM SALON

GREAT! YOU HAVE SUCCESSFULLY CREATED A NEW DOCUMENT.

Document name: [Obama Speech Mention]
Document administrator: you
Video membership: [Obama salon, speeches]
www.classroom.tags YOU CAN ALWAYS COME BACK AND EDIT SETTINGS LATER,
INVITE MORE PEOPLE, OR SUBMIT IT TO NEW SALONS.

2900

MEDIA ANNOTATION VISUALIZATION TOOLS AND TECHNIQUES, AND AN AGGREGATE-BEHAVIOR VISUALIZATION SYSTEM UTILIZING SUCH TOOLS AND TECHNIQUES

RELATED APPLICATION DATA

This application claims the benefit of priority of U.S. Provisional Patent Application Ser. No. 61/403,944, filed on Sep. 23, 2010, and titled "System and Methods for Discovering Relationships, Communities and Knowledge Assets through Annotation Visualization on Visual Media," which is incorporated by reference herein in its entirety.

FIELD OF THE INVENTION

The present invention generally relates to the field of machine-based annotation. In particular, the present invention is directed to media annotation visualization tools and techniques, and an aggregate-behavior visualization system utilizing such tools and techniques.

COPYRIGHT AUTHORIZATION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Software exists for allowing users to annotate various machine-based visual media objects, such as electronic text documents and electronic images. For example, it is known that readers can post comments about articles and other material they read on web pages. It is also known that authors and readers of electronic documents, such as Microsoft Word documents and portable document format (pdf) documents, can highlight selected text and/or images and provide comments on the selected items using electronic tools such as comment balloons and electronic "sticky notes." In addition, software exists that allows multiple users to share highlighting, comments, and bookmarks with one another, for example, via various e-book-reader platforms, such as tablet computers and dedicated e-book reader devices.

SUMMARY OF THE DISCLOSURE

In one implementation, the present disclosure is directed to a method of facilitating discovery of a relationship in a multi-user annotation system. The method includes providing a user interface designed and configured to solicit annotations from multiple users for a visual media object; receiving the annotations from the multiple users via the user interface; storing the annotations and associated metadata; processing the annotations and associated metadata with an aggregate-behavior visualization algorithm; and displaying a first aggregated-behavior visualization as a function of the processing, wherein the first aggregate-behavior visualization is designed and configured to allow a viewer to discover the relationship.

In another implementation, the present disclosure is directed to a machine-readable medium containing machine-executable instructions for performing a method of facilitating discovery of a relationship in a multi-user annotation system. The machine-executable instructions include a first set of machine-executable instructions for providing a user interface designed and configured to solicit annotations from multiple users for a visual media object; a second set of machine-executable instructions for receiving the annotations from the multiple users via the user interface; a third set of machine-executable instructions for storing the annotations and associated metadata; a fourth set of machine-executable instructions for processing the annotations and associated metadata with an aggregate-behavior visualization algorithm; and a fifth set of machine-executable instructions for displaying a first aggregated-behavior visualization as a function of the processing, wherein the first aggregate-behavior visualization is designed and configured to allow a viewer to discover the relationship.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 29 is a screenshot illustrating an authentification-acknowledgement dialog box initiated by a successful authentification via the authentification pop-up window of FIG. 28;

DETAILED DESCRIPTION

Figure 1:
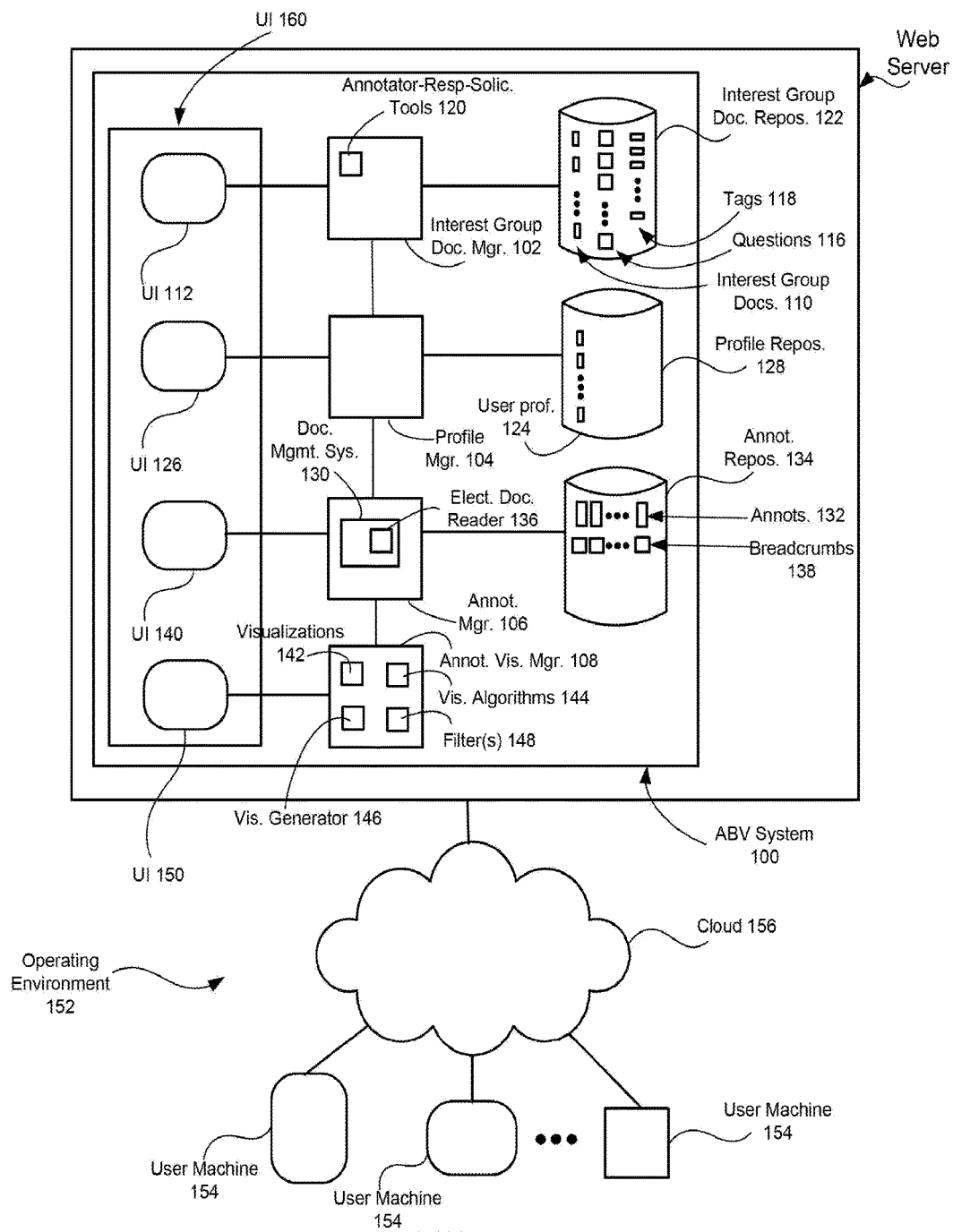
FIG. 1 is a high-level diagram of an aggregate-behavior-visualization (ABV) system in an exemplary operating environment.

One aspect of the present invention includes tools and techniques for automatedly creating visualizations that allow one or more users to visualize, assess, evaluate, track, etc. aggregate behavior of a group of annotators, or one or more subgroups thereof, that provide annotations to one or more visual media objects, such as one or more text documents, images, videos, multimedia presentations, etc., and any combination thereof. Some of these tools and techniques allow for discovery and creation of relationships, communities, and knowledge assets via identification of structures and content of the annotations as derived from various measures, including but not limited to, density of the annotations, the spatial locations of the annotations distributed across a visual media object, semantic content and literary tonal aspects of the annotations, categorical and scaled labels used to classify annotations, and demographic profile data associated with the annotators. Visualizations created from such measures using tools and techniques disclosed herein include, but are not limited to, graphs, tables, scatter plots, histograms, pie charts, timelines, and bubble diagrams, among others. Central knowledge assets derived using tools and techniques of the present disclosure include 1) the visualizations of what is important in the visual media object(s) as determined by the aggregate behavior of the annotators and 2) the social organization of the annotators themselves.

These tools and techniques can be useful in many differing applications. For example, in a classroom setting, an educator can have students annotate a particular text document, such as a book, a chapter or other portion thereof, an essay, an article, etc., and once all of the annotations have been made, the educator can view one or more visualizations created using tools and techniques disclosed herein to learn about the aggregate behavior of the annotators and, perhaps, also to use knowledge of the aggregate behavior to guide class discussions about the annotated document. As another example, tools and techniques disclosed herein can foster the creation and development of online communities that not only form from common interest in the visual media objects being annotated by community members, but can also spawn from such initial interest. As yet another example, annotations made by highly qualified expert readers can be added to the basic text or other visual media object to enhance its value. Thus, a particular application for tools and techniques disclosed herein is for an e-publisher to publish annotated versions of text or other visual media object created using such tools and techniques.

Another aspect of the present invention is an aggregate-behavior-visualization (ABV) system that not only includes the annotation visualization tools and techniques described above, but also provides a full environment for implementing various ones of those tools and techniques. These and other aspects of the present invention are described below in connection with several embodiments. Those skilled in the art, however, will readily appreciate that the disclosed embodiments are merely exemplary and that many other embodiments can be derived and instantiated using the broad teachings of this disclosure. Before proceeding to describing an exemplary embodiment, several terms used throughout this disclosure and in the appended claims are first defined immediately below.

An "annotation" is an object input by a human annotator, such as a written comment, spoken word(s), sketch, gestured comment, etc. As will be seen below, in one example an annotation comprises a written comment and one or more highlighted sections on a visual media object associated with such written comment. A given visual media object, which as mentioned above includes but is not limited to text, pictures, videos, and other visual media objects, can have multiple annotations made by multiple annotators. Annotations are described by attributes, which can include any one or more of the following: the spatial location of the annotation in the visual media object, the linguistic content of the verbal comment associated with it, user-profile information, discrete and scalar tags identifying classification of the annotation, among other attributes. Highlighting can be any form of marking that visually indicates to a viewer the highlighted section or region of corresponding media object. Examples of highlighting include, "transparent" color box-style highlighting, negative-image box-style highlighting, colored text highlighting, transparent-shape highlighting (e.g., a box, circle, bubble, etc. encircling a desired region of the media object), and underlining, among others.

A "global annotation" is an object comprising a written comment made in reference to the entire visual media object supported by highlighted sections of the visual media, and optionally related micro-comments associated with each highlight. Depending on the implementation, annotators can make global annotations either through structured prompts, such as questions related to the visual media, or on their own, and may be provided as anchored annotations to prompt users to start building an annotation community.

An "annotator" is a participant of an aggregate-behavior visualization system that provides one or more annotations and is described by static and social attributes. Static attributes include, but are not limited to, name, age, gender, and political affiliation, religion, as well as any and all known static attributes that identifies a participant. Social attributes, such as relationships with other users, are generated as a result of user annotation activities in the present invention. Annotators are a subset of all of the "users" of the system.

An "interest group" is a community of annotators with a common interest and a common task agenda formed by two or more users. An interest group may contain one or more visual media objects. In some embodiments, interest groups can be classified as private, protected, or public. A public interest group is open to any registered user of the system; a private interest group is available by invitation only. A protected interest group provides its users with limited activities such as the ability to observe but not participate, and is defined by a set of access rights. A collection of public interest groups form a global community of annotators. Task agendas for a public, protected, or private interest group include but are not limited to instructions to notice, interpret, or evaluate local content of a media object (e.g., local passages of text, local segments of a picture, local frames of streaming video) or to respond to global questions sizing up the whole media object, and to identify like-minded annotators. A "global interest group" is defined as a large community of annotators formed as a result of an amalgamation of related public interest groups.

An "interest-group document" is defined in plural as visual media associated with an interest group. Each interest-group document can be associated with tags, scales, and questions.

A "hot spot" is an object that is constructed from dynamic attributes of a community of annotators. Hot spots are regions of a visual media object that multiple annotators have chosen for annotation. Hot spot attributes for texts can be set by users of an aggregate-behavior visualization system, including but not limited to the minimum and the maximum number of words in an annotation that can make up a hot spot, the percentage of overlap requested between two or more annotations and the minimum number of users required to form a hot spot. In graphical objects, the minimum area for a hot spot is measured in pixel area rather than words. A hot spot is also described as a dynamic artifact of a user community.

A "knowledge asset" is defined with respect to an interest-group document as a summary of the important sections and comments generated as a result of annotation activities and responses to questions. Knowledge assets are generated by user activities, are uncovered by means of machine-based methods and are displayed in any one or more of multiple visualization formats. Latent semantic structures and user relationships are uncovered as a result of aggregated summaries of annotation activities.

A "tag" is a label or category with a set of static attributes associated with a specific interest-group document. Tags can be specified statically by users of the present invention before publication of the visual media or dynamically during active annotation sessions. Tags can be used to identify, for example, roles played by each annotator, associated comments, literary tone, and content similarity of the comments, among other things.

A "scale" is a range of values associated with a specific interest-group document. Scale attributes include two or more labels and intermediary numerical values defining a range of possibilities between/among two or more labels. Scales can be specified by users of an aggregate-behavior visualization system statically before publication of the visual media or dynamically during active annotation sessions.

A "question" is a prompt created by a user of the present invention seeking response to a specific query associated with the visual media.

Referring now to the drawings, FIG. 1 illustrates an exemplary ABV system 100 that incorporates various aspects of the present invention. As will be seen, this embodiment provides a full range of functionality, from initial interest group and user-profile set-up, through annotating, and generating and displaying visualizations of aggregate behavior based on annotations input by various annotators during the annotation process and/or on metadata relating to the annotators and annotations.

A technical foundation for an ABV system of the present disclosure, such as ABV system 100, is a graph abstraction that defines varying relationships among people, visual media objects, and interest group) objects. The mathematical definition of a graph is a collection of nodes and edges where edges connect graph nodes. Each graph edge weight can be defined as a Boolean value (true or false) or a real value in the range from 0 to 1. A graph is a well-known mathematical data structure for displaying complex relationships. It is known that various graph algorithms exist for graph traversal, shortest path determination, finding connected graphs and cycles, and many other graph path discovery, property, and invariant algorithms. Furthermore, the dynamic nature of an ABV system leads to continuous variations of edge weights resulting in new path discoveries and graph reconfigurations. An ABV system is generally based on three primary objects, defined by people, visual media objects, and interest groups. Each of the objects is defined by a set of attributes and set of methods that are acting on the objects. For example, initially people are identified by a profile attribute and visual media and interest groups are identified by metadata attributes. Each object attribute plays a major role in determining the "hot" spots of the document as well as setting or resetting graph edge weights. For further discussion purposes, this graph abstraction is defined as an aggregate-behavior graph (A-BG).

The following Table demonstrates a dynamic set of (expandable to include more) attributes and methods associated with each of the primary interest group objects that are nodes in A-BG.

TABLE

|  | attributes | methods |
|---|---|---|
| People | name, email, picture, password, bio, gender, political affiliation, etc | Join group<br>Annotate visual media<br>Respond<br>Visualize<br>Rank annotations, etc. |
| Visual media objects | name, author/owner, category, type, etc. | Receive annotations<br>Compute hot spots<br>Display annotations summaries<br>Identify inter-visual media, people and group relationships, etc. |
| Interest groups | name, interest, stats, status, etc. | Display visualization summaries<br>Identify relationships etc. |

Upon receiving user annotations, one or more aggregate-behavior algorithms compute and display "hot spots" based on, for example, comment density, tone, and semantic similarity of annotations. Association with a common "hot spot" among two users (inductively extended to many users) leads to a creation of a graph edge between the users. The weight of the edge is determined by (among other measures) "hot spot" density that can vary as user's add/edit/delete annotations to the visual media object. Aggregate-behavior algorithms also add, update and delete graph edges between visual media objects as well as graph edges between interest groups. Each of the graph edges are assigned a weight based on level of interactions, hot spot sharing, comment rankings, among many other data generated by the ABV system.

Each newly added user, visual media object, or interest group becomes a node in the graph with immediate edges created between visual media object and its "owner", interest group and its users etc. The annotations and hot spot calculations based on aggregate-behavior visualization algorithm lead to assignment of graph edge weights among nodes in the graph. The algorithm(s) then calculate(s) new relationships between nodes in the graph using known graph data structure algorithms. For example, the aggregate-behavior algorithm can identify a strongly connected latent sub-graph (consisting of people, visual media objects, and interest groups) that exists within the aggregate-behavior graph. The component of this strong sub-graph may consist of all or a subset of people, visual media, and interest groups and their relations displayed as graph edges and weights. The discovery of latent relationships among users, visual media, and interest groups lead to the generation of new visualizations and recommendations to users, visual media and interest groups. In A-BG, all nodes (people, visual media, and interest groups) are treated the "same". For example, it is possible that a strongly connected sub-graph of just people (or just visual media, or just interest groups) can exist within A-BG. This allows the ABV system to define meaningful clusterings, for example, of visual media objects to identify semantic equivalence of visual media objects discovered as a result of aggregate-behavior visualization algorithm. Similar discoveries of latent relationships are identified among people and interest groups.

Referring again to FIG. 1, in this embodiment ABV system 100 includes a interest-group document manager 102, a user-profile manager 104, an annotations manager 106, and an annotation-visualizations manager 108. Each of these exemplary components of ABV system 100 is broadly described immediately below and illustrated in a specific instantiation that follows the broad descriptions. However, before describing each of these features of ABV system 100, it is noted that the term "manager" and similar terms that might suggest modularization of software and/or discreteness of functionality are used herein and in the appended claims simply for convenience in describing related functionalities. Consequently, readers should not read any particular limitations into the arrangement and locations of machine-executable instructions, nor into the arrangement and locations of features and functionality controls within any provided user interfaces, simply as a result of the terminology used to describe this embodiment. Indeed, those skilled in the art will understand the wide variety of ways that the underlying features and functionality can be implemented in actual instantiations.

In this embodiment, interest-group document manager 102 allows each of one or more users to set up and manage one or more interest-group documents 110 via a user interface 112. Although not illustrated, user interface 112 can include one or more web pages, dialog boxes, etc., that allow each user to set up each interest-group document 110 and manage one or more interest groups that have already been set up. As those skilled in the art will readily appreciate, setting up a interest-group document 110 may include, among other things: 1) user-identification and/or loading of one or more visual media objects that each become a interest-group document; 2) selecting the type of document and any associated access rights (e.g., public, private, protected, etc.); 3) entering questions 116 about the interest-group document(s) that function to solicit comments by annotators; 4) setting up tags 118 and tag properties; 5) setting up annotator-response-soliciting tools 120, such as text fields, sliders, radio-button-style multiple-choice-selection lists, and other annotator-response-soliciting tools; and 6) manipulating aggregate-behavior visualization controls, for example, to turn off/on desired visualization tools that other users can use and/or set up any parameters that various visualization tools may have. Those skilled in the art will readily appreciate that these setup items are merely exemplary and that other setup items fall within the scope of the present invention. In this embodiment, interest-group document manager 102 also includes a interest-group document repository 122 that stores interest group information, such as the setup information just mentioned and any associated metadata, such as interest group-organizer information. As those skilled in the art will readily appreciate, the management of existing interest-group documents 110 may include the ability to modify and/or delete a previously created interest group.

Profile manager 104 allows users of ABV system 100 to set up, maintain, and store corresponding respective personal user profiles 124 containing various information about themselves. As will be described below, when a user becomes an annotator by providing one or more annotations, ABV system 100 uses information in the corresponding user profile 124 in various types of annotation visualizations and/or to create various types of visualizations. Examples of user-profile information that can be used include the user's name, age, gender, education, political affiliation, religious views, photograph, avatar, etc. To facilitate the profiling functionality, in one embodiment profile manager 104 includes a suitable user interface 126 that allows a user to input and/or maintain the profile information and make appropriate control selections, as well as a profile repository 128 that stores user profiles that have already been created.

In the present embodiment, annotations manager 106 includes a document management system 130 that displays any selected one(s) of interest-group documents 110 and allows annotators to author annotations 132 (including global annotations) directed to the displayed interest-group document(s) and/or one or more portions thereof. Document management system 130 also functions to label, index, and store annotations 132, along with any corresponding metadata, in an annotations repository 134.

In an Internet-based, web-browser-accessible example, document management system 130 includes an electronic document reader 136 that allows user to read and annotate interest-group documents 110 online or offline. Interest-group documents 110 in reader 136 can be formatted to be compatible with a standard web display format or can be configured to convert from any format supported by the web browser(s) utilized by the users. In such an example, annotation manager 106 may further include functionality for sending and receiving annotations 132 to and from a browser (not shown) to online annotation repository 134 or to a third party application (not shown). Any authentication system (not shown) used to access a particular interest-group document 110 could be extended to access and manage annotations 132 in repository 134 or in the third party application.

In this embodiment, document management system 130 also displays any questions and other annotator-response soliciting tools 120, and also allows users to respond to such tools, store those responses, and add tags to each displayed interest-group document 110. It is noted that responses to annotator-response soliciting tools 120 and tags (labels) provided by annotators are also considered annotations 132 for the purposes of this disclosure and the appended claims. As described below in detail, in some embodiments adding certain types of annotations involves highlighting one or more portions of a displayed interest-group document 110, such as highlighting text of a text-type interest-group document or highlighting a portion of a graphical interest-group document, and providing a verbal comment or attaching a suitable tag among other things. In some embodiments, such highlighting can be provided in one or more layers that overlay a static interest-group document 110. The concept of layering is well-known in the art such that those skilled in the art can implement highlighting and annotation features of the present disclosure using such techniques without further description of those techniques.

In some embodiments, annotating can also include the adding one or more hyperlinks to an annotation 132. In this context, a hyperlink can be, for example, a web hyperlink that links a reviewer of the corresponding annotation to a web page that contains information relevant to the comment in the annotation and/or to the highlighted portion of the corresponding interest-group document 110. As another example, the hyperlink can be to another location within the corresponding interest-group document 110, or even another interest-group document. For instance, document location links can be used to implement breadcrumbs 138 associated with an annotation 132. In this context, a "breadcrumb" is a location within the corresponding interest-group document 110 that a user considers relevant to a verbal comment or response to a solicitation for response, such as a question. For example, the location may be highlighted in the interest-group document 110 just like an annotation selection as described above, and this highlight linked to in the annotation. Each breadcrumb 138 may also be associated with an electronic sticky note that further clarifies that breadcrumb with the entry of additional comments. Annotation responses and corresponding breadcrumbs 138 can be associated using any one or more of multiple techniques, including but not limited to, highlighting, dragging and dropping, and tagging response and associated breadcrumb highlights. User-added data provided to annotations 132 can, for example, be in text, images, external documents, universal resource locators (URLs), or electronic ink types. Breadcrumbs 138 are stored in conjunction with the associated annotation(s) 132 in annotations repository 134.

Document management system 130 can also allow the tagging of each annotation 132 with metadata, such as author name, title, keywords, and access rights, and restrictions, some of which may be automatically included in the annotation.

As those skilled in the art will understand, document management system 130 can be provided with a user-friendly user interface 140 that allows users to readily view and navigate through the annotation process, including authoring and managing annotations 132, interacting with annotator-response-soliciting tools 120, and creating and manipulating tags 118, among other things. User interface 140 can also be configured to allow annotators to manage all their annotations generated using ABV system 100. For example, each annotator can have an authentication mechanism to access their annotations 132 stored in repository 134. In this case, each annotation 132 can be labeled as private, protected, or public to indicate, respectively, access permitted only by that user, access permitted by a group of users, or access permitted by any user of the corresponding interest-group document 110. In one example, each annotation 132 can be accessed in conjunction with the corresponding interest-group document 110 or independently of that document. User interface 140 may also be provided with tools for adding, modifying, or deleting annotations 132 and/or associated access rights.

In the embodiment shown in FIG. 1, annotation-visualizations manager 108 includes features and functionality for creating, initiating, manipulating, viewing, and storing visualizations 142 using various ones of annotations 132 and/or metadata associated with such annotations, such as profile information from the relevant user profile(s) 124. A number of exemplary visualizations are briefly described in this section and others are presented in more detail in the exemplary instantiation described below in connection with FIGS. 3 to 30. Annotation-visualizations manager 108 includes visualizations algorithms 144 and a visualizations generator 146. Visualizations algorithms 144 are designed and configured to analyze and summarize annotation data. Annotation data includes comments, answers to questions, selections, and other annotator responses from annotations 132, metadata associated with such annotations, and/or user-profile information from user profiles 124. Visualizations generator 146 is designed and configured to generate graphical visualizations 142 based on the annotation-data summaries generated using visualizations algorithms 144.

In one embodiment, visualizations algorithms 144 include heuristic-based adaptive algorithms designed to increase the effectiveness of the visualization generated. Appropriate heuristics are known to those skilled in the art and include, but are not limited to, tag heuristics, scale heuristics, question heuristics, extraneous text heuristics, unsupervised annotation heuristics, related annotation heuristics, highlighted history heuristics, annotated history heuristics, semantic order heuristics, absolute position heuristics, and relative position heuristics, among other. The weight of each heuristic is determined by several factors including, but not limited to, type of a tag, scale, question, etc., used, the number of submissions of annotations 132 in current sessions and the number of submissions of the annotations in the prior sessions. Each new annotation to a interest-group document 110 may cause all annotations summaries to be recalculated, thereby increasing the details and types of the annotation visualizations. Each of the adaptive changing strategies can be turned on and off by, for example, setting or unsetting a flag.

Visualizations algorithms 144 of the present embodiment also include algorithms for identifying hot spots based on user activities. Hot spots can be computed based on any of a number of factors, such as annotation overlap, minimum number of words that make up a hotspot, and minimum number of users that form a hot spot. Visualizations generator 146 can visually indicate a hot spot in any of a variety of ways, such as by using color-coded highlighting or other marking(s). In addition, visualizations generator 146 can generate a visual list of the user(s) that corresponds to any hot spot location, and such list can be identified and displayed in any of a wide variety of graphical formats including list views. Examples of visual lists are presented below in connection with the exemplary instantiation of FIGS. 3 to 30.

Visualizations algorithms 144 may also include algorithms for performing tonal analysis, semantic analysis, annotation-density analysis, clustering analysis, and statistical analysis on annotations, among others. Regarding tonal analysis for example, each written comment may be color coded to indicate the literary tone of that comment. As those skilled in the art will understand, a tonal dictionary can be used to assist the tonal analysis. Visualizations generator 146 can then be configured to allow users to generate various visualizations based on comment tone, such as lists, pie charts, bar graphs, clusters, etc. Multiple graphical representations may reveal users' literary tones and confidence levels associated with each written comment. In addition, visualizations generator 146 can also be configured to sort/filter written comments by any one or more of multiple sorting/filtering criteria, including but not limited to, a popularity or likeness index, user name(s), and similarity based on breadcrumbs 138 chosen, among others.

Regarding density, visualizations algorithms 144 can include an algorithm for visually depicting annotation density. For example, such an algorithm may be configured to recognize physically overlapping and/or coincident annotations 132 (e.g., when viewed together as highlighted regions of the corresponding interest-group document 110) across multiple annotators and then assign a density indicator to the various occurrences of such overlap and/or coincidence. In one example, differing density can be indicated by highlighting of differing color and/or differing color intensity. Visualizations generator 146 can be designed and configured to visualize distributions of tags 118 with respect to literary tone throughout the document. Each hot spot of a interest-group document 110 can be associated with a tag distribution, with the distribution presented in any of multiple graphical formats, including pie charts and bar graphs.

Clustering involves presenting visualizations that group annotators into clusters by their verbal comments and/or other responses input as annotations. Clustering can be performed on many types of responses, including responses to yes/no questions and responses to multiple choice questions, as well as one or more characteristics of responses. For example, clustering can be based on the literary tones of written-comment-type annotations 132. In addition, visualizations algorithms 144 can include one or more algorithms that perform a semantic analysis of written comments, and clustering can be based on such analysis(es). Semantic analysis algorithms that can be used include, but are not limited to, word and n-gram matching algorithms. In addition, clustering tools can allow users to apply a threshold in clustering visualizations to allow for further investigation of semantic similarities.

Using visualizations algorithms 144 and visualizations generator 146, ABV system 100 can compute social attributes of each interest group, dynamically based on similarities and differences across the aggregate annotation behaviors of the document 114 annotators. Measures for similarity and difference include the location of annotations in the text, the length of the written comments, the semantic content of the verbal commentaries, and a wide variety of other conceivable measures on which annotations may be similar or different.

Annotations-visualization manager 108 can further be designed and configured to display annotation activities of multiple users ranked by user name, profile information, comment relevance, rate of participation, tone and all other categorizations available to system 100. In this connection, visualizations generator 146 can include one or more filters 148 that users can apply to specific user annotations 132 to aid in their further investigation and analysis. Using such filter(s) 148, any user(s) is/are able to compare annotations made by two or more annotators as a group. A user can select the group based on, for example, tone, semantics, tags, scales, or questions. In addition, visualizations algorithms 144 can use input from filter(s) 148 to identify hot spots only for the selected group. ABV system 100 then uses the hot spot and annotation data to generate knowledge assets that are the summaries of the user interactions.

As those skilled in the art will readily appreciate, depending on the configuration of ABV system 100 and the environment it is designed to operate in, ABV system 100 may also include user interfaces 150 for communicating system requirements and process status for interest group activities, and a set of application messages used to communicate between the ABV system and any other software application(s) with which communication is required.

FIG. 1 shows ABV system 100 deployed into an exemplary operating environment 152. It is noted here at the outset that environment 152 is used simply for the purposes of illustration. Those skilled in the art will readily appreciate that ABV system 100 and its various functionality, such as the functionality present in method 200 of FIG. 2, as well as other methods implementing various features of the present disclosure, can be implemented in environments other than environment 152. Because such alternative environments are known, it is not necessary to describe or even list other types of environments. That said, where appropriate, some alternatives of various parts and features of environment 152 are presented to give some sense of scope and flexibility of the present invention.

With continuing reference to FIG. 1, in this example ABV system 100 is in operative communication with one or more user machines 154. In this context, a "user machine" is any machine, such as a laptop computer, desktop computer, workstation, tablet computer, Internet appliance, smartphone, personal multimedia device (e.g., an IPAD® device available from Apple, Inc., Cupertino, Calif.), etc. that allows a user (not shown) to interact with system 100, for example, as an annotator, a moderator, as a passive viewer, and suitable combinations thereof. In the present example, each user machine 154 is shown as being in operative communication with ABV system 100 via cloud 156, which represents any one or more communications systems suitable for the particular instantiation of environment 152. For example, if a particular user machine 154 is a desktop computer and the core of ABV system 100 is implemented in a web server 158, cloud 156 can represent, for example, the Internet and a local-area network (LAN) that the user machine is connected to. As another example, if ABV system 100 and each user machine 154 are part of a site-specific enterprise system, cloud 156 can represent only a LAN. As a further example, if a particular user machine 154 is a smartphone, cloud 156 can represent the Internet, a cellular communications network, and any other communications system(s) needed to complete the communications path between that user machine and system 100. Though not particularly illustrated, ABV system 100 can be integrated into any of user machines 154. Clearly, the possible environments for ABV system 100 or a similar system incorporating various features of the present disclosure are myriad.

With the possible variations of environment 152 being so numerous, those skilled in the art will readily understand that the manners in which the interfaces 112, 126, 140, and 150, which can be considered parts of an overall user interface 160, for ABV system 100 can be implemented are also diverse. For example, if ABV system 100 is Web-based, user interface 160 presented at each user machine 154 can be Web-browser based. Alternatively, each user machine 154 can execute a software application dedicated to providing a version of user interface 160 that is customized to system 100. However, if ABV system 100 and user machines 154 are parts of an on-site enterprise system, user interface 160 on each user machine can be a dedicated interface of the system. The same can be true in the case wherein ABV system 100 is integrated into a user machine 154.

Figure 2:
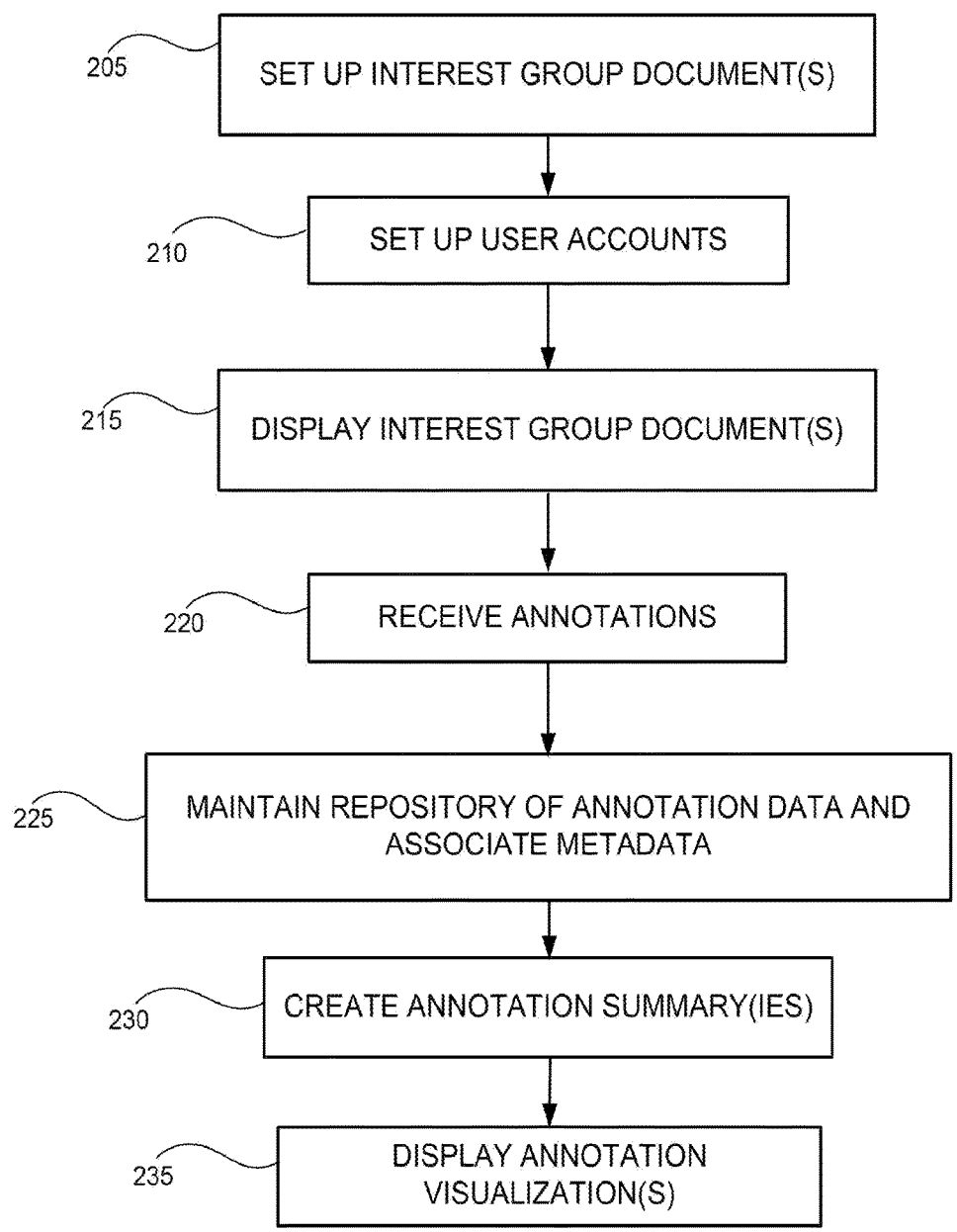
FIG. 2 is a flow diagram illustrating a method of creating a visualization of an annotation summary based on annotations provided by multiple users and directed to a visual media object within an interest group of the system of FIG. 1.

With the basics of exemplary ABV system 100 and environment 152 having been described, attention is now turned to illustrating several methods that can be performed by the system. Referring now to FIG. 2, and also to FIG. 1, FIG. 2 illustrates a method 200 that can be performed by system 100 of FIG. 1 in connection with generating a visualization summarizing annotation data. At step 205, ABV system 100 allows one or more moderators, to set up a interest-group document, such as any one of interest-group documents 110, for a particular visual media object of interest to the moderator(s). Differing types of visual media objects for interest-group documents 110 are discussed above, and a specific example of user interface 160 that allows the moderator to set up a interest-group document 110 is described below in connection with FIGS. 20 to 30 of the exemplary instantiation. The moderator can set up the interest-group document 110 using any one of user machines 154, for example, using moderator account controls provided by ABV system 100 using standard account-control techniques known in the art.

At step 210, ABV system 100 allows virtually any number of users to set up corresponding respective user accounts that allow the users to participate as annotators and have their profile information accounted for in any annotation visualization that system 100 may generate. ABV system 100 collects and stores user-profile information, for example, in a standard manner. Examples of user-profile information that ABV system 100 collects are not only presented above, but also appear below in connection with FIG. 7 of the exemplary instantiation.

At step 215, ABV system 100 displays, via corresponding respective ones of user machines 154, interest-group document 110 of step 205 to each user that accesses it. As mentioned above, user machines 154 can be any of a wide variety of devices, and the type and format of the user interface used to display interest-group document 110 can similarly be varied. However, those skilled in the art will readily be able to implement this step in a manner suitable for the particulars of ABV system 100 and environment 152. A specific example of how a text-based interest-group document can be displayed appears in FIGS. 3 to 30 of the exemplary instantiation described below.

At step 220, ABV system 100 receives annotations 132 from a plurality of the users that decide to participate by being annotators. Examples of annotations 132 that system 100 can receive, as well as various prompts for annotations are described above, and more detailed examples are presented below in the context of the exemplary instantiation of ABV system 100. Correspondingly, at step 225, ABV system 100 maintains a repository 134 of annotation data and corresponding metadata (e.g., user-profile information) that reflects all of the annotations made by the annotators.

At step 230, ABV system 100 creates one or more annotation summaries of the annotation data using one or more visualizations algorithms 144. Examples of annotation summaries that ABV system 100 can generate include a literary tone summary, a semantic-analysis summary, a hot-spot analysis summary, etc. Examples of the types of summaries that ABV system 100 can generate are mentioned above, as well as described below relative to the exemplary instantiation of FIGS. 3 to 30.

At step 235, ABV system 100 displays one or more visualizations of the annotation summaries, for example, in response to any one of the users requesting or otherwise initiating such display. Examples of visualizations that ABV system 100 can display are mentioned above, and further examples are shown and described below in connection with the exemplary instantiation of ABV system 100. As those skilled in the art will readily appreciate, the particular examples of graphical views shown and described herein are illustrative and do not necessarily reflect all possible visualizations.

Exemplary Instantiation

FIGS. 3 to 30 are screenshots of various user-interface pages or screens of an ABV system made in accordance with various aspects of the present disclosure, such as ABV system 100 of FIG. 1. Each of these screenshots is described below in a manner that highlights certain features and aspects that should assist the reader in understanding functionalities of an ABV system made in accordance with the present invention. In addition to features and aspects specifically described, those skilled in the art will readily be able to discern other features and aspects of the exemplary user interface and underlying ABV system simply from viewing and studying FIGS. 3 to 30. Therefore, the accompanying description should not be taken as necessarily covering all of the functionality of the user interface and the underlying ABV system, and the figures should be considered for all they disclose to a person of ordinary skill in the art. In the instantiation shown in FIGS. 3 to 30, the user interface is implemented in a web-browser environment. Consequently, some of the screenshots are referred to below as "pages," with browser-based web pages being implied, along with the corresponding software and supporting hardware. Of course, such screenshots could alternatively represent other forms of display format, such as screens, windows, etc., as may be appropriate for other types of implementations.

Figure 3:
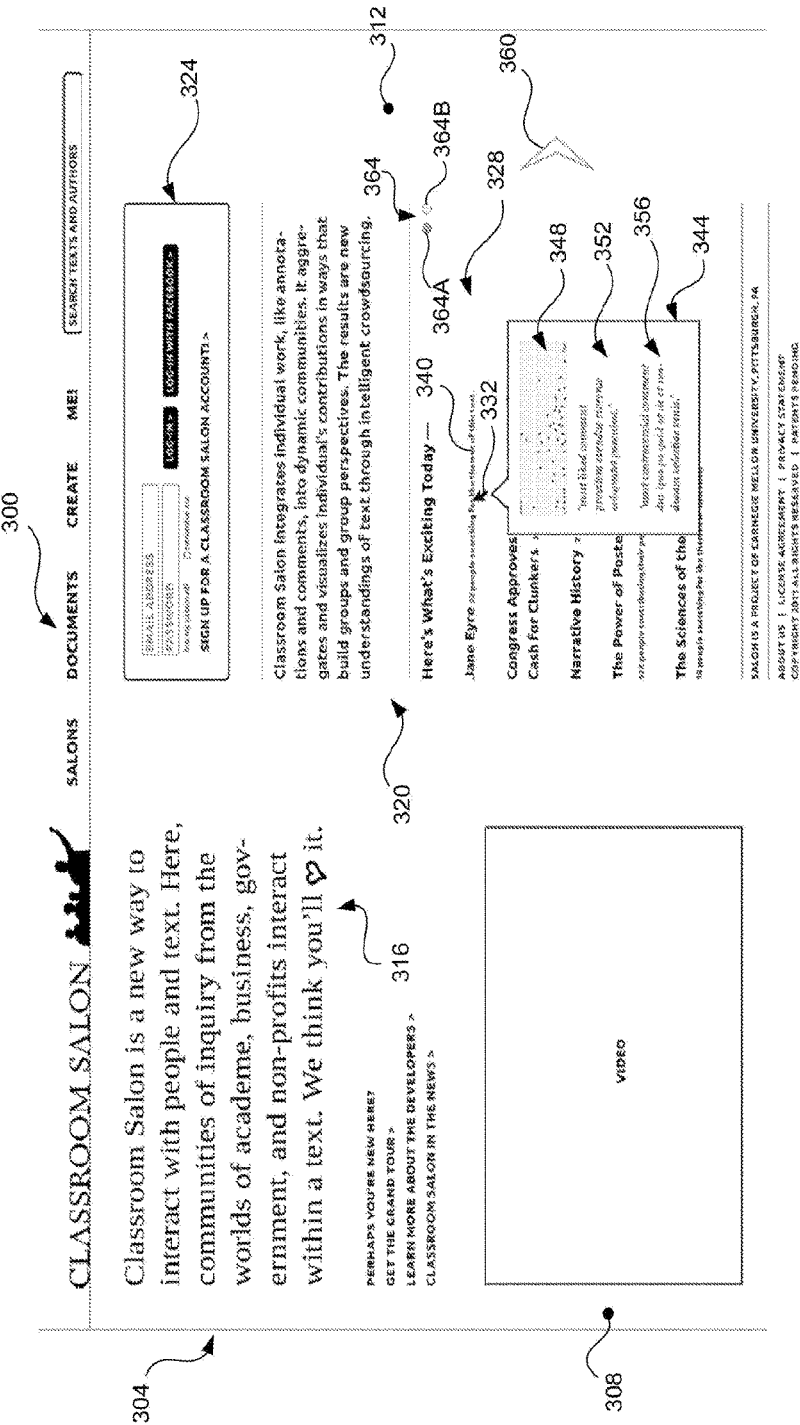
FIG. 3 is a screenshot of a main landing page of an exemplary instantiation of a user interface of an ABV system made in accordance with the present disclosure.

FIG. 3 is a screenshot 300 of a main landing page 304 of the user interface, which for the sake of context corresponds to user interface 160 of FIG. 1. In this particular instantiation, landing page 304 is split into two halves, a left-hand half 308 and a right-hand half 312, like many of the pages of this user interface. As will be particularly seen below, the splitting of the pages provides a convenient way for a user, such as a moderator, annotator, or passive viewer, to conveniently view multiple pieces of related information simultaneously. In this example, both left-hand and right-hand halves 308 and 312 contain general information about the ABV system, for example, at general descriptions 316 and 320, as well as provides a dialog box 324 that allows a user to set up a user-account or log into a previously established account. Right-hand half 312 also includes a news region 328 that displays facts about usage of the ABV system. As an example, one of the interest-group documents in the ABV system, here a interest-group document titled "Jane Eyre," is reported as having "22 people searching for the themes of this text." In this instantiation, news region 328 is augmented with a "mouse-over" feature that, when a user hovers the cursor 332 over a certain item (here the phrase 340 "22 people searching for the themes of this text"), a pop-up window 344 appears with further information about the interest-group document. In this example, pop-up window 344 includes a graph 348 of activity based on the self-identified political position of each user, as well as the most liked comment 352 and the most controversial comment 356. The bases for generating graph 348 and selecting comments 352 and 356 will be described below. Those skilled in the art will readily recognize that the display of pop-up window 344 can be prompted in ways other than mouse-over, such as via a user touching a touch screen device, among others.

Main landing page 304, like other pages of this user interface, includes a lateral frame control 360 that allows a user to move to another frame of information. In this example, the entire right-hand half 312 of page 304 is a frame, and the act of selecting control 360 would cause the currently displayed frame to be replaced with another frame (not shown). In this instantiation, there are two possible frames that can be displayed on right-hand half 312 as indicated by frame indicators 364. The number of frame indicators 364, here two indicators 364A and 364B, indicates the number of frames available for viewing, and the shaded indicator, here indicator 364A, indicates which frame is currently being displayed. As those skilled in the art will understand, there are other ways of switching the frame being viewed, such as by performing a lateral finger swipe, among others.

Figure 4:
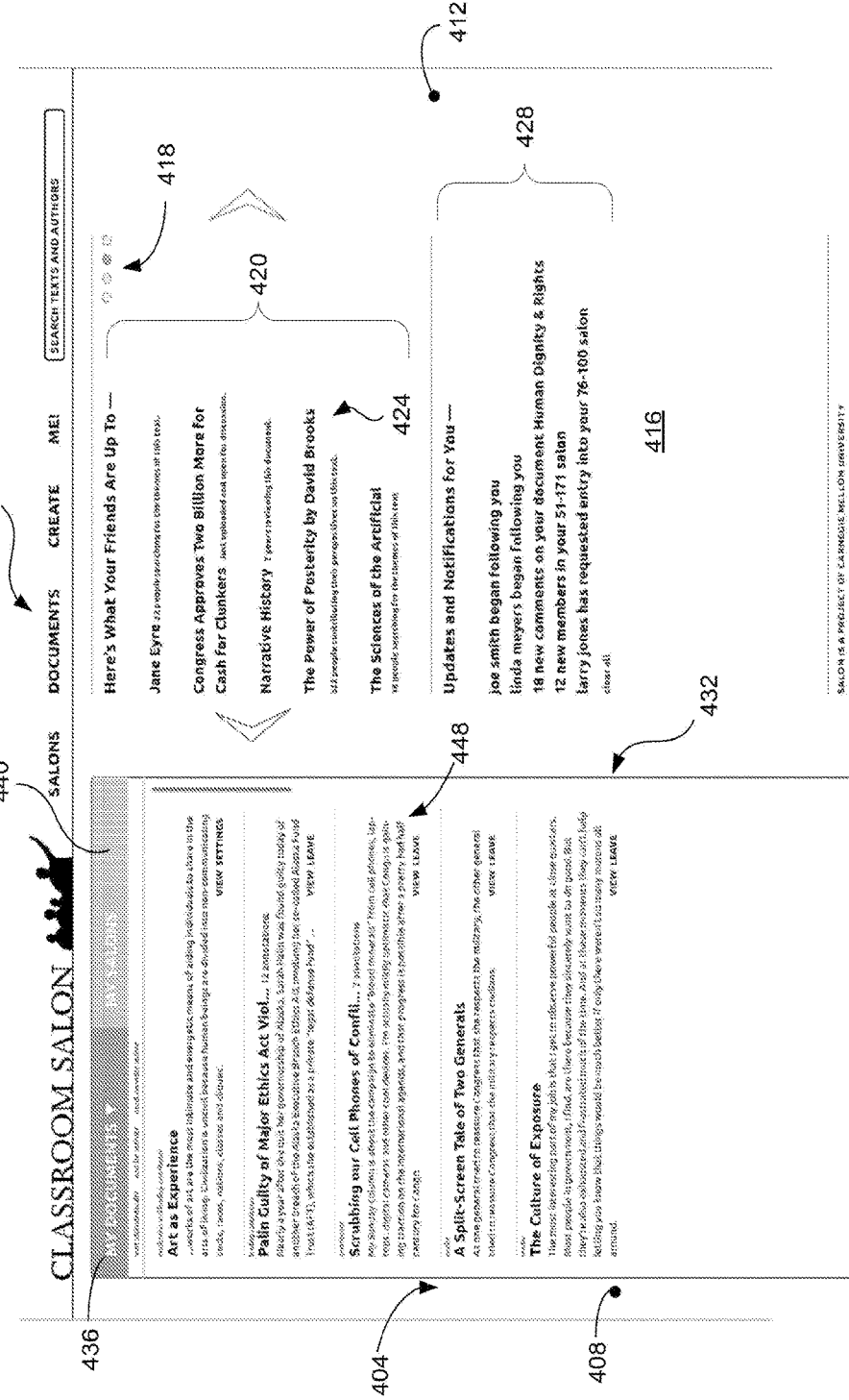
FIG. 4 is a screenshot of a user-account page of the user interface of FIG. 3, illustrating a "MY DOCUMENTS" list feature of the page.

FIG. 4 is a screenshot 400 of a user-account page 404 of the user interface of the exemplary ABV system. Like main landing page 304 of FIG. 3, user-account landing page is divided into a left-hand half 408 and a right-hand half 412. Here, right-hand half 412 is displaying a frame 416 out of four available frames, as indicated by the four indicators 418. Frame 416 in this example provides update information in a web-based social-media-type fashion. In this example, frame 416 has a first region 420 labeled "Here's What Your Friends Are Up To" that displays a list 424 of visual media objects that other users that the user corresponding to the present user-account landing page 404 has designated as friends. (A friend designation process is described below.) Frame 416 also has a second region 428 labeled "Updates and Notifications For You," which displays current notifications for the user corresponding to the illustrated user-account landing page. One of the other three frames is described below in connection with FIG. 7.

Left-hand half 408 of user-account page 404 contains a list window 432 having a "MY DOCUMENTS" selector 436, a "MY SALON" selector 440, and a list region 444.

List region 444 displays a list 448 of the current user's documents, i.e., visual media objects, when the user has selected "MY DOCUMENTS" selector 436. As seen in screenshot 500 of FIG. 5, when the user has selected "MY SALONS" selector 440, list region 444 displays a list 504 of the current user's interest groups. As seen from comparing FIGS. 4 and 5 with one another, right-hand half 412 of page 404 can remain the same regardless of whether the user has selected "MY DOCUMENTS" selector 436 or "MY SALONS" selector 440.

Figure 5:
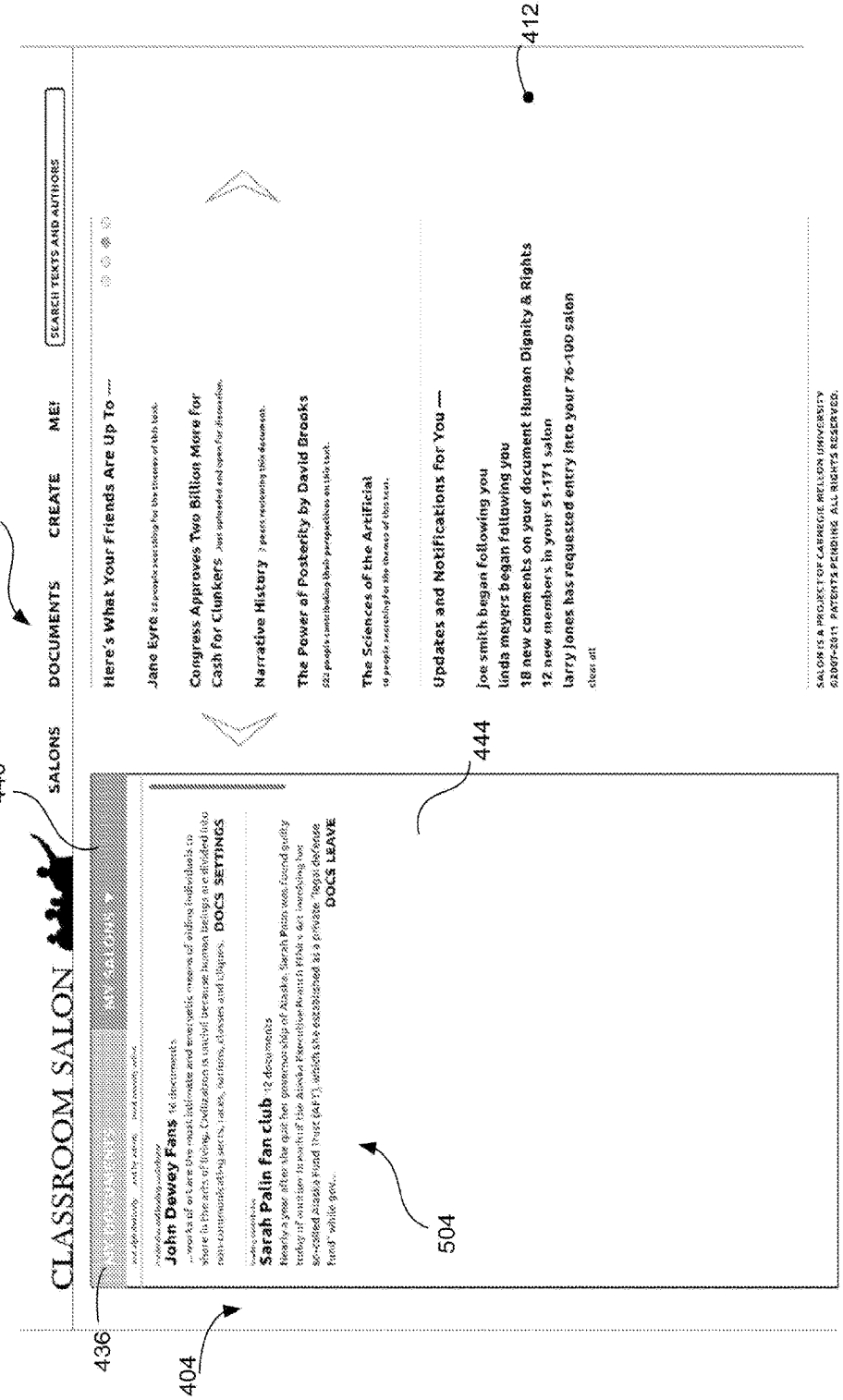
FIG. 5 is a screenshot of the user-account page of FIG. 4, illustrating a "MY SALONS" list feature of the page.
Figure 6:
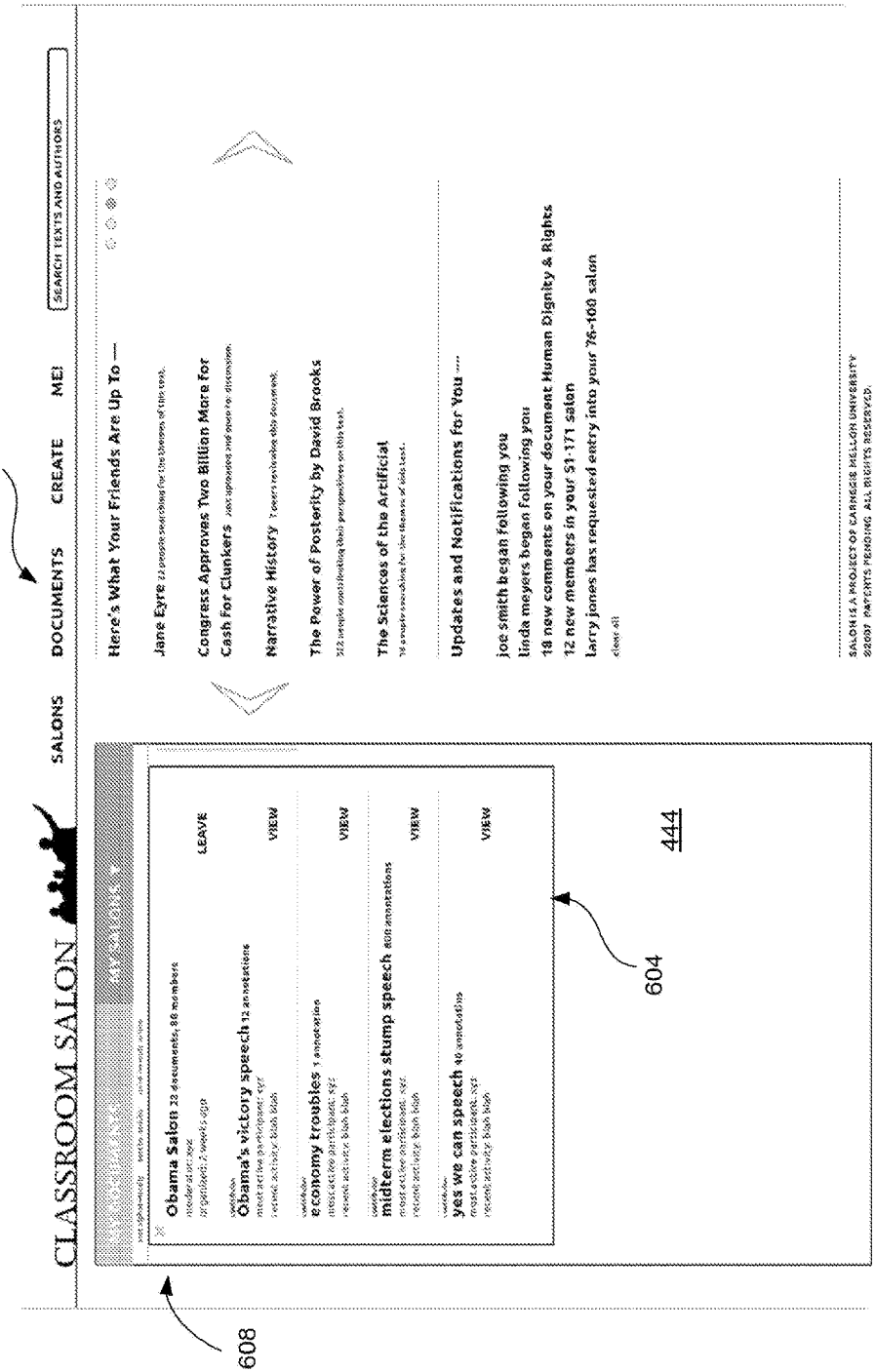
FIG. 6 is a screenshot of the user-account page of FIG. 5, illustrating a pop-up window displayed upon selection of one of the interest groups listed in the "MY SALONS" list.

FIG. 6 is a screenshot 600 illustrating a pop-up window 604 that ABV system 100 displays when a user selects one of the interest groups displayed in list region 444 (see FIG. 5). In one example, the ABV system displays pop-up window 604 in response to a user clicking on the name of one of the interest groups in list region 444. In this instantiation, pop-up window 604 contains information about the selected interest group and about visual data objects in that interest group, including the names of the data objects, the number of annotations made for each data object, the most active participant for each data object, and an indicator of recent activity for each data object Like many pop-up windows, a user can close pop-up window by selecting a close control 608.

Figure 7:
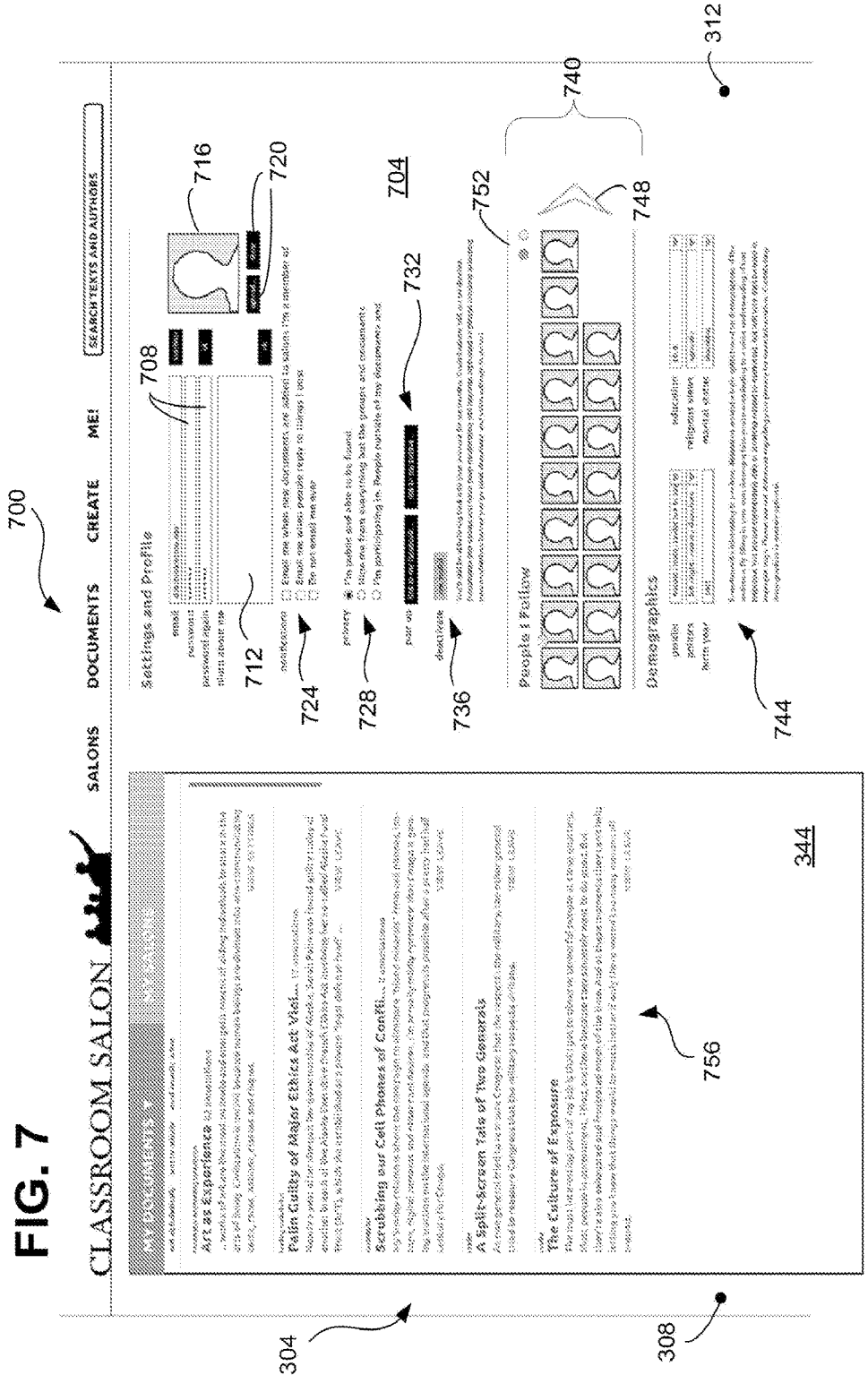
FIG. 7 is a screenshot of the user-account page of FIG. 3, illustrating a user-profile and settings interface.

FIG. 7 is a screenshot 700 illustrating user-account page 304 showing right-hand half 312 containing a "Settings and Profile" frame 704 that contains various controls, selectors, and fields that allow the owner of the account to select desired account settings and input the desired information about him- or herself. In this instantiation, frame 704 allows the account owner to, among other things, set a password at fields 708, enter a personal blurb at field 712, attach/detach an image 716 using controls 720, set up email notification using checkbox controls 724, select a privacy setting using radio buttons 728, pair up with other social websites using controls 732, deactivate the account using selector 736, manage the other users that the account owner follows (shown) and that follow the owner (not shown) in region 740, and input demographic information, such as gender, political persuasion, birth year, level of education, religious views, and marital status using selectors/fields 744. Various pieces of demographic information input by the various users of the ABV system are used by the system to provide certain annotation visualizations. It is noted that the demographic information just noted is merely illustrative; in other ABV systems other demographic information may be desired. Regarding region 740, as noted FIG. 7 illustrates this region as showing the people that the account owner follows. By selecting frame-change selector 748, the owner can change region 740 to show the people that follow the owner. As before, the availability of multiple frames for region 740 is indicated by frame indicators 752. In screenshot 700, left-hand half 308 of page 304 contains a list 756 of visual media objects in list region 344. In the present instantiation, the current user can select one of the images of the followees in region 740, and in response, the ABV system will show the current user information about that followee, such as the interest group(s) to which that followee belongs (as long as they are not private) and recent activity of that followee. If desired, the current user can use that additional information to decide whether to join any of the other interest group(s) the followee is in and/or follow other users that the current user can discover using the followee's information presented by clicking on the image in region 740. In this manner ABV system fosters community and relationship building among its users.

Figure 8A:
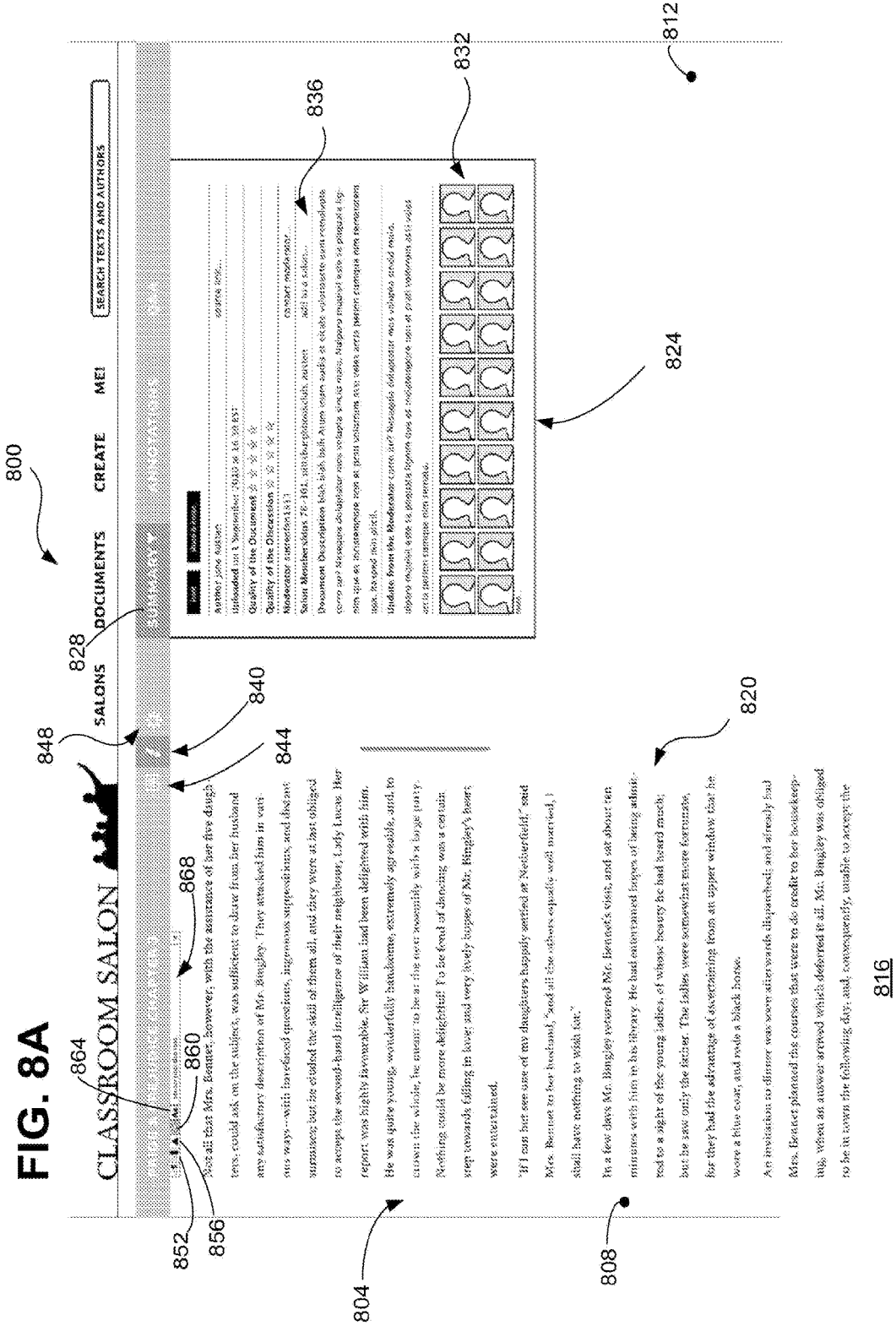
FIG. 8A is a screenshot of a document landing page of the user interface of FIG. 3, illustrating a visual media object and an interest group "SUMMARY" frame.

FIG. 8A is a screenshot 800 of a document landing page 804 that has a left-hand half 808 and a right-hand half 812 similar to page 304 described above. Screenshot 800 shows left-hand half 808 as containing a view 816 of the interest-group document 820; here the view shows a portion of chapter 3 of Jane Eyre's Pride & Prejudice. Right-hand half 812 is displaying a summary frame 824 containing a summary of interest-group document 820 and information relating to the interest-group document and its interest group(s). The ABV system displays summary frame 824 in response to a user selecting "SUMMARY" control 828. Examples of the information displayed include, the author of interest-group document 820, the date the document text was uploaded, an identification of the moderator, a description of the document, an update from the moderator, and a list of annotators, here appearing as a set 832 of icons. In this instantiation, the ABV system allows the user to click on any one of the icons in set 832 to navigate to the corresponding annotator's user-profile. In addition to displaying summary information, summary frame 824 allows the user to add interest-group document 820 to another interest group via control 836.

Also included on document landing page 804 are a number of controls for user. These controls include an edit mode selector 840, a view mode selector 844, and a document settings selector 848. Edit mode allows the user to make highlights in interest-group document 820 and add corresponding annotations. View mode allows the user to view annotation visualizations, such as hotspot visualizations, annotation graphs, annotation charts, and annotation summaries, among others. Document settings selector 848 allows the moderator to access moderator settings, which are illustrated in screenshot 900 of FIG. 9.

Figure 9:
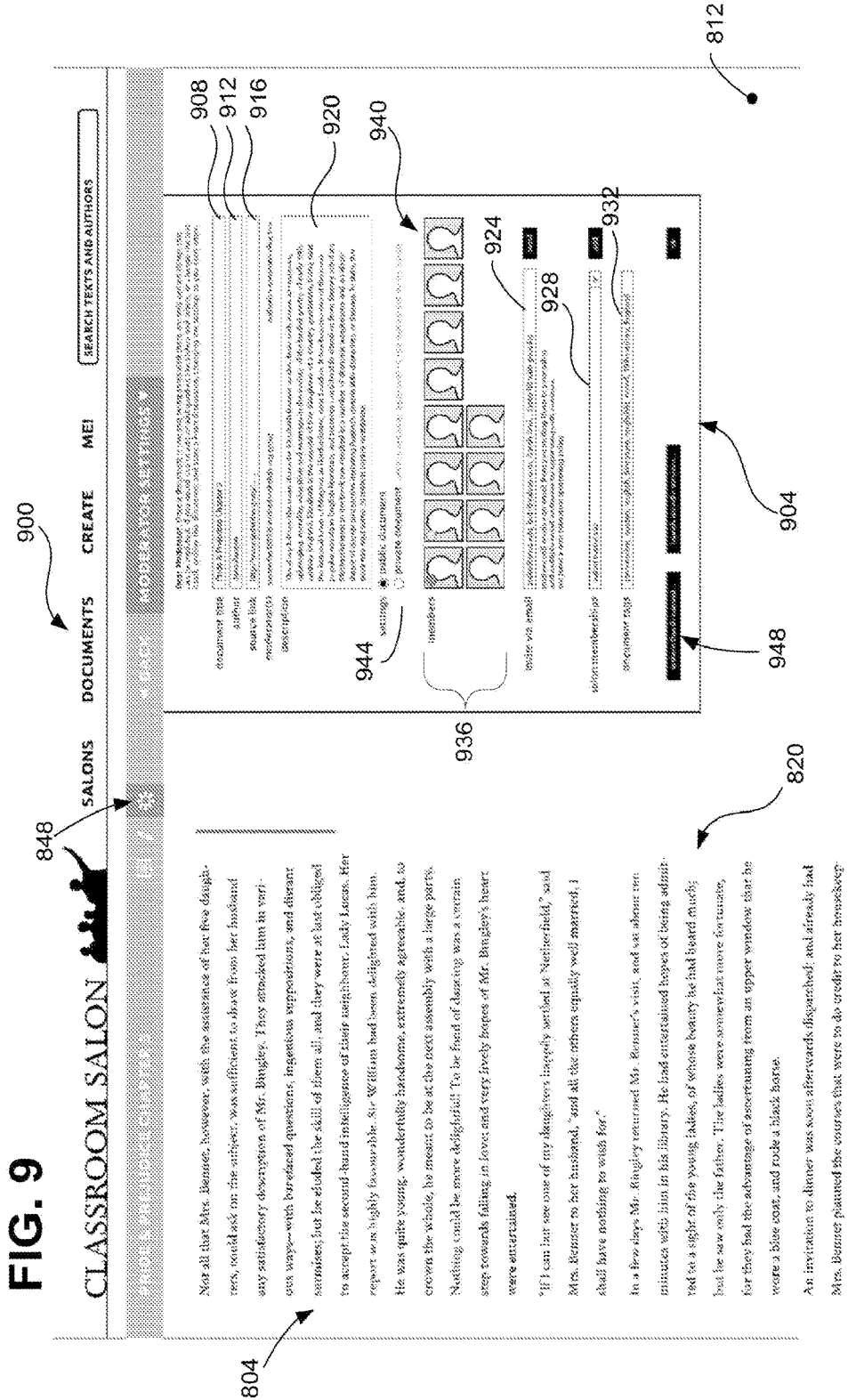
FIG. 9 is a screenshot of the document landing page of FIG. 8A, illustrating a "MODERATOR SETTINGS" frame that allows the moderator to set up features and functionality of the interest group.

As seen on right-hand half 812 of document landing page 804 in screenshot 900 of FIG. 9, when a user that is the moderator of the current interest-group document 820 selects documents setting selector 848, the ABV system provides a moderator settings frame 904 that displays information about the current document and allows the moderator to provide information about the document and perform a number of functions relating to this document. In this example, moderator settings frame 904 includes: a document title field 908 that allows the moderator(s) to input/modify a title for interest-group document 820; an author name field 912 that allows the moderator(s) to input/modify the name of the author of the document; a source link field 916 that allows the moderator(s) to input/change the link, for example, uniform resource locator, to the document; a document description field 920 that allows the moderator(s) to input/modify a description of the document; an email invitation field 924 that allows the moderator(s) to invite one or more people to join the current document via email; a interest group membership field/drop-down 928 that allows the moderator to associate the current document with additional interest groups; and a document tags field 932 that allows the moderator(s) to input tags to facilitate searching by other users.

Moderator settings frame 904 also includes a members region 936, which displays a set 940 of icons representing members of current interest-group document 820. The moderator(s) can use these icons to remove members and view their profiles, among other things. Moderator settings frame 904 further includes a control, here radio buttons 944, for allowing the moderator(s) to select whether interest-group document 820 is public or private. A public document is one that is open to any user of the ABV system, whereas a private document is one where approval is needed to join the document. An example of a private document is a document that a professor has set up for use only in his/her class. Because of the social aspects of the current instantiation, the default is that interest-group document 820 is public unless the moderators select the private radio button 944. Another feature available to the moderator(s) is an archive control 948 that allows current document 820 to be reused as a new document either with or without the corresponding annotations and other matters that have been associated with the current document up to the point of archiving. Although not shown, selection of archive control 948 provides the moderator(s) with the choice of whether to archive with or without all of the associated data.

Referring again to FIG. 8A, other controls include a bookmark control 852, an alert control 856, a dimmer control 860, a text-size control 864, and a drop-down menu 868 that allows the user to select any of a variety of options. In the present instantiation: bookmark control 852 allows the user to save a spot in the interest-group document 820 to return to later (only one bookmark is allowed in this instantiation for simplicity); dimmer control 860 allows the user to view just the text in a separate pop-up window (not shown) that overlays document landing page, which is dimmed to enhance viewing of the document; and text-size control 864 allows the user to adjust the size of the text in document 820 to suit personal preferences and/or visual acuity. In the example shown, the selection made in drop-down menu 868 is "show just the text;" consequently, view 816 displays only the text of interest-group document 820 without any highlighting or other user-added material. As another example (not shown), another selection in drop-down menu 868 is "show my contributions," which would display highlights that this particular user has entered. As yet another example (not shown), another selection in drop-down menu 868 is "view annotation hot spots with polarity," which would provide a visual representation of any hot spots in interest-group document 820. It is noted that in the embodiment shown this selection is not available in edit mode, only view mode. Options in edit mode allow the user to see only contributions he/she made; communal contributions are available only in view mode.

Figure 8B:
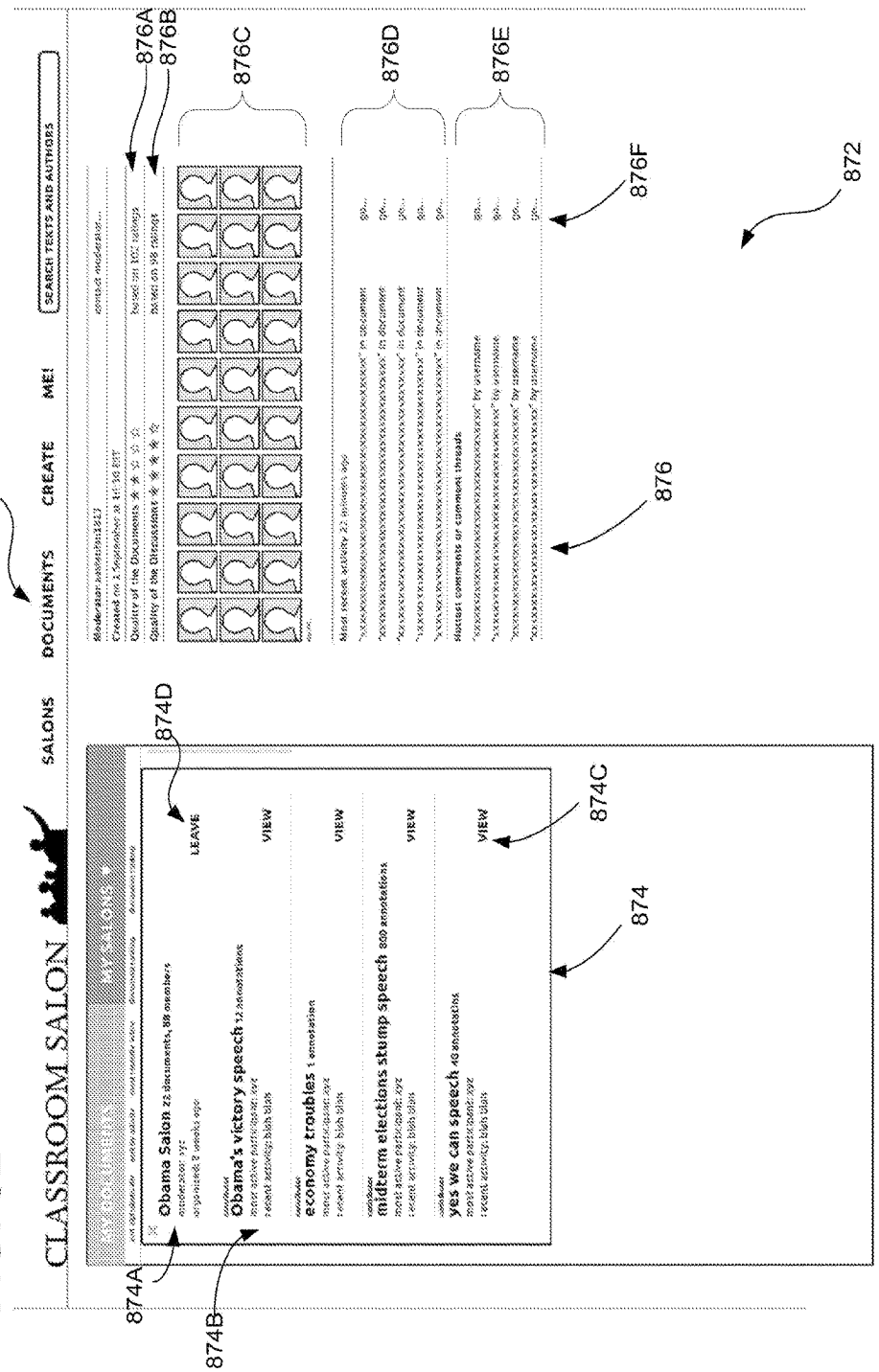
FIG. 8B is a screenshot illustrating an interest-group-level dashboard that is generally similar to the document landing page of FIG. 8A.

FIG. 8B is a screenshot 870 that illustrates an interest-group-level dashboard 872 that allows the current user to see high-level information about the current interest-group, here interest group 874A, that the current user is viewing. Interest-group-level dashboard 872 includes a pop-up window 874 that shows the current interest group 874A and the documents 874B currently in that interest group. Pop-up window allows the current user to navigate to any of documents 874B via a corresponding "VIEW" selector 874C and to navigate out of current interest group 874A using a "LEAVE" selector 874B. Interest-group-dashboard 872 also includes a summary frame 876 that provides some summary information about current interest group 874A. Among this information is a "Quality of the Documents" rating 876A that displays a rating for the quality of documents in interest group 874A. Rating 876A can be based on various users rating the various documents 874B in interest group 874A individually, with the ABV system determining a cumulative rating for all of the documents. Summary frame 876 also includes a "Quality of the Discussions" rating 876B that displays a rating for the quality of discussions concerning the various documents 874B within the current interest group 874A. Summary frame 876 further includes a members region 876C that identifies the members of current interest group 874A, a "Most recent activity" region 876D that displays a set of the most recent activities in the current interest group, and a "Hottest comments or comment threads" region 876E that displays a set of the hottest comments or comment threads. The current user can quickly navigate to each of the items in regions 876D and 876E by selecting the corresponding one of "go . . . " selectors 876F.

Figure 8C:
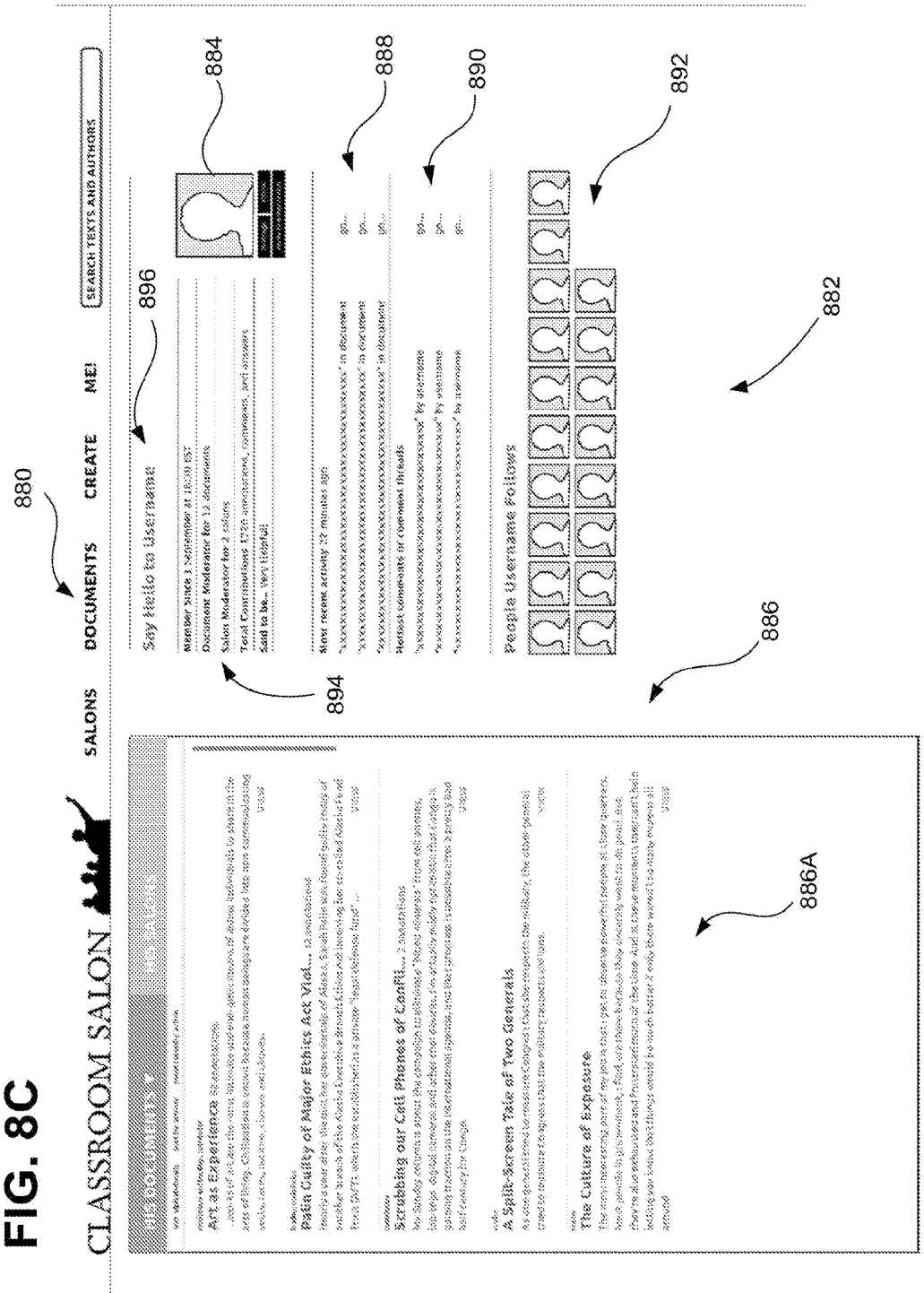
FIG. 8C is a screenshot illustrating a user-level dashboard that is generally similar to the document landing page of FIG. 8A.
Figure 15:
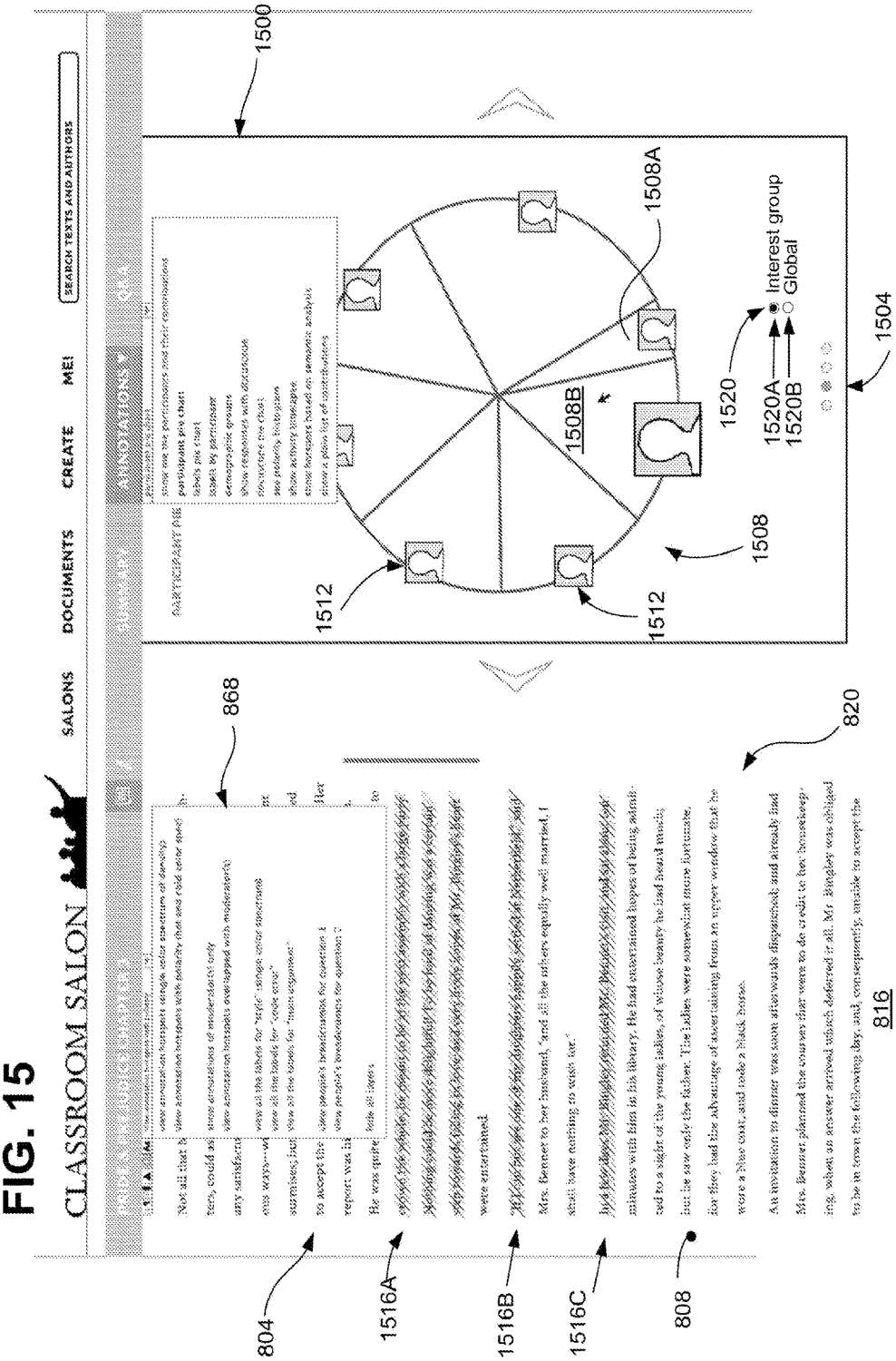
FIG. 15 is a screenshot of the document landing page of FIG. 8A, illustrating the "ANNOTATIONS" frame containing a participants pie-chart annotation visualization.

FIG. 8C is a screenshot 880 that illustrates an exemplary user-level dashboard 882 that the current user might see upon selecting another participant, such as selecting any one of the images in members region 876C of FIG. 8B or selecting a participant from pie chart, such as participants pie chart 1508 of FIG. 15. As those skilled in the art will readily appreciate, user-level dashboard 882 allows the current user to see a variety of information about the other participant so that the current user can decide whether or not he/she wants to follow the other participant or even navigate to the user-level dashboard of yet another participant already linked to the participant of user-level dashboard 882 of FIG. 8C. Information about the other participant, represented by image 884, includes: a list 886 of documents 886A the other participant has participated in; a list (not shown) of the interest group(s) that the other participant is a member of; a "Most recent activities" list 888; a "Hottest comments or comment threads" list 890; a followers list 892; and an overall summary 894. If the current user desires to follow the other participant of user-level dashboard 882 shown, he/she can select a request selector 896 that causes the ABV system to generate a follow request (not shown) that asks the other participant for permission to allow the current user to follow the other participant. The other participant can grant or deny such a request.

Figure 10:
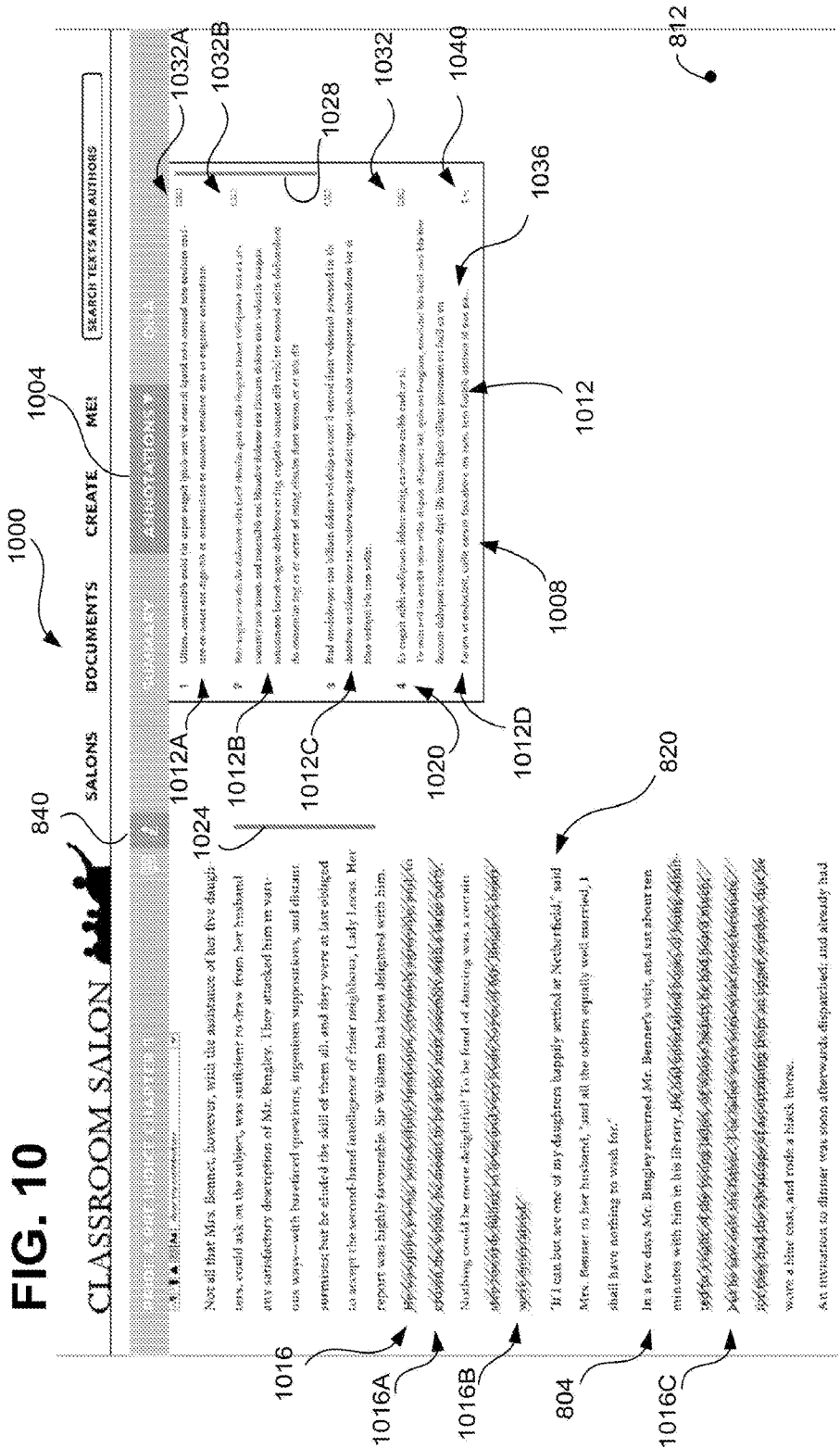
FIG. 10 is a screenshot of the document landing page of FIG. 8A, illustrating an "ANNOTATIONS" frame that shows the user's annotations for the visual media object.

FIG. 10 shows a screenshot 1000 of document landing page 804 of FIG. 8A in which the user has selected an "ANNOTATIONS" control (tab) 1004 that causes the ABV system to display an annotations frame 1008 on right-hand half 812 of the landing page. In this example, annotations frame 1008 displays annotations 1012 that the user has already added. Correspondingly, left-hand half 808 that shows interest-group document 820, contains highlighting 1016 of the text of the document that corresponds to the annotations in annotations frame 1008. In this example, highlighting 1016A, 1016B, 1016C corresponds, respectively, to the first three annotations 1012A, 1012B, 1012C in annotations frame 1008. In this connection, it is noted that the user has selected edit mode, as evidenced by the highlighting of edit-mode selector 840, such that only the current user's annotations show in both interest-group document 820 (view 816) and in annotations frame 1008. As those skilled in the art will readily appreciate, highlighting 1016 of document 820 may be any suitable sort of highlighting, such as color highlighting, underlining, modified (e.g., bolded) text, etc. Highlighting 1016 is shown by hatching due to limitations on patent drawings.

In this example, the ABV system assigns each annotation 1012 a sequential numeral 1020 to assist the user in locating the corresponding highlighting in interest-group document 820. In one example, if the user clicks on one of annotations 1012, the ABV system will change the text displayed in view 816 as needed so that the corresponding highlight 1016 appears within the view. In a reciprocal manner, the user can click on a particular highlight 1016 and/or corresponding numeral 1020 within view 816 and, if needed, ABV system 100 will change the display of annotations 1012 within annotations frame 1008 so that the annotation corresponding to the selected highlight is visible to the viewer. Each of view 816 and annotations frame 1008 includes a scroll bar 1024, 1028 to facilitate navigation.

The ABV system provides a "breadcrumb" feature that allows user to create one or more links from an annotation to one or more corresponding respective passages or portions of interest-group document 820. One use of the breadcrumb feature is to provide the user with a way of identifying one or more parts of interest-group document 820 that relate to the particular annotation at issue. For example, if the user adds an annotation that makes a comment on a particular passage within interest-group document 820, the user could use the breadcrumb feature to link to one or more other passages that, for example, provide support for the comment, provide contrast to the comment, or are subject to the same comment, among other things. In this instantiation, the ABV system implements this breadcrumb feature using a link icon 1032 for each annotation 1012. If the user wants to add a breadcrumb link to a particular annotation 1012, he/she would click on the corresponding link icon 1032 (e.g., icon 1032A for annotation 1012A, 1032B for annotation 1012B, etc.) and then go to document 820 and highlight the desired passage. In the example shown, annotation 1012D has a first breadcrumb 1036, as indicated by an icon 1040.

Figure 11:
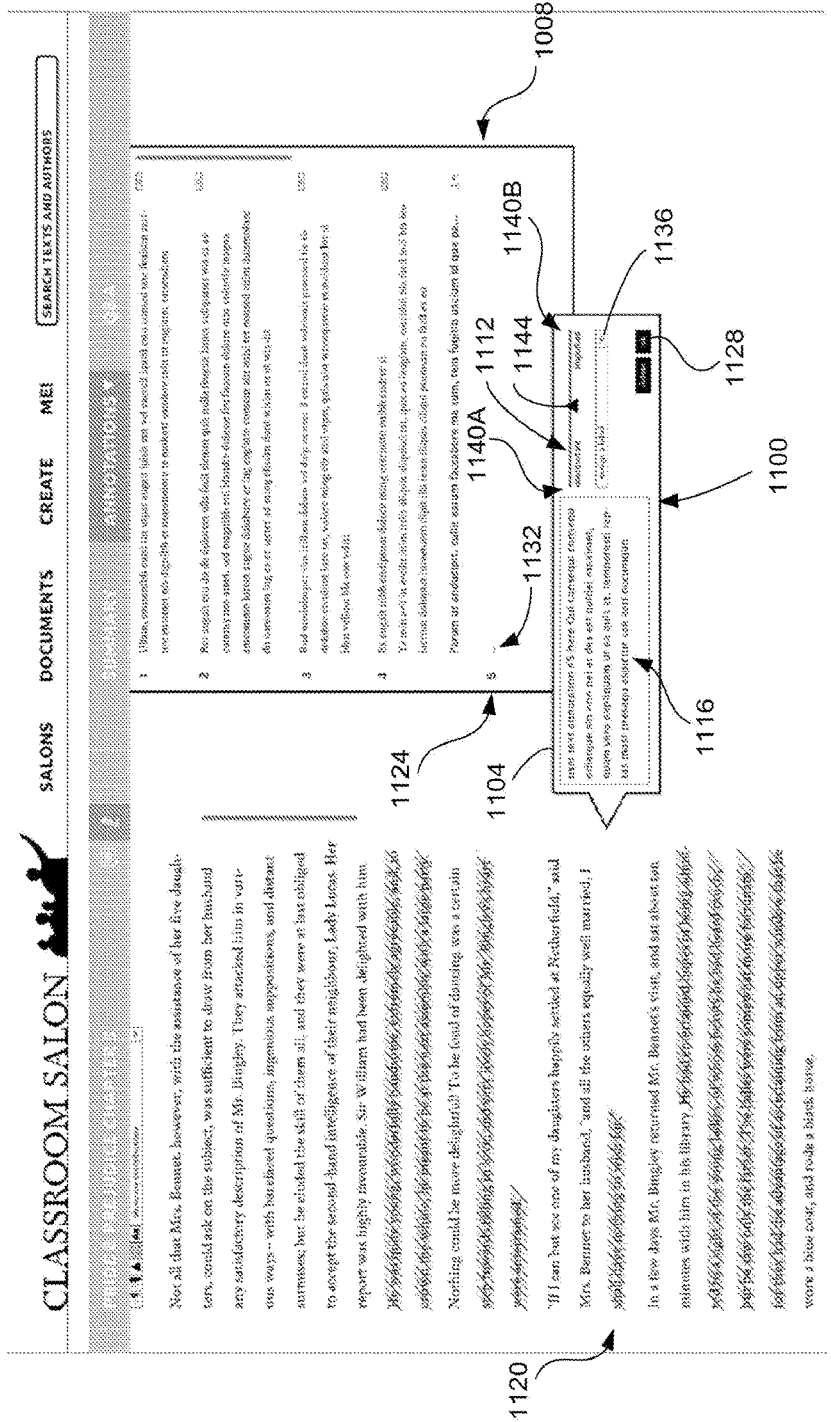
FIG. 11 is a screenshot of the document landing page of FIG. 8A, illustrating a pop-up annotation window.

In this instantiation, the ABV system allows the user to add written annotations to interest-group document 820 by highlighting a selected passage within view 816. In response to highlighting a desired passage, ABV system 100 displays a pop-up annotation box, such as annotation box 1100 of FIG. 11, that overlays document landing page 804. Such an annotation box displays the function(s) that is/are available to the user for the particular document shown, as set up by the moderator(s), for example, using moderator settings frame 904 of FIG. 9. Referring now to FIG. 11, in the example shown, annotation box 1100 includes a text field 1104, a label field 1108, and a polarity slider 1112. Text field 1104 allows a user to input a written comment 1116 directed to the highlighted passage, here highlighted passage 1120. Text field 1104 also displays the sequential comment number 1124, which the ABV system assigns based on the physical location of the corresponding highlighted passage within interest-group document 820, starting at the beginning of the document. In this example, highlighted passage 1120 is the fifth highlighted passage from the beginning of interest-group document 820. It is noted that once the user is finished with annotation box 1100, he/she selects a suitable control, such as "ok" soft button 1128, to which the ABV system responds by adding written comment 1116 to annotations frame 1008, here at the fifth annotation location 1132.

Label field 1108 allows the user to add an annotation in the form of a label, or tag. For example, if interest-group document 820 is being used in a grammar class and the class instructor has asked the students to highlight words and identify parts of speech, the user can use label field 1108 to tag each highlighted word with a label. The user might then use text field 1104 to provide a comment about the part of speech or explain the choice of tag, among other things. As another example, if the moderator has asked the user to highlight and identify errors in software code, the user can use label field 1108 to label the type of error for each highlighted passage/part. The user might then use text field 1104 to provide a comment about the part of speech or explain the choice of tag, among other things. In the example shown, label field 1108 is populated by a drop-down list (not shown, but accessed via drop-down control 1136. The ABV system may also or alternatively allow a user to add labels ad hoc.

Polarity slider 1112 allows the user to provide an annotation based on a sliding scale between two poles 1140A, 1140B. Polarity slider 1112 includes a slider control 1144 that the user can move to a selected location that can be at either of the two poles 1140A, 1140B or any location therebetween, for example, by dragging the slider control via an input device, such as a mouse or track ball in non-touch-screen examples or a finger or stylus in a touch-screen example, among others. In the example shown, poles 1140A, 1140B are labeled "unimportant" and "important," and the user can choose either of these extremes or an intermediate position by locating slider control 1144 accordingly. As those skilled in the art will readily appreciate, poles 1140A, 1140B can have any suitable labels the moderator(s) desire.

Figure 12:
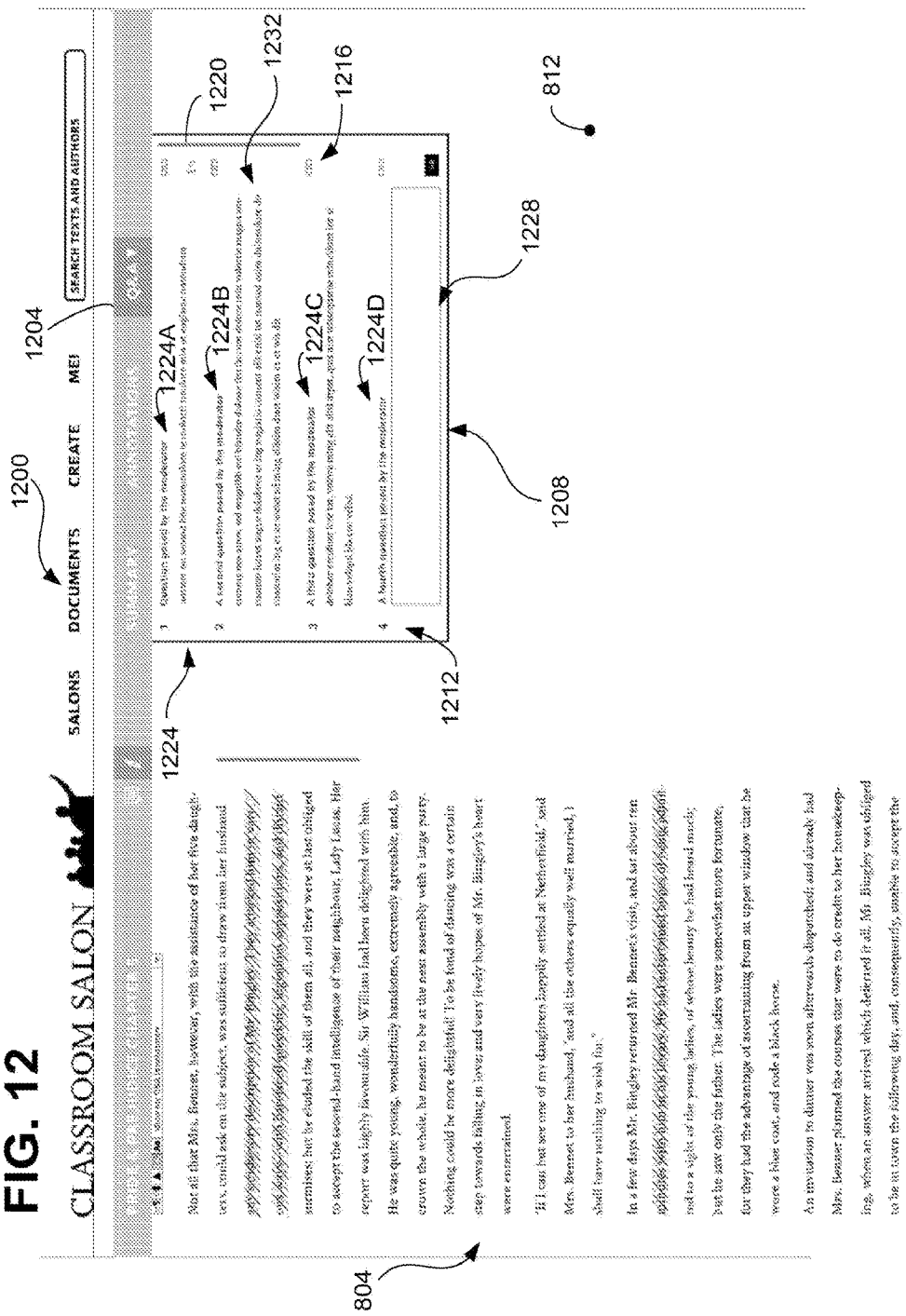
FIG. 12 is a screenshot of the document landing page of FIG. 8A, illustrating a "Q&A" frame that allows a user to provide annotations via a question-and-answer format.

FIG. 12 shows a screenshot 1200 of document landing page 804 of FIG. 8A in which the user has selected a "Q&A" control 1204 that causes the ABV system to display a questions-and-answers (Q&A) frame 1208 on right-hand half 812 of the landing page. Q&A frame 1208 is similar to annotations frame 1008 of FIG. 10. For example, Q&A frame 1208 utilizes sequential numbering 1212, breadcrumb link controls 1216, and has a scroll bar 1220 for navigating within the frame. However, unlike annotations frame 1008, Q&A frame 1208 contains questions 1224, here questions 1224A, 1224B, 1224C, and 1224D are specifically shown, directed to aspects of interest-group document 820. Questions 1224 are posed by the moderator(s) of this particular interest-group document 820 and are designed to elicit responses from the current user and/or other users. In this instantiation, when the user clicks on a question 1224 within Q&A frame 1208, the ABV system (FIG. 1) activates an answer text field 1228 beneath that question. Here, the user has selected question 1224D, such that answer text field 1228 appears beneath question 1224D. Since answer text field 1228 is empty, the user has not yet answered this question. If the user clicked on question 1224B, for example, text field 1228 would activate between questions 1224B and 1224C and would contain the text 1232 that is currently displayed there in Q&A frame 1208 of FIG. 12. Text 1232 would then be editable by the user. Regarding highlighting on left-hand side 808, highlighting 1236A is highlighting corresponding to a breadcrumb added by the current annotator relative to the first question 1224A, and this breadcrumb is accessible via breadcrumb selector 1240. That breadcrumb would have been added by the current annotator selecting the breadcrumb link 1216A and adding highlighting 1236A, and subsequently the AVB system would create selector 1240. Highlighting 1236B, is a breadcrumb highlighting in progress relative to the fourth question 1224D.

Figure 13:
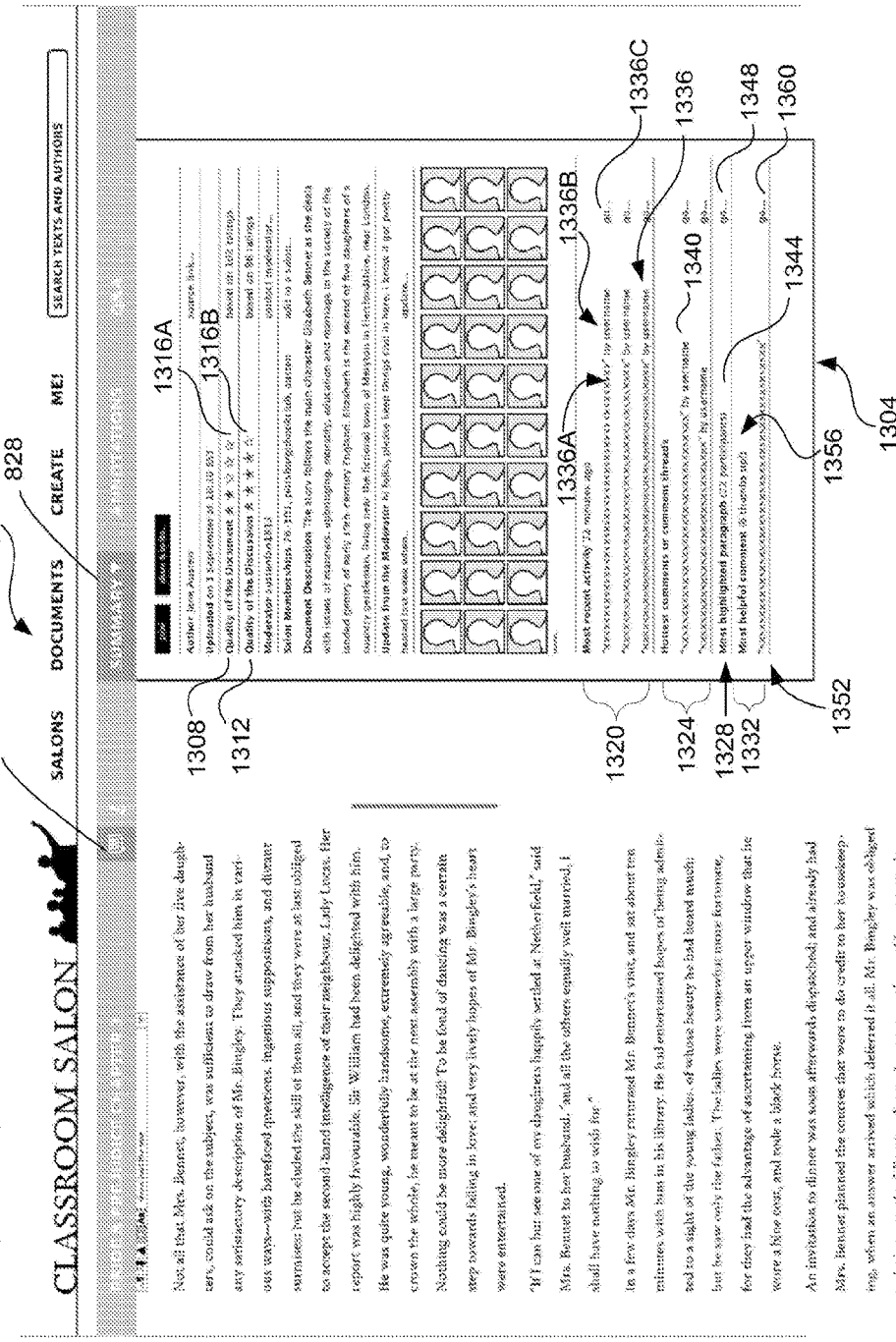
FIG. 13 is a screenshot of the document landing page of FIG. 8A, illustrating updates to the "SUMMARY" frame based on annotator activity.

FIG. 13 is a screenshot 1300 that illustrates a summary frame 1304, activated by the user selecting "SUMMARY" control 828. As will be seen by comparing summary frame 824 of FIG. 8A and summary frame 1304 of FIG. 13, summary frame 1304 contains some of the same items as summary frame 824, but summary frame 1304 contains additional items and other information because the ABV system is now in view mode, as indicated by the highlighting of view mode selector 844. In view mode, summary frame 1304 of FIG. 13 contains a summary that is global to interest-group document 820, i.e., considers all annotations that have been made by all annotators, whereas in edit mode as depicted in FIG. 8A, summary frame 824 does not display global summary information.

In this instantiation, summary frame 1304 of FIG. 13 includes a "Quality of the Document" ranking 1308 and a "Quality of the Discussion" ranking 1312, which are based on responses by various annotators to specific ranking requests (not shown). The ABV system may present such requests via polarity sliders (not shown) or other selection mechanism, such as by users clicking on the appropriate stars in each of the star bars 1316A, 1316B while in summary frame 824 of edit mode, as depicted in FIG. 8A. When the user has made the selections, the ABV system would use that ranking information and similar ranking information from other annotators in determining the overall rankings displayed in "Quality of the Document" ranking 1308 and a "Quality of the Discussion" ranking 1312 of the global summary of summary frame 1304 of FIG. 13.

Additional features of summary frame 1304 in this instantiation include a "Most recent activity" region 1320, a "Hottest comments or comment threads" region 1324, a "Most highlighted paragraph" region 1328, and a "Most helpful comment" region 1332. "Most recent activity" region 1320 contains a list 1336 that contains identifications 1336A of the most recent activities, the corresponding users' names 1336B, and a links 1336C to the corresponding respective activities, for example, free-form text comments, answers to a question, polarity slider rankings, etc. "Hottest comments or comment thread" region 1324 contains a list 1340 that is similar to list 1336, but is only a list of the most popular free-form comments, as rated, for example, by users selecting a "thumbs-up" selector to register their approval with the ABV system and/or by using another type of approval (and/or disapproval) or other rating feature known in the art. "Most highlighted paragraph" region 1328 identifies the number 1344 of annotator highlights in the most highlighted paragraph and a link 1348 to that paragraph within document 820. "Most helpful comment" region 1332 contains the most helpful comment 1352, a measure 1356 of its helpfulness, and a link 1360 to that comment.

Figure 14:
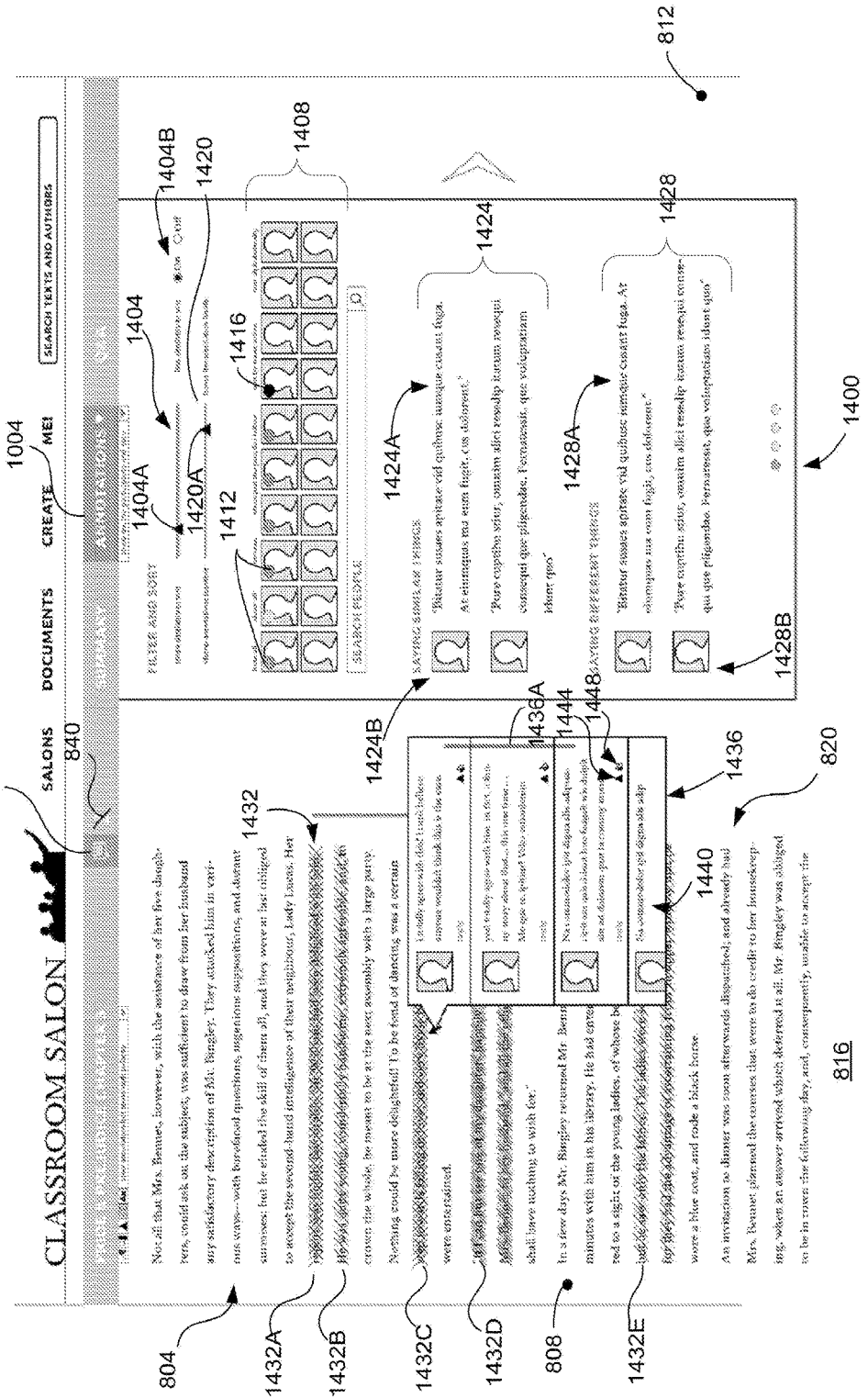
FIG. 14 is a screenshot of the document landing page of FIG. 8A, illustrating the "ANNOTATIONS" frame in a comment-type annotation visualization mode.

FIGS. 14 to 20 illustrate some exemplary annotation visualizations available in the present instantiation of the ABV system under "ANNOTATIONS" tab 1004 (see FIG. 14) while the system is in view mode, again as indicated by the highlighting of view mode selector 844 and, here, also by the crossed out edit mode selector 840 shown in FIG. 14. FIG. 14 illustrates an annotations frame 1400 on right-hand half 812 of document landing page 804. In this instantiation, annotations frame 1400 gives users a quick ability to shown and hide other users and filter down what could potentially be a large group of annotators as desired. For example, annotations frame 1400 includes a filter slider 1404 that changes highlighting shown in interest-group document 802 in view 816 of document landing page 804. In this example, the filter is based on user-profile information provided by users as described above, and filter slider 1404 allows the current user to set a slider control 1404A based on whether he/she wants to see annotations of annotators that have user profiles that are more similar to the current user's profile, that are less similar to the current user's profile, or somewhere in between. The functionality of filter slider 1404 works by the ABV system comparing the current user's profile information, for example, gender, political persuasion, religion, age, etc., to like information of the other users, and making decisions about the levels of similarities, and then displaying only highlighting for annotators that have the qualities indicated by the relative position of slider control 1404A within filter slider 1404. Correspondingly, an annotator list region 1408 will visually depict the visibility statuses of the annotators for this interest-group document 820 that appear in this region. In this instantiation, annotators having visible annotations have green checks 1412 and annotators having annotations hidden have yellow minuses 1416. Hovering with a cursor over either a green check 1412 or a yellow minus 1416 changes the status to the opposite status, that is, makes visible each hidden annotation of the corresponding annotator or hides each visible annotation of that annotator. The current user can activate or deactivate this filter feature using "On" and "Off" controls 1404B.

Annotations frame 1400 also includes clustering slider 1420 that allows the current user to select whether he/she wants to cluster annotation spots (highlighting) together to help build skimmable spots on a zoomed-out level or to honor the locations of the highlighting. To make a selection, the user moves a slider control 1420A to a desired location from "clump annotations together" to "honor the annotation locale." To group annotations by larger grain size (e.g., by a sentence, by a paragraph, or by another portion size), a user would slide slider control 1420A to the left in FIG. 14. This helps to overcome highlights that overlap and were intended to cover the same content but did not overlap exactly because of difference in how the annotators selected their highlighting. Honoring the annotation locale will display annotations exactly as all the annotators highlighted. The ABV system will change the appearance of the highlighting of document 820 on left-hand half 808 of document landing page 804 depending on the selected relative location of slider control 1420.

In this instantiation, annotations frame 1400 further includes a "SAYING SIMILAR THINGS" region 1424 and a "SAYING DIFFERENT THINGS" region 1428 that are each populated by a number, here two, of free-form-text annotations comments 1424A, 1428A that are either similar to (region 1424) or different from (region 1428) annotations made by the current user (annotator). Regions 1424, 1428 also show corresponding respective annotator identifiers 1424B, 1428B. The ABV system can determine similarities and differences in annotation comments based on automated semantic analysis of the comments based on algorithms that look for similarities and differences in words and phrases used in the comments. In other examples, the comments may be accompanied by labels or other annotation types that the ABV system can use to determine similarity and difference. Those skilled in the art will readily understand how to implement such algorithms.

In FIG. 14, left-hand half 808 of document landing page 804 shows highlighting 1432 of differing character, for example, differing color, differing intensity, differing underline style, etc., or any combination thereof. However, for the sake of the present patent document drawings, the differing character of highlighting 1432A, 1432B, 1432C, 1432D, 1432E is depicted by hatching of differing types. The character of any one of highlightings 1432 in this example corresponds to the agreement in polarity among the annotations for that highlighting. For example, the cross hatching of cross-hatched highlighting 1432A and 1432C indicates that the majority of the corresponding annotators agree with the highlighted passage, whereas the dense forward hatching of highlighting 1432D indicates disagreement. In this example, the character of each highlighting 1432 is based on data collected from a polarity slider (not shown, but similar to polarity slider 1112 of FIG. 11) that ranges from agreement to disagreement. Of course, the character of highlighting 1432 can be based on one or more other criteria, such as similarity of free-form comments as determined by an automated semantic analysis.

Left-hand half 808 of document landing page 804 also shows a pop-up annotations window 1436 that the ABV system displays when the current user clicks on a particular one of highlightings 1432, here highlighting 1432C. In this instantiation, annotations window 1436 provides visual access to all of the annotations 1440 corresponding to highlighting 1432C in a list format. Each annotation 1440 includes a caution selector 1444 that the current user can select if he/she believes there is a problem with the annotation comment, such as being inappropriate, misleading, etc., and a "like" selector 1448 that the current user can select to indicate that he/she likes the annotation comment Like selector 1448 allows the ABV system to rank annotations 1440 by the number of times users have selected the like selector. The ABV system can use this ranking information in a number of ways, such as alerting users to the most popular annotation(s) and/or displaying annotations 1440 within pop-up annotations window 1436 in order of ranking, among others. If all users fail to use like selector 1448, the ABV system can be provided with a ranking algorithm (not shown) that attempts to rank comments automatically. An example of such a ranking algorithm is a semantics analysis algorithm that uses a dictionary of terminology (not shown) input by the document's moderator. Pop-up annotations window 1436 also includes a scroll bar 1436A as necessary to access all of the annotations 1440 for the particular highlighting 1432.

FIG. 15 illustrates options in drop-down menu 868 on left-hand half 808 of document landing page 804 that are available to the current user in view mode for affecting the display in the left-hand half of the page. In the present instantiation, the options available are: 1) "view annotation hotspots (single color spectrum of density)"; 2) "view annotation hotspots with polarity (hot and cold color spec)"; 3) "shown annotations of moderator(s) only"; 4) "view annotation hotspots overlapped with moderator(s)"; 5) "view all the labels for "style" (single color spectrum)"; 6) "view all the labels for "code error""; 7) "view all the labels for "main argument""; 8) "view people's breadcrumbs for question 1"; 9) "view people's breadcrumbs for question 2"; and 10) "hide all layers."

Regarding option 1, an example of spectrum of density is yellows to oranges to reds. Regarding option 2, an example of polarity colors is red and green. Regarding option 4, the annotator hotspots can be indicted in a color other than the color of the moderator annotations so that they are readily distinguishable. Regarding options 5 to 7, these options are based on what labels the moderator(s) provided to document 820, and these options will highlight all of the locations within the document labeled by annotators. Regarding, options 8 and 9, the highlighting is similar to the highlighting of options 5 to 7. Regarding option 10, each of the forgoing options presents highlighting in separate layers, and option 10 can be used to turn off all highlighting (layers).

FIG. 15 also shows options available in this instantiation in a drop-down menu 1500 on right-hand half 812 of document landing page 804 that affect at least the information presented in annotations frame 1504. The options available are: 1) "show me the participants and their contributions"; 2) "participant pie chart"; 3) "labels pie chart"; 4) "labels by participant;" 5) "demographic groups"; 6) "show responses with docuscope"; 7) "docuscope pie chart"; 8) "see polarity histogram"; 9) "show activity timelapse"; 10) "show hotspots based on semantic analysis"; and 11) "show a plain list of contributions". It is noted that selections made from drop-down menu 1500 can cause view 816 on left-hand half 808 to change. For example, selecting option 3, the labels pie chart, will cause view 816 to highlight the labeled portions of document 820, and clicking one of the segments or labels in the pie chart (see FIG. 16) will cause the ABV system to display only the portions of the document that have that label.

Right-hand half 812 of document landing page 804 also shows annotations frame 1504 as containing a participant pie chart 1508 based on the selection of option 2 in drop-down menu 1500. In this example, participant pie chart 1508 shows the most active annotators, with the relative activity represented by the size of the corresponding wedge of the chart. The annotators are represented by the images 1512 they selected for their user profiles, as described above. Pie chart 1508 includes an "others" wedge 1508A as a catch-all to prevent a large number of very small wedges for small contributors. The current user can click on any one or more of the wedges in pie chart 1508 or the corresponding annotator image(s) 1512, and in response the ABV system will display the corresponding annotation highlights. In the example shown, the current user has selected wedge 1508B, and view 816 contains highlights 1516A, 1516B, and 1516C corresponding to the selected wedge/annotator. If the user selects more than one annotator, the corresponding highlighting in view 816 can be composed of differing color highlighting for the differing annotators.

As also depicted in FIG. 15, in the present instantiation the ABV system allows the current user to determine which annotations he/she would like to be represented by pie chart 1508. In this example, annotations frame 1504 includes selectors, here radio buttons 1520, that allow the current use to select between interest group annotations (button 1520A) and global annotations 1520B) associated with document 820. As mentioned above, a particular visual media object, here document 820, can be annotated by users from multiple interest groups. Depending on which button 1520 the current user has selected, here button 1520A, pie chart 1508 will reflect either annotations made only by members of the current interest group or made by all users regardless of which interest group they have participated in to annotate document 820. When the current user selects the "Global" button 1520B, he/she can use the pie chart to discover one or more relationships with one or more users outside of his/her current interest group. Indeed, such discovery(ies) can lead to the current user following one or more users belonging to other interest groups and to the current user becoming a member of one or more different communities. When the current use selects the "Interest group" button 1520B, he/she can similarly discover relationships, but they would be only with members of the current user's current interest group.

Figure 16:
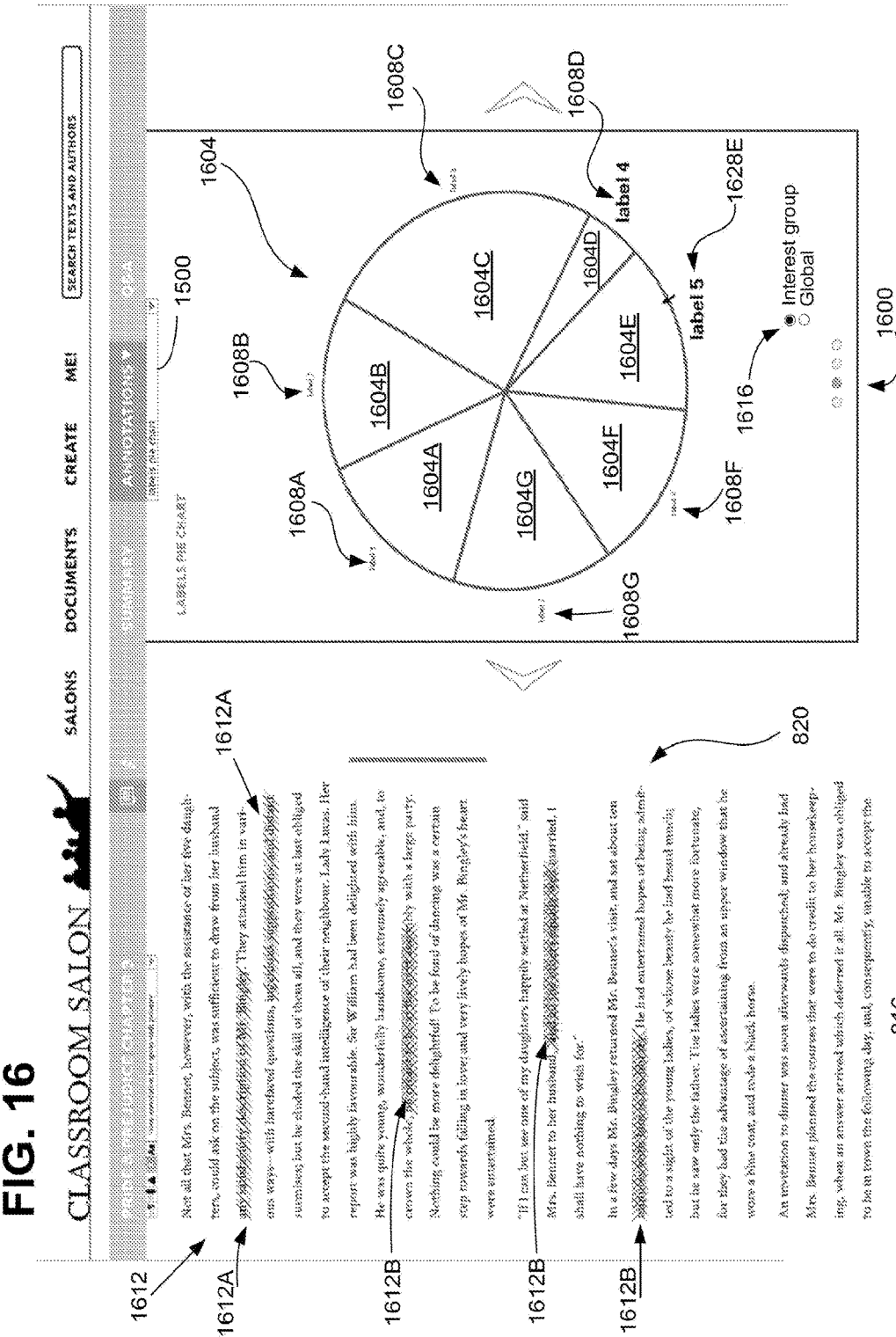
FIG. 16 is a screenshot of the document landing page of FIG. 8A, illustrating the "ANNOTATIONS" frame containing a labels pie-chart annotation visualization.

FIG. 16 shows an annotations frame 1600 of when the current user has selected option 2 from drop-down menu 1500, i.e., has selected the "labels pie chart" option (see FIG. 15), so that the ABV system displays a labels pie chart 1604. Labels pie chart 1604 is an annotation visualization that graphically displays the relative usage of the labels provided by the moderator(s) for this particular interest-group document 820. Here, the wedges 1604A through 1604G of pie chart 1604 are labeled "label 1," "label 2," etc., for illustration, but would be the actual labels provided. Similar to the functionality of participants pie chart 1508 of FIG. 15, when the user clicks on any one or more of wedges 1604A through 1604G or the corresponding label names 1608A through 1608G, view 816 shows the corresponding respective label locations within interest-group document 820. If the user selects more than one label, the corresponding highlighting 1612 in view 816 can be composed of differing color highlighting for the differing labels. As those skilled in the art will readily appreciate, labeled selections can overlap, as will the corresponding highlighting 1612. In FIG. 16, highlighting 1612A corresponds to the label of wedge 1604D, and highlighting 1612B is overlapping highlighting that corresponds to the labels of wedges 1604D and 1604E. As those skilled in the art will readily appreciate, annotations frame 1600 can have interest group and global filtering selectors 1616 that have similar functionality to the functionality of radio buttons 1520 of FIG. 15.

Figure 17:
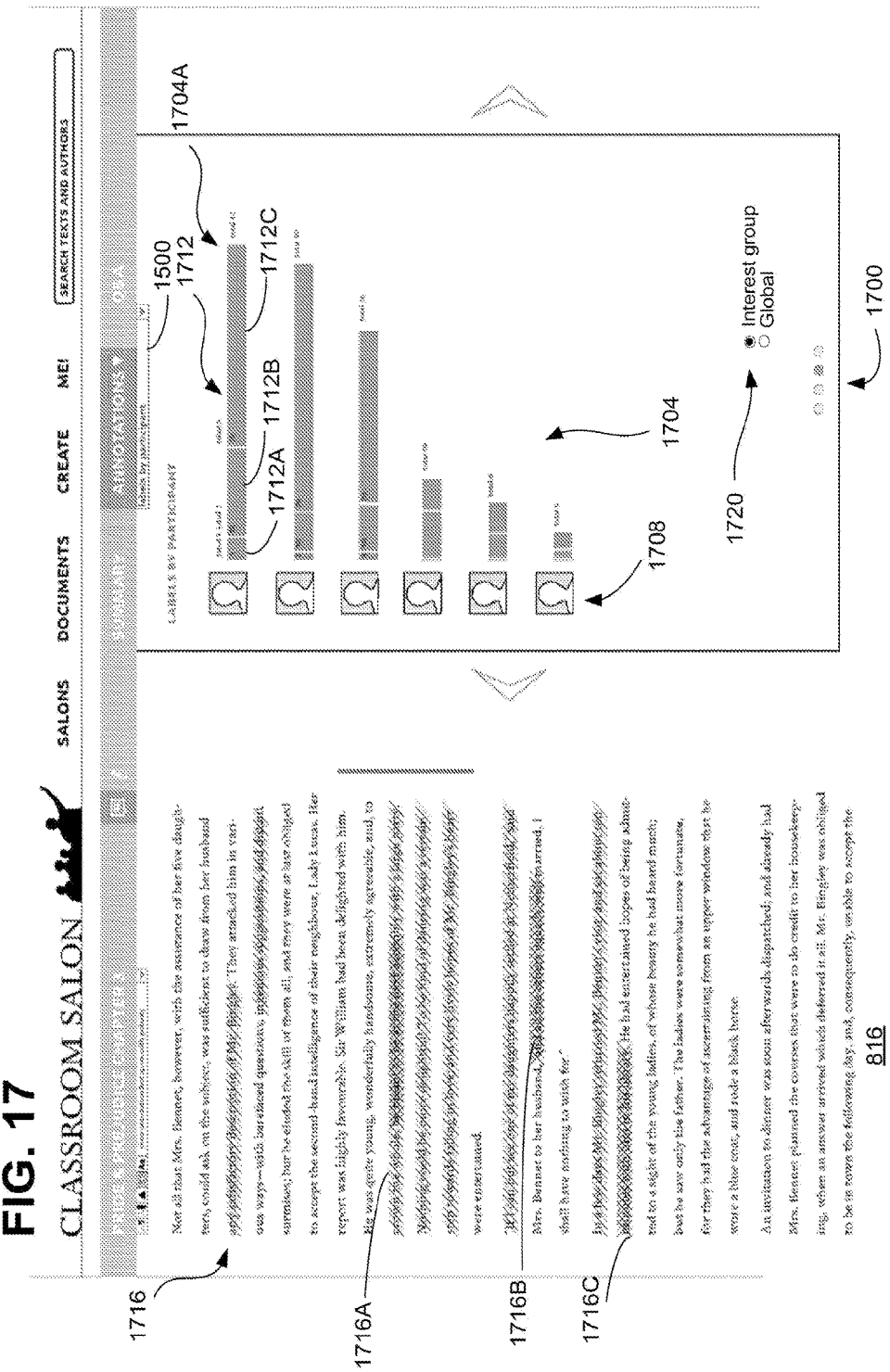
FIG. 17 is a screenshot of the document landing page of FIG. 8A, illustrating the "ANNOTATIONS" frame containing a labels-by-participant annotation visualization.

FIG. 17 shows an annotations frame 1700 of when the current user has selected option 4 from drop-down menu 1500, i.e., has selected the "labels by participant" option (see FIG. 15), so that the ABV system displays label bar graphs 1704 for a set 1708 of participants. It is noted that set 1708 of participants is determined by the filter settings described above in connection with FIG. 14. Each bar graph 1704 is an annotation visualization that graphically displays the relative usage, by the corresponding annotator, of the labels provided by the moderator(s) for this particular document 820. In this instantiation, each bar graph 1704, such as bar graph 1704A, includes a segment 1712 for each label. Here, bar graph 1704A has three segments 1712A, 1712B, and 1712C corresponding to three labels, and the length of each segment corresponds to the number of times the corresponding annotator used that label. Each of the segments in each bar graph 1704 has a distinct color and is selectable by the current user such that the ABV system shows the locations in view 816 where the annotator at issue used the corresponding label using highlighting 1716 in the color of the selected segment. In the example shown, two differing color highlightings 1716A and 1716B are shown in response to the current user selecting two segments of one or two bar graphs 1704, and there are also three regions 1716A, 1716B, 1716C where the two highlightings overlap one another. As those skilled in the art will readily appreciate, annotations frame 1700 can have interest group and global filtering selectors 1720 that have similar functionality to the functionality of radio buttons 1520 of FIG. 15.

Figure 18:
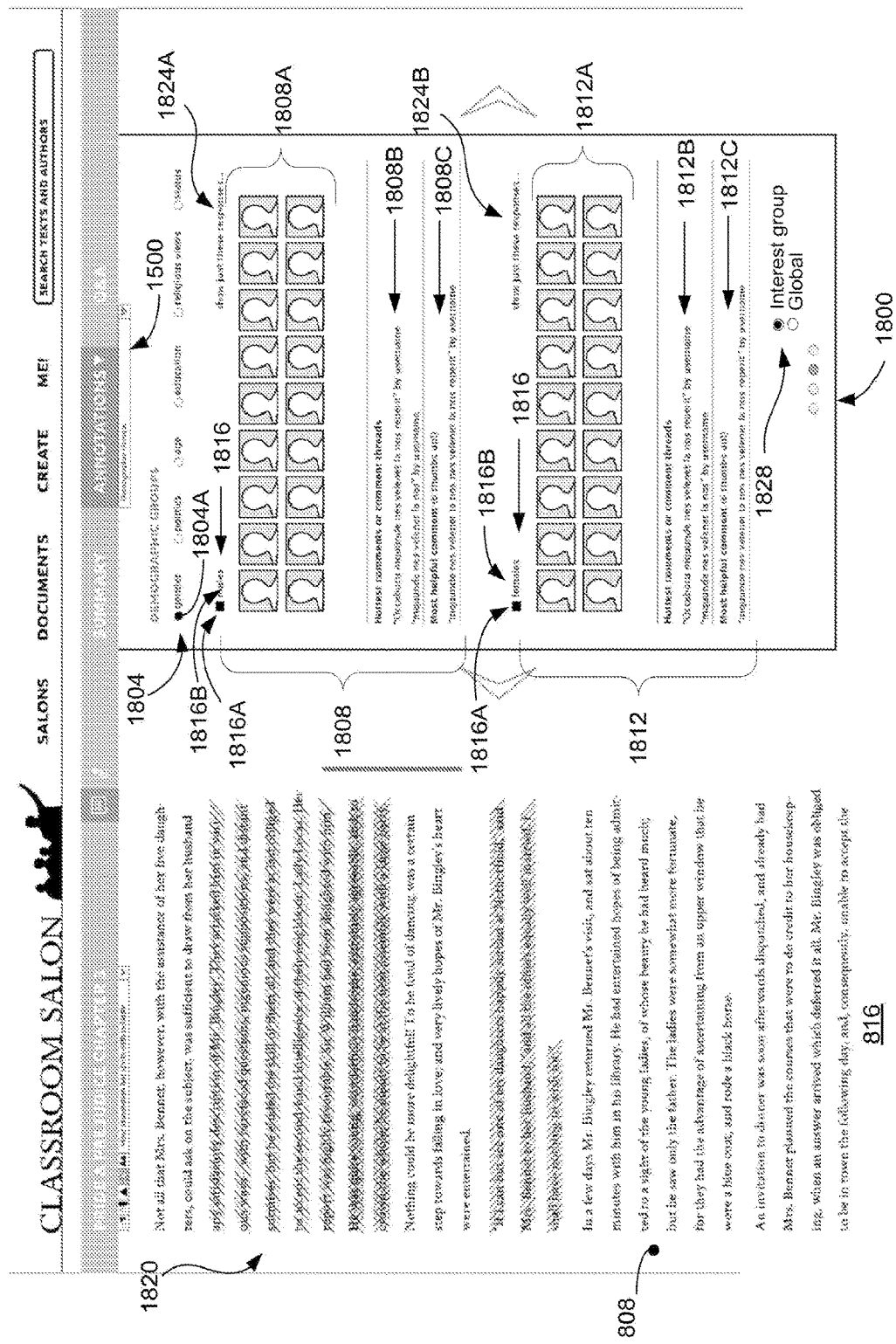
FIG. 18 is a screenshot of the document landing page of FIG. 8A, illustrating the "ANNOTATIONS" frame containing a demographic-groups annotation visualization.

FIG. 18 shows an annotations frame 1800 of when the current user has selected option 5 from drop-down menu 1500, i.e., has selected the "demographic groups" option (see FIG. 15), so that the ABV system displays demographic groups information. In this instantiation, annotations frame 1800 allows the current user to select which demographic groups he/she would like to see information on using group selectors, here radio buttons 1804, that allows selection by category, here, gender, politics, age, education, religious views, and status. In the example shown, the current user has selected the gender category as indicated by the solidly filled radio button 1804A. With the gender category selected, annotations frame 1800 displays sets 1808, 1812 of information for two gender groups, male and female, each of which is headed by a header 1816 that consists of a color selector 1816A and the gender name 1816B.

Each set 1808, 1812 of information contains an image list 1808A, 1812A of the corresponding annotators, as well as a list 1808B, 1812B of hottest comments or comment threads by that gender and a list 1808C, 1812C of most helpful comments by that gender. It is noted that the number of annotators shown in lists 1808C, 1812C can be controlled using filtering techniques discussed above relative to FIG. 14. When the current user clicks on either of color selectors 1816A, the ABV system allows the user to select a highlighting color for that group if the user wants to change the current or default color. The selected/default colors are used for the corresponding highlighting 1820 in view 816 on left-hand half 808. Each group, here gender, is also provided with a "show just these responses . . . " selector 1824A and 1824B, which allows the current user to control the ABV system so that it just shows the responses for the corresponding group. For example, if the user actuated selector 1824B, the ABV system would show only set 1812 of information for females and would only display the corresponding highlighting 1820 in view 816. While the gender category is shown as having just two groups, other categories, such as politics, age, education, and religious views will typically have more than two groups. When the user has selected one of selectors 1824A, 1824B, the information set 1808, 1812 for the opposite group is not displayed, and in its place the ABV system displays additional comments in to corresponding one of lists 1808B, 1812B and/or corresponding one of lists 1808C, 1812C. As those skilled in the art will readily appreciate, annotations frame 1800 can have interest group and global filtering selectors 1828 that have similar functionality to the functionality of radio buttons 1520 of FIG. 15.

Figure 19:
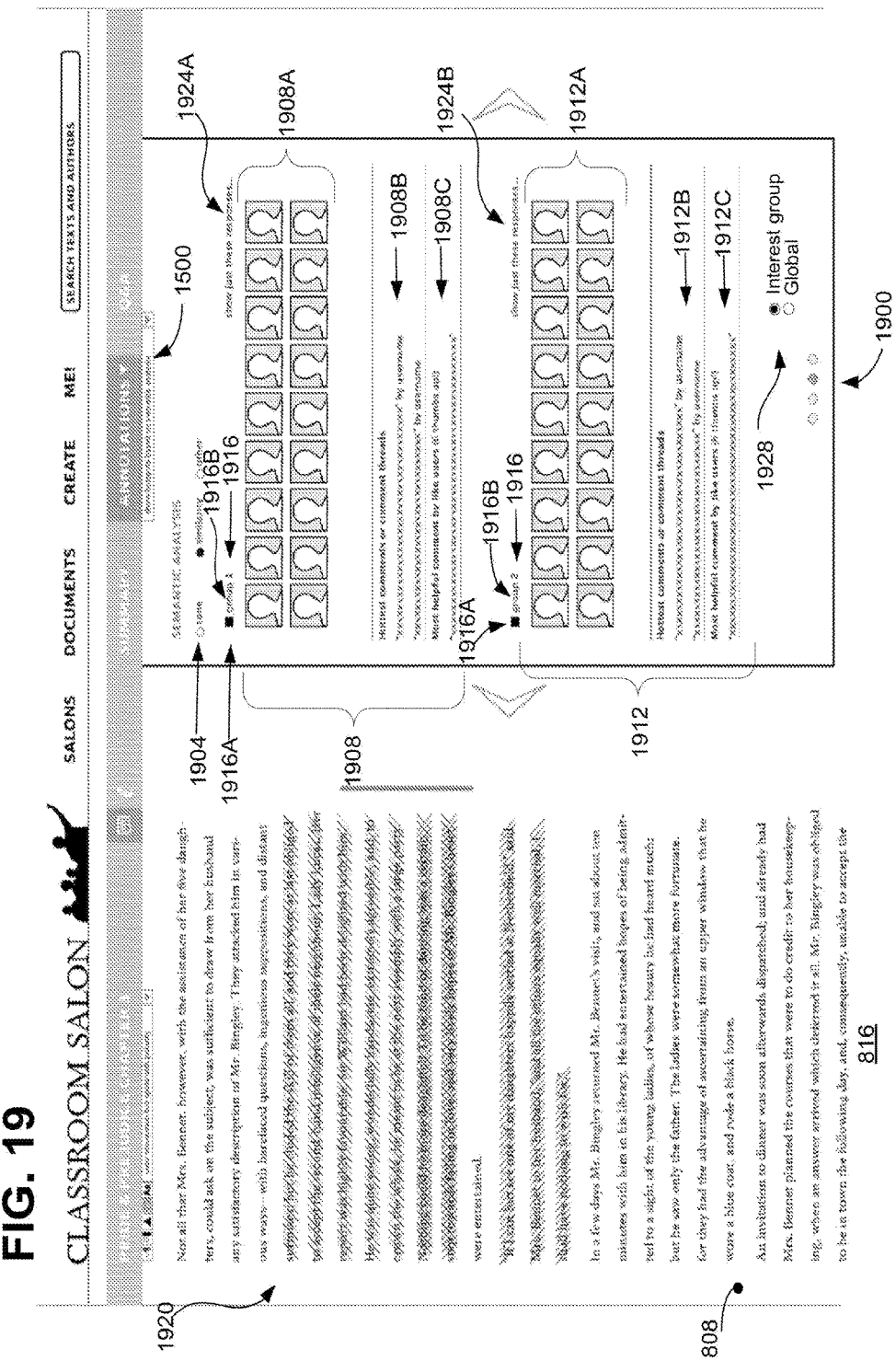
FIG. 19 is a screenshot of the document landing page of FIG. 8A, illustrating the "ANNOTATIONS" frame containing a semantics analysis pie-chart annotation visualization.

FIG. 19 shows an annotations frame 1900 of when the current user has selected option 10 from drop-down menu 1500, i.e., has selected the "show hot spots based on semantic analysis" option (see FIG. 15), so that the ABV system displays information based on a semantic analysis of free-form-comment annotations. With this option selected, annotations frame 1900 displays a set of selectors, here, radio buttons 1904, that allow the current user to select which type of semantic analysis information he/she desires. In this example, the choices are tone, similarity, and other. The tone selection causes the ABV system to review written comments of other annotators for words and/or phrases indicating literary tone and then to group comments based on the similarity of the tone of those comments to the current user's tone. Similarly, the similarity selection causes the ABV system to review the written comments of other annotators for words and/or phrases indicative of the substance of the comments and then group comments based on the similarity of the substance of those comments to the current users comments.

The ABV system visualizes the tonal, substance, or other groups in annotations frame 1900 depending on which option the current user has selected. In the example shown, the user has selected the similarity option and the ABV system causes annotations frame 1900 to display two sets 1908, 1912 of information for two groups, a group representing comments similar to the current user's comments and a second group representing comments different from the current user's comments, each of which is headed by a header 1916 that consists of a color selector 1916A and group name 1916B. In this example, "group 1" and "group 2" are used as group names 1916B for the sake of illustration.

Each set 1908, 1912 of information contains a image list 1908A, 1912A of the corresponding annotators, as well as a list 1908B, 1912B of hottest comments or comment threads in the corresponding group and a list 1908C, 1912C of most helpful comments by the corresponding group. It is noted that the number of annotators shown in lists 1908C, 1912C can be controlled using filtering techniques discussed above relative to FIG. 14. When the current user clicks on either of color selectors 1916A, the ABV system allows the user to select a highlighting color for that group if the user wants to change the current or default color. The selected/default colors are used for the corresponding highlighting 1920 in view 816 on left-hand half 808. Each group is also provided with a "show just these responses . . . " selector 1924A and 1924B, which allows the current user to control the ABV system so that it just shows the responses for the corresponding group. For example, if the user actuated selector 1924B, the ABV system would show only set 1912 of information for females and would only display the corresponding highlighting 1920 in view 816. While the gender category is shown as having just two groups, other categories, such as politics, age, education, and religious views will typically have more than two groups. When the user has selected one of selectors 1924A, 1924B, the information set 1908, 1912 for the other group(s) is not displayed, and in its place the ABV system displays additional comments in to corresponding one of lists 1908B, 1912B and/or corresponding one of lists 1908C, 1912C. As those skilled in the art will readily appreciate, annotations frame 1900 can have interest group and global filtering selectors 1928 that have similar functionality to the functionality of radio buttons 1520 of FIG. 15.

Figure 20:
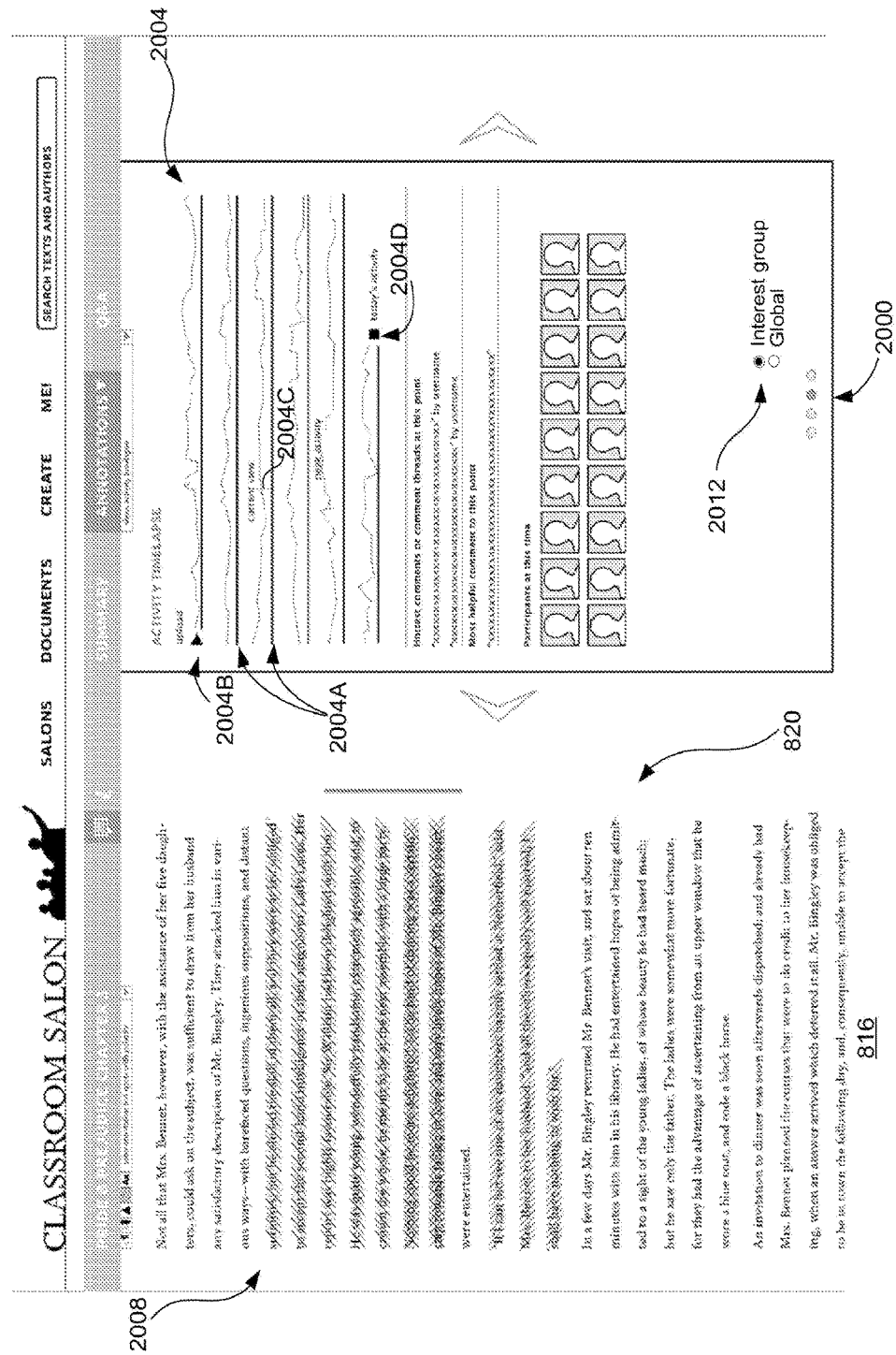
FIG. 20 is a screenshot of the document landing page of FIG. 8A, illustrating the "ANNOTATIONS" frame containing an activity time-lapse annotation visualization.

FIG. 20 shows an annotations frame 2000 of when the current user has selected option 9 from drop-down menu 1500, i.e., has selected the "show activity timelapse" option (see FIG. 15), so that the ABV system displays a timelapse tool 2004 that allows the current user to not only visualize graphically the annotating activities of all of the annotators for interest-group document 820 from the time that the moderator(s) added the document to the ABV system, but also to play back the activity so that the ABV system displays the progression of highlighting activity in view 816. For playback functionality, timelapse tool 2004 includes a graphical activity timeline 2004A, a play control 2004B that starts the playback, and a time indicator 2004C that shows the current position of the playback along the timeline. After the current user has selected play control 2004B, it changes to a pause control (not shown) that allows the user to pause the playback. Once the playback has reached the current time, it ends, and the pause control reverts to play control 2000B. The user can also drag time indicator 2004C to a desired location along timeline 2004A using conventional selecting/dragging techniques. As mentioned, as the playback progresses, the highlighting 2008 in view 816 continually changes to reflect the continual adding of annotations over time. Timelapse tool 2004 also includes a today's-activity control 2004D that the current user can select to cause the ABV system to display only the activity that has occurred within the day that the user selects control 2004D. As those skilled in the art will readily appreciate, annotations frame 2000 can have interest group and global filtering selectors 2012 that have similar functionality to the functionality of radio buttons 1520 of FIG. 15.

Figure 21:
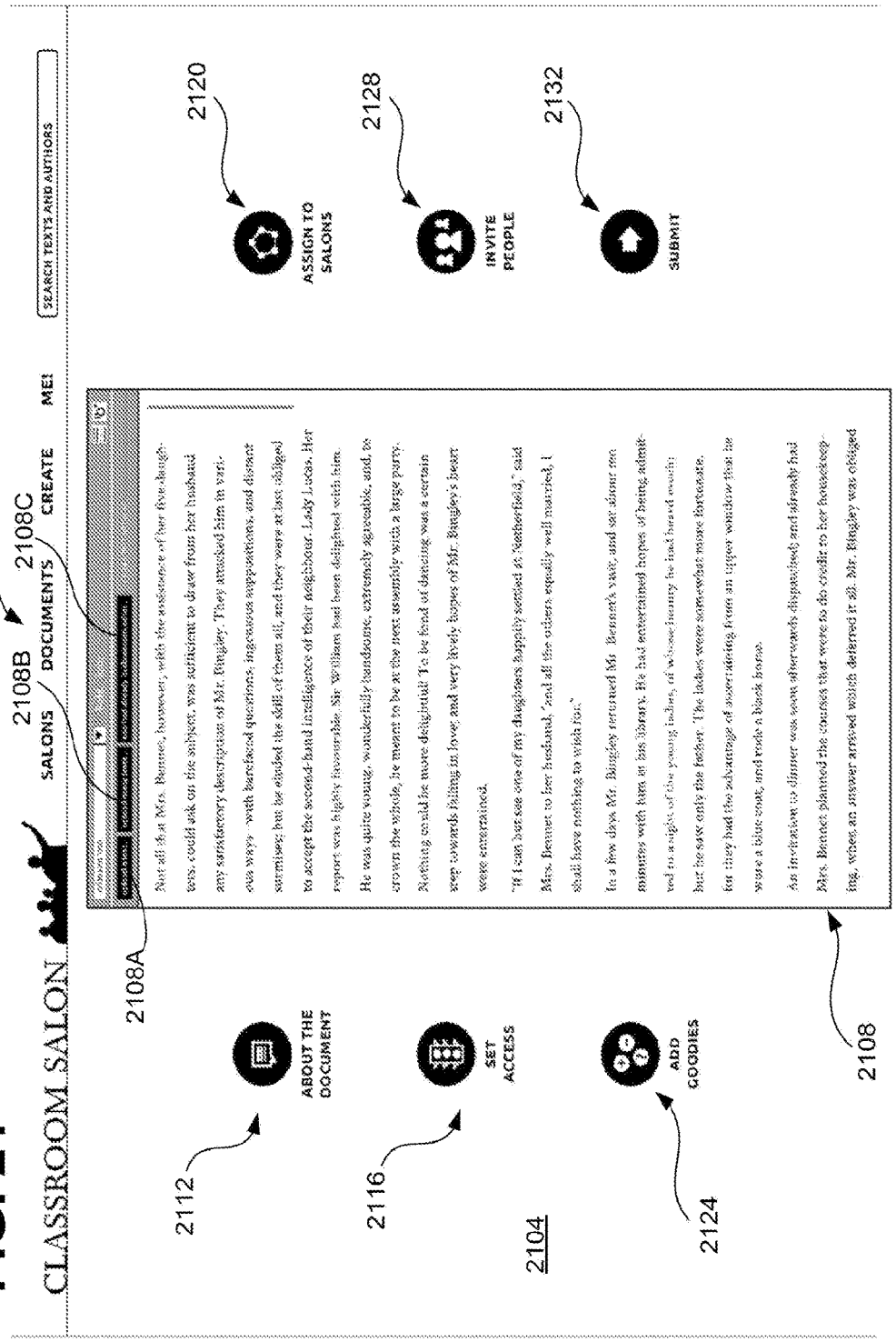
FIG. 21 is a screenshot of a document setup page of the user interface of FIG. 3.
Figure 22:
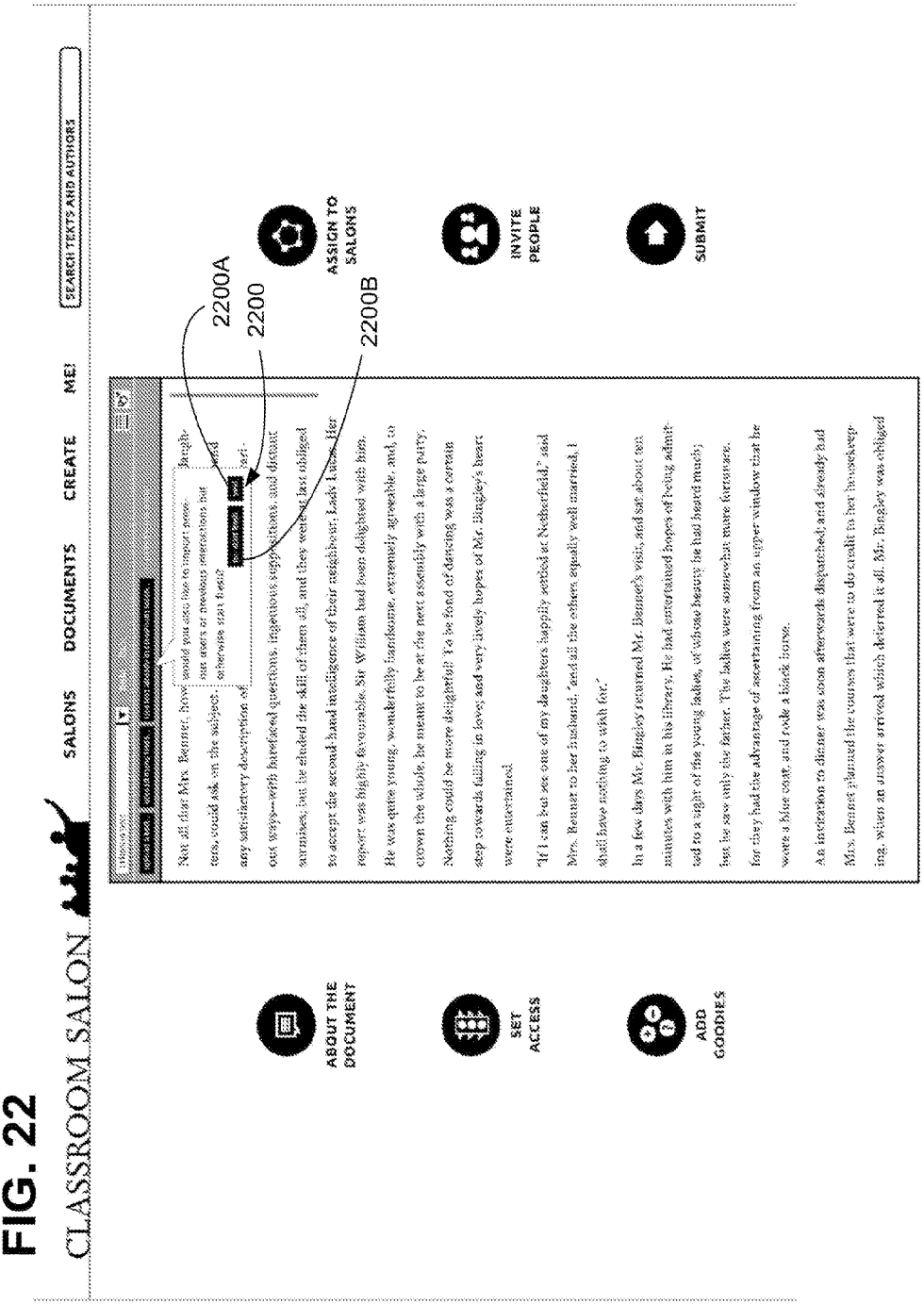
FIG. 22 is a screenshot of the document setup page of FIG. 21, illustrating a document-import feature.

FIGS. 21 to 30 are screenshots directed to a page, pop-up windows, and dialog boxes that the moderator(s) can use to set up a document within the ABV system. Referring first to FIG. 21, this figure shows a screenshot 2100 of a document setup landing page 2104 that is a homepage for the setup functionality of the ABV system. In this instantiation, landing page 2104 includes a center well 2108 that displays the document being set up for use in the ABV system by the moderator(s), here, interest-group document 820 discussed above. The moderator(s) can put document 820 into well 2108 in any suitable way, including copying and pasting, uploading, copying from an existing interest group, etc. To facilitate uploading, center well 2108 includes an "upload a text" selector 2108A and an "upload many texts" selector 2108B, each of which displays a dialog box (not shown) that allows the user to locate and identify to the ABV system each electronic file that should be attached and used to fill well. Similarly, to facilitate the copying of a document from another interest group, center well 2108 also includes a "use text already in classroom salon" selector 2108C. Actuation of selector 2108C activates a pop-up window 2200 (FIG. 22) that allows the moderator(s) to indicates whether the copied document should include previous annotations and interactions ("yes!" selector 2200A) or not ("no, start fresh" selector 2200B).

Referring again to FIG. 21, document setup landing page 2104 includes a number of selectors that allows the moderator(s) to implement certain functionality. In this example, the selectors are 1) an "ABOUT THE DOCUMENT" selector 2112, 2) a "SET ACCESS" selector 2116, 3) an "ASSIGN TO SALONS" selector 2120; 4) an "ADD GOODIES" selector 2124; 5) an "INVITE PEOPLE" selector 2128, and 6) a "SUBMIT" selector 2132. The functionality corresponding to each of these selectors 2112, 2116, 2120, 2124, 2128, and 2132 is described below with reference to corresponding respective FIGS. 23-28.

Figure 23:
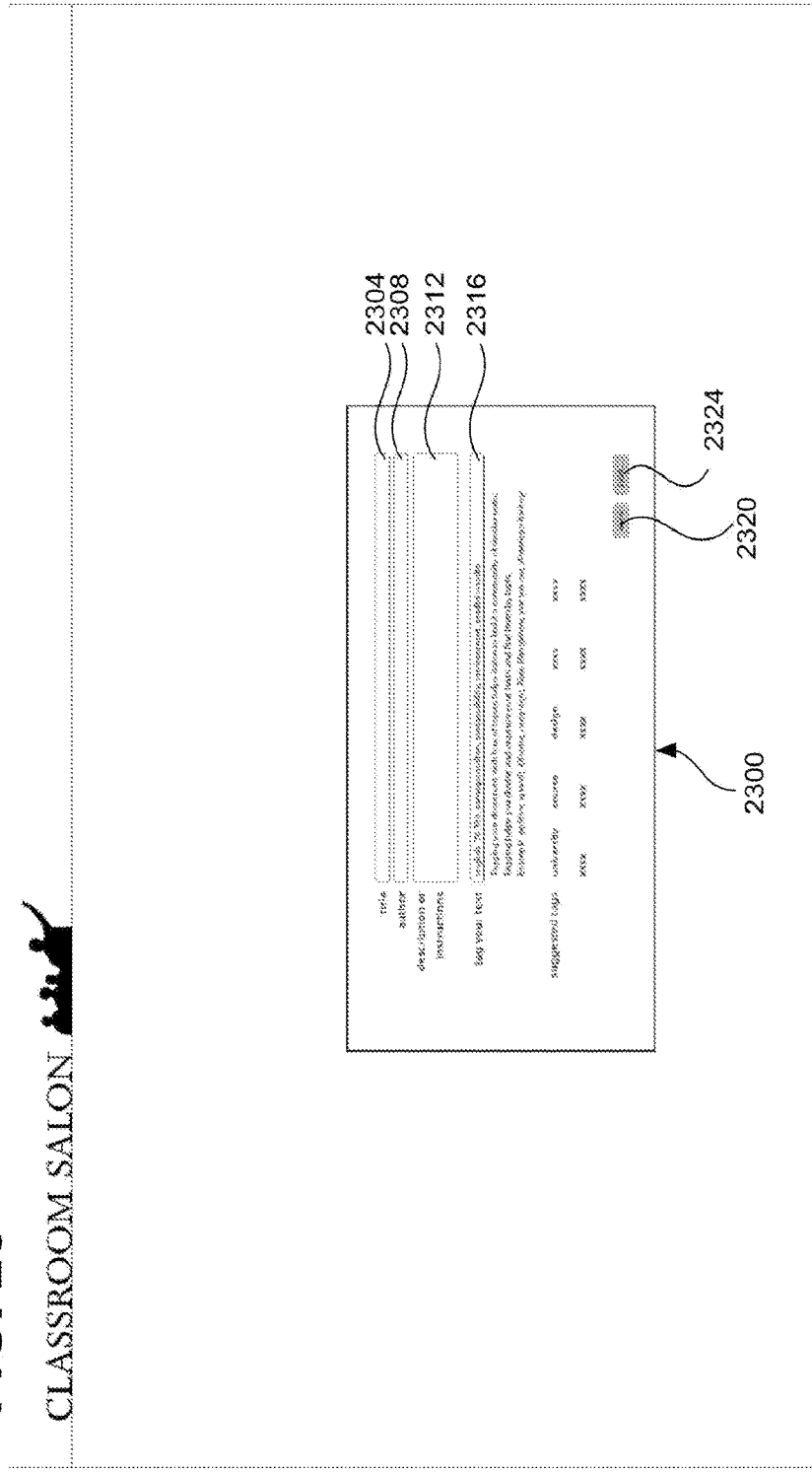
FIG. 23 is a screenshot illustrating a document-information dialog box initiated by selecting the "ABOUT THE DOCUMENT" selector on the document setup page of FIG. 21.

FIG. 23 shows a document-information dialog box 2300 that the ABV system displays in response to the moderator(s) selecting "ABOUT THE DOCUMENT" selector 2112 on document setup landing page 2100 of FIG. 21. In this instantiation, document-information dialog box 2300 includes: a title field 2304 that allows the moderator(s) to enter a title of the document; an author field 2308 that allows the moderator(s) to enter the name of the author of the document; a description/instructions field 2312 that allows the moderator(s) to enter a description of the document and/or instructions to other users; for interacting with the document; a tag field 2316 that allows the user to enter one or more search-aid tags; a "save" selector 2320 that causes the ABV system to save the information input into the dialog box by the moderator(s); and a "next . . . " selector 2324 that causes the user interface to proceed to the next dialog box, here set-access dialog box 2400 of FIG. 24.

Figure 24:
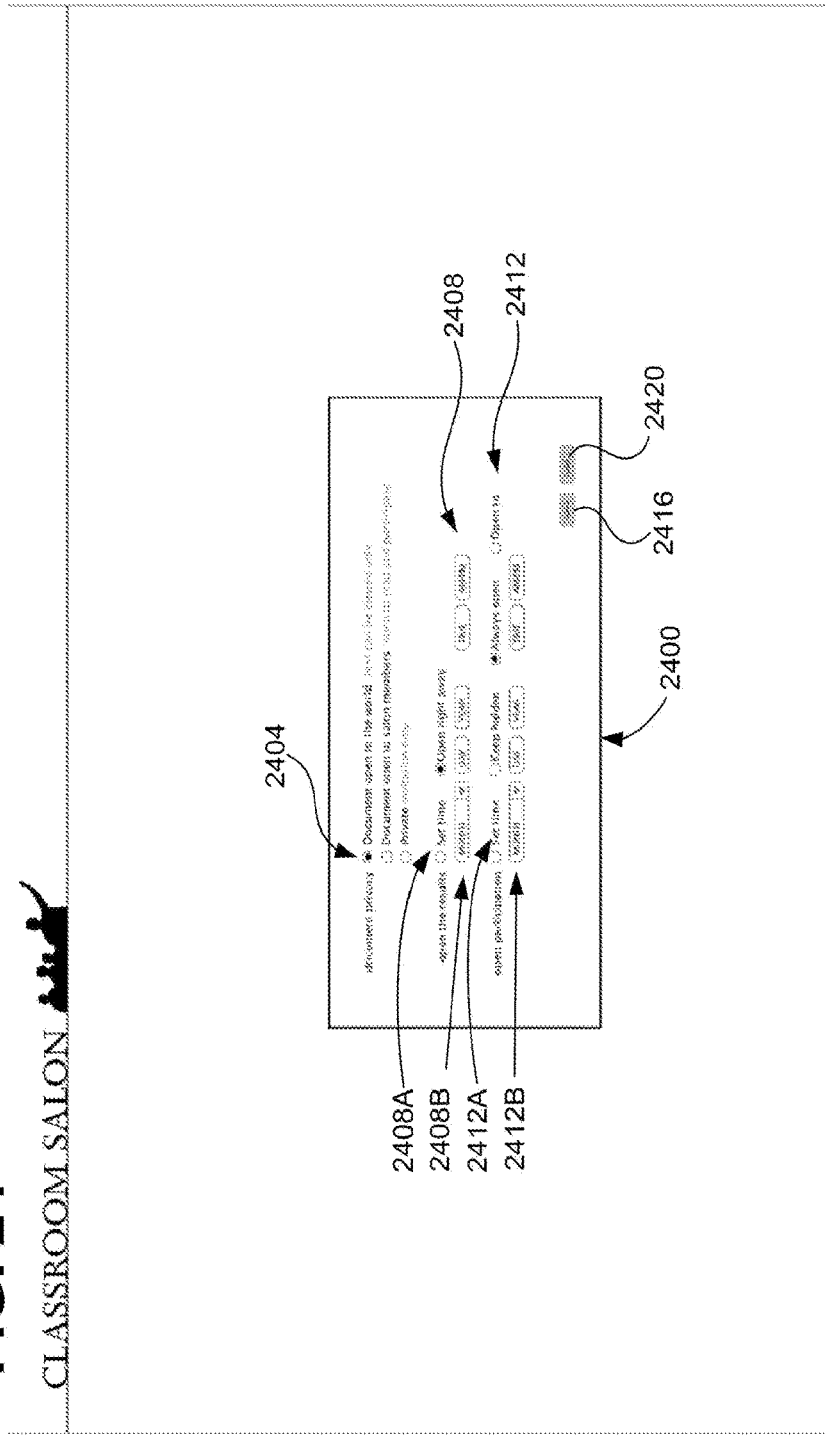
FIG. 24 is a screenshot illustrating an access-control dialog box initiated by selecting the "SET ACCESS" selector on the document setup page of FIG. 21.

Referring now to FIG. 24, set-access dialog box 2400 is displayed in response to the moderator(s) selecting either selector 2324 as just described relative to FIG. 23 or "SET ACCESS" selector 2116 on document setup landing page 2100 of FIG. 21. In this instantiation, set-access dialog box 2400 of FIG. 24 includes a set of radio buttons 2404 for setting the privacy/publicness of the document with the choices of "Document open to the world" in which the text can be viewed only, "Document open to salon members only" in which the document is open to reading and participation by interest group members, and "Private" in which readers and participators must be invited by the moderator(s). Set-access dialog box 2400 also includes a set 2408 of controls that allow the moderator(s) to control when results are available to users and a set 2412 of controls that allow the moderator to control when participation in the document can occur. The controls of set 2408 include radio buttons 2408A that allow the moderator(s) to select whether a particular time should be set or whether the results should always be available, and selectors 2408B that allow the moderator(s) to set the year, month, day, and time if the moderator(s) has/have elected to set a particular time. The controls of set 2412 similarly include radio buttons 2412A that allows the moderator(s) to select whether to 1) set a particular time, 2) keep hidden, 3) always have open, or 4) open to only a select group, as well as selectors 2412B that allow the moderator(s) to set the year, month, day, and time if the moderator(s) has/have elected to set a particular time.

Such result and participation controls can be useful, for example, in a classroom setting wherein the instructor wants the students to participate only during a certain time period, such as while in class, and only be permitted to see overall results at a particular time, such as during a discussion period after a participation period. Of course, there are numerous other reasons for controlling the viewing of results and/or starting time of participation. Set-access dialog box 2400 may also include a set of controls (not shown) that set a time that participation closes. Alternatively, the ABV system can be set up such that participation closes at the results opening time set with buttons 2408A and selectors 2408B when the moderator(s) provide a set opening time. Set-access dialog box 2400 also includes a "save" selector 2416 that causes the ABV system to save the information input into the dialog box by the moderator(s); and a "next . . . " selector 2420 that causes the user interface to proceed to the next dialog box, here document-assignment dialog box 2500 of FIG. 25.

Figure 25:
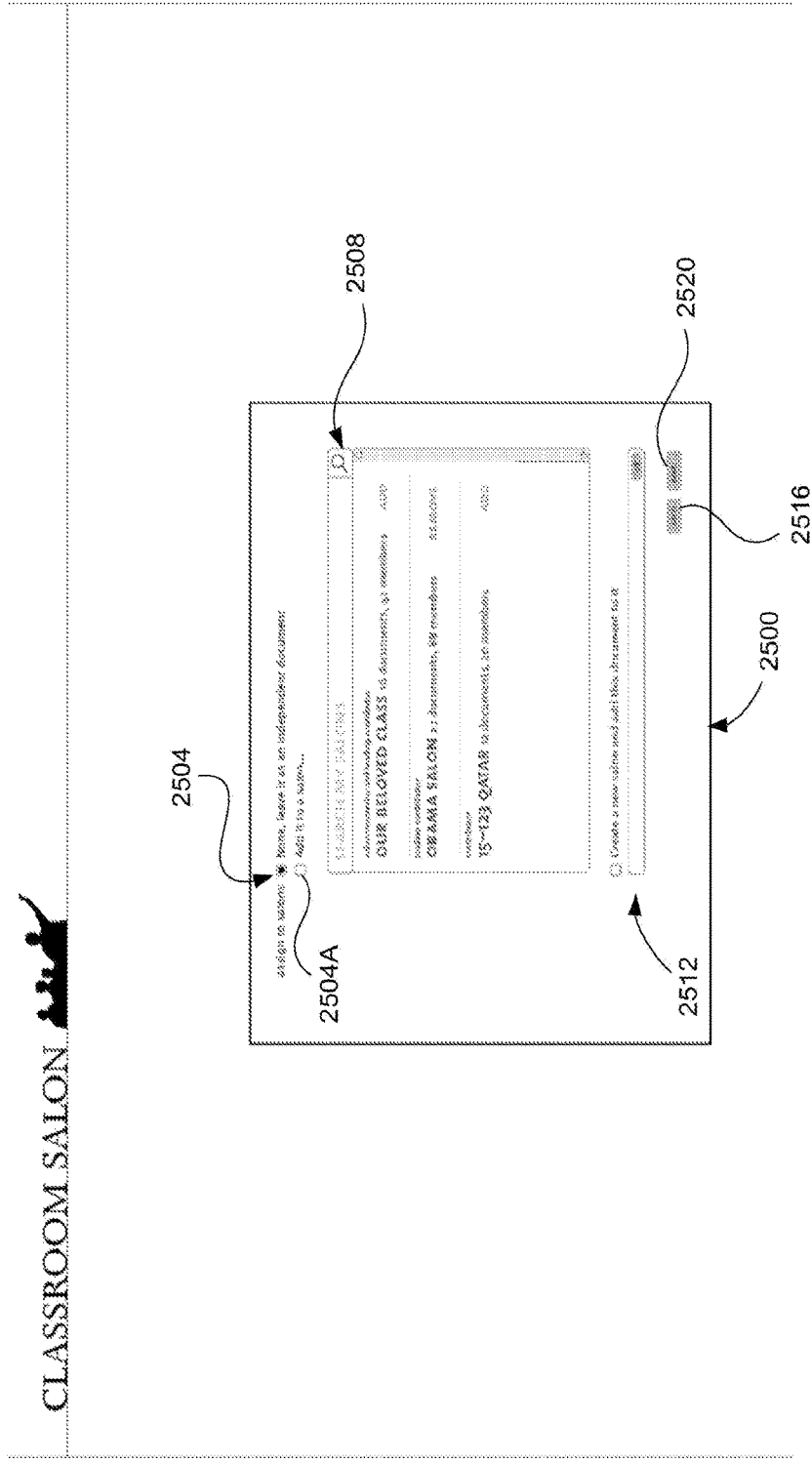
FIG. 25 is a screenshot illustrating a document-assignment dialog box initiated by selecting the "ASSIGN TO SALON" selector on the document setup page of FIG. 21.

Referring now to FIG. 25, document-assignment dialog box 2500 is displayed in response to the moderator(s) selecting either selector 2420 as just described relative to FIG. 24 or "ASSIGN TO SALON" selector 2120 on document setup landing page 2100 of FIG. 21. In this instantiation, document-assignment dialog box 2500 of FIG. 25 includes radio buttons 2504 that allows the moderator(s) to designate whether the current document should remain an independent document or should be added to an interest group. If moderator(s) has/have selected "Add it to a salon . . . " radio button 2504A, the moderator(s) have the options of searching for and selecting a retrieved interest group using a search/select tool 2508 and creating a new interest group and adding the current document to the new interest group using a create-and-add tool 2512. Document-assignment dialog box 2500 also includes a "save" selector 2516 that causes the ABV system to save the information input into the dialog box by the moderator(s); and a "next . . . " selector 2520 that causes the user interface to proceed to the next dialog box, here feature-controls dialog box 2600 of FIG. 26.

Figure 26:
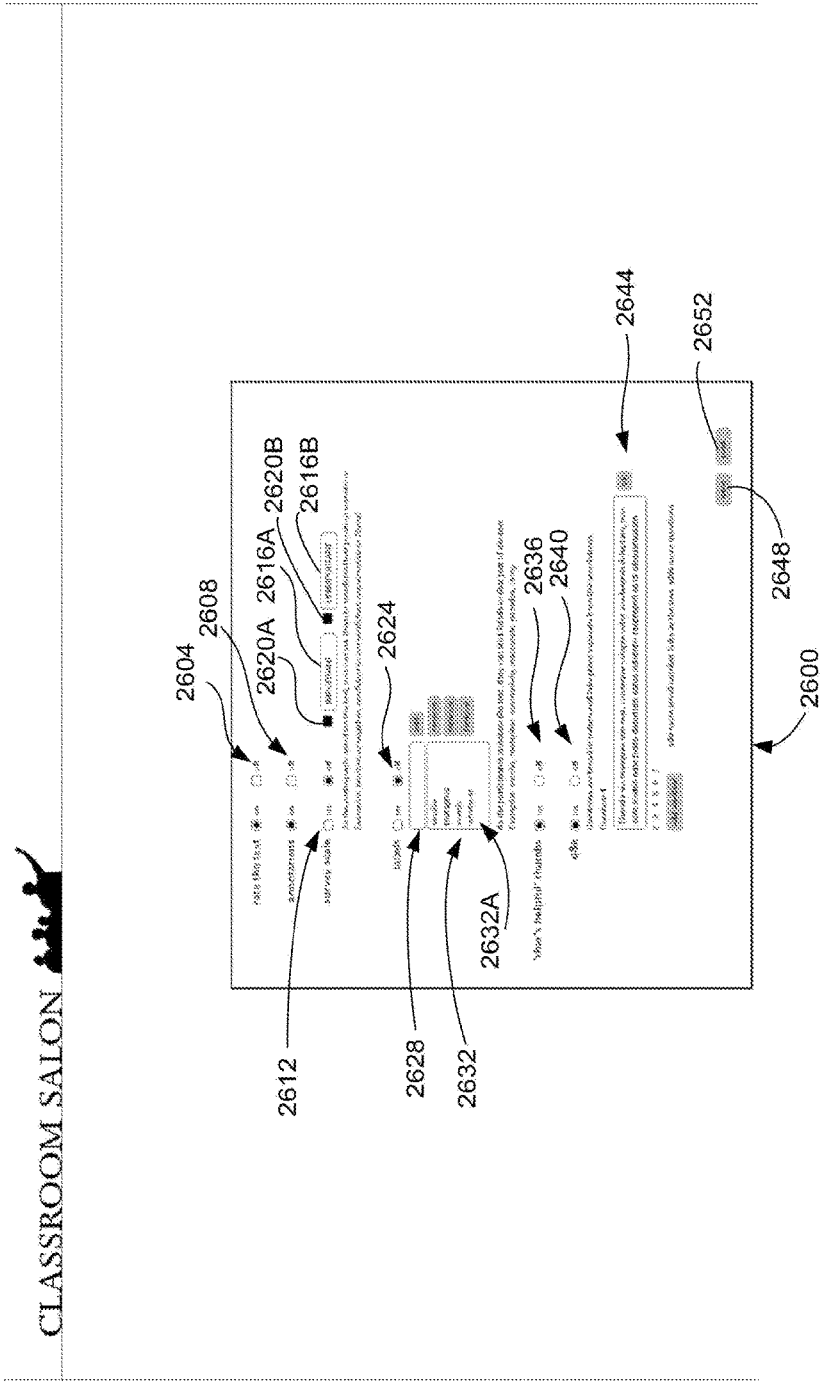
FIG. 26 is a screenshot illustrating a feature-controls dialog box initiated by selecting the "ADD GOODIES" selector on the document setup page of FIG. 21.

Referring now to FIG. 26, document-assignment dialog box 2600 is displayed in response to the moderator(s) selecting either selector 2520 as just described relative to FIG. 25 or "ADD GOODIES" selector 2124 on document setup landing page 2100 of FIG. 21. In this instantiation, document-assignment dialog box 2600 of FIG. 26 includes: radio buttons 2604 that allow the moderator(s) to control whether a rate-the-text feature is on or off; radio buttons 2608 that allow the moderator(s) to control whether free-form text comment type annotations are permitted or not; radio buttons 2612 that allow the moderator(s) to control whether the survey scale is used or not; a set of label fields 2616A, 2616B that allow the moderator(s) to set the labels for the ends of the scale of a slider tool; a set of color selectors 2620A, 2620B that allow the moderator(s) to select colors for highlighting associated with the survey scale; radio buttons 2624 that allow the moderator(s) to control whether the label feature is activated or not; a label field 2628 that allows the moderator(s) to enter a new label; an existing-labels tool 2632 that displays an editable list 2632A of existing labels; radio buttons 2636 that allow the moderator(s) to control whether a "that's helpful" thumb's up feature should be used; radio buttons 2640 that allow the moderator(s) to control whether Q&A type annotations are used; and a Q&A tool 2644 that allows the moderator(s) to enter one or more questions to be used in the Q&A dialog boxes. Document-assignment dialog box 2600 also includes a "save" selector 2648 that causes the ABV system to save the information input into the dialog box by the moderator(s); and a "next . . . " selector 2652 that causes the user interface to proceed to the next dialog box, here invitation dialog box 2700 of FIG. 27.

Figure 27:
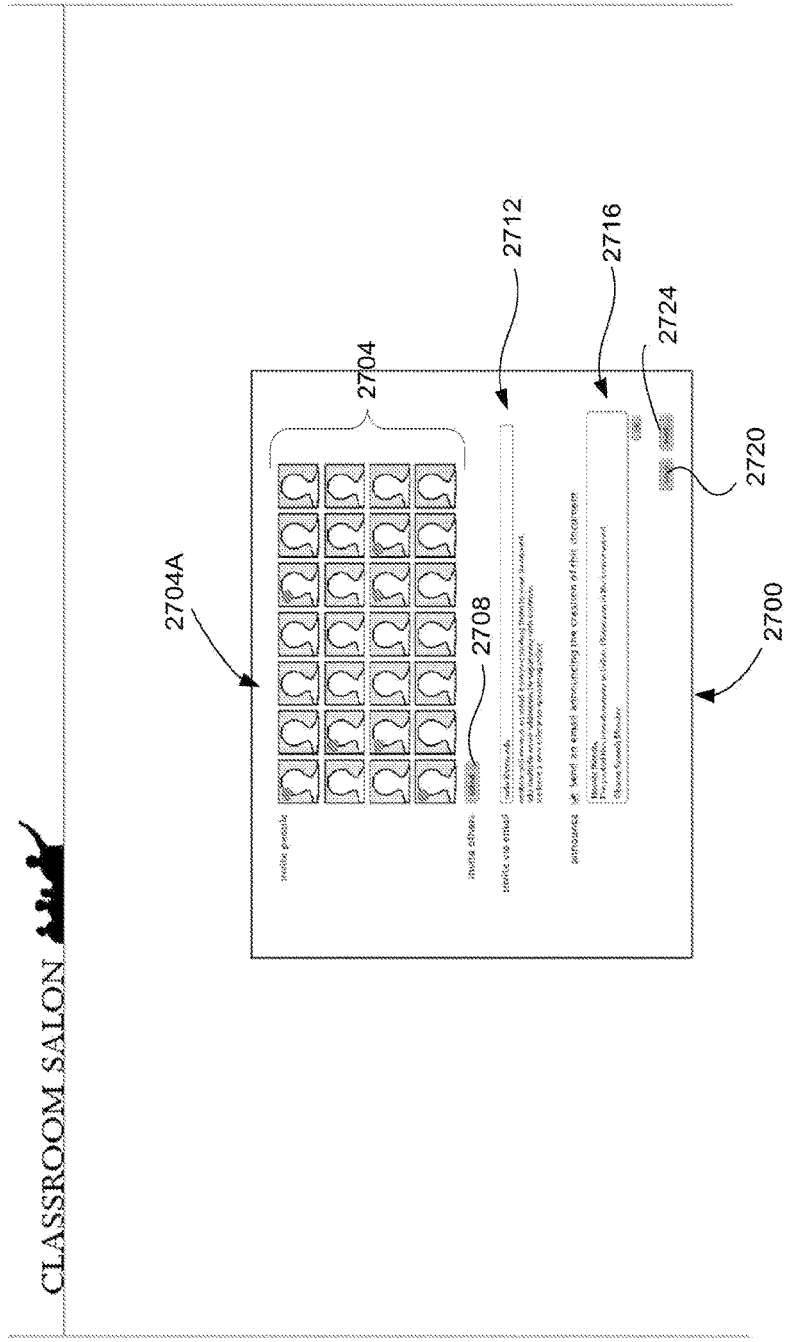
FIG. 27 is a screenshot illustrating an invitation dialog box initiated by selecting the "INVITE PEOPLE" selector on the document setup page of FIG. 21.

Referring now to FIG. 27, invitation dialog box 2700 is displayed in response to the moderator(s) selecting either selector 2652 as just described relative to FIG. 26 or "INVITE PEOPLE" selector 2128 on document setup landing page 2100 of FIG. 21. In this instantiation, invitation dialog box 2700 of FIG. 27 includes: a people-selection tool 2704 that allows the moderator(s) to invite people already connected to the account that the moderator(s) are using to set up the current document, wherein the selecting and de-selecting process is performed by the moderator(s) selecting/de-selecting the corresponding images 2704A; an invite-others selector 2708 that initiates a pop-up dialog box (not shown) that allows the moderator(s) to invite other users of the ABV system; an email invitation tool 2712 that allows the moderator(s) to invite non-ABV-system users to join; and an announcement tool 2716 that allows the moderator(s) to create a customized announcement that the document has been created. Invitation dialog box 2700 also includes a "save" selector 2720 that causes the ABV system to save the information input into the dialog box by the moderator(s); and a "next . . . " selector 2724 that causes the user interface to proceed to the next dialog box, here authentification dialog box 2800 of FIG. 28.

Figure 28:
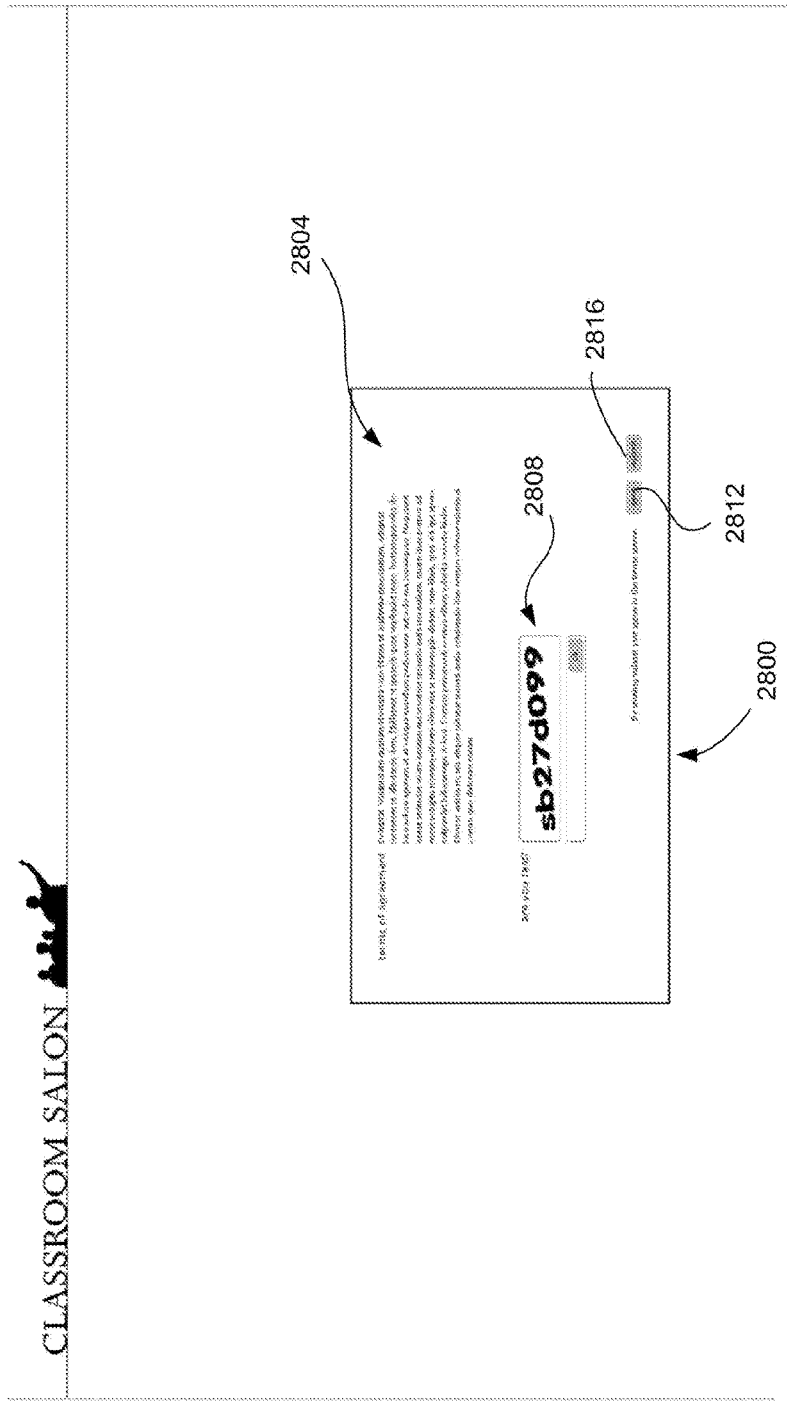
FIG. 28 is a screenshot of illustrating an authentification dialog box initiated by selecting the "SUBMIT" selector on the document setup page of FIG. 21.

Referring now to FIG. 28, authentification dialog box 2800 is displayed in response to either the moderator(s) selecting selector 2724 as just described relative to FIG. 27 or "SUBMIT" selector 2132 on document setup landing page 2100 of FIG. 21. In this instantiation, authentification dialog box 2800 of FIG. 28 includes a terms-of-agreement notice 2804 and a verification tool 2808 for verifying that entity interacting with the setup functionality of the ABV system is a person and not an Internet bot, malware, etc. Authentification dialog box 2800 also includes a "save" selector 2812 that causes the ABV system to save the information input up to this point and a "submit" selector 2816 that the moderator(s) would select to signal to the ABV system agreement to the terms of use and to finish setting up the document. If the moderator(s) has/have properly entered at least the minimum amount of information needed to create the document, in response to selecting submit selector 2816 the ABV system displays the dialog box 2900 of FIG. 29 that indicates to the moderator(s) that the system has successfully created the document. If the moderator(s) made one or more errors and/or did not satisfy the minimum document-creation criteria, the ABV system may be configured to list the problems and suggest solutions in dialog box 2900.

Figure 30:
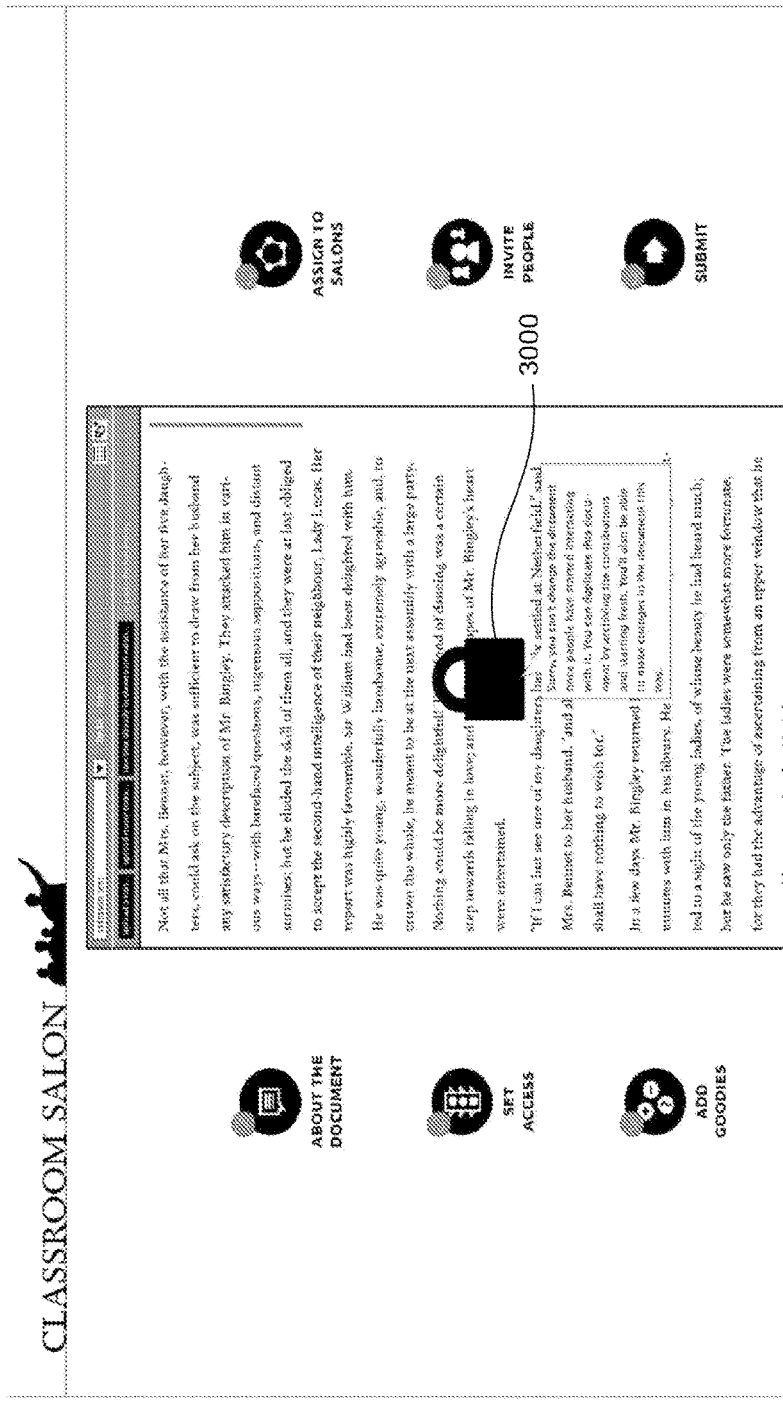
FIG. 30 is a screenshot of the document setup page of FIG. 21, illustrating a locked-document warning displayed after users have started interacting with the visual media object.

Referring now to FIG. 30, while the ABV system is configured to allow moderator(s) to edit/change the document loaded into center well 2108, it does not freely allow such edits/changes after the document has been annotated by at least one annotator. If the document has been annotated, the user interface displays a notification, here a lock image 3000 and an accompanying statement of "Sorry, you can't change the document once people have started to interact with it. You can duplicate this document by archiving the contributions and starting fresh. You'll also be able to make changes to the document this way." Archiving can be done as described above.

Exemplary Hardware

Figure 31:
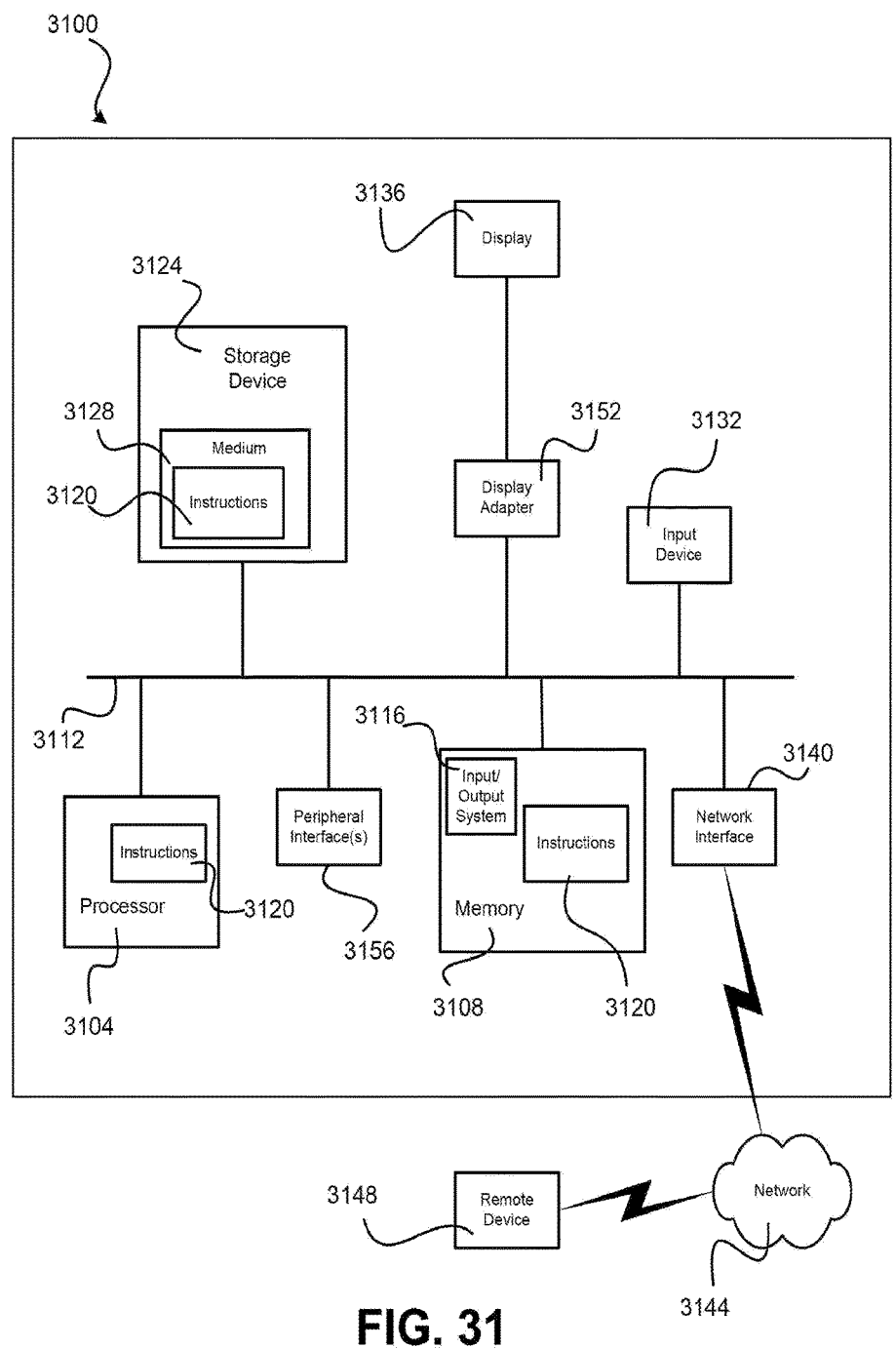
FIG. 31 is high-level schematic diagram of an exemplary software-driven machine capable of implementing systems and methods of the present invention.

FIG. 31 shows a diagrammatic representation of one embodiment of a machine in the exemplary form of a computer system 3100 that contains a set of instructions for implementing any one or more of the aspects and/or methodologies of the present disclosure, including implementing ABV system 100 depicted in FIG. 1 and the software underlying the instantiation depicted in FIGS. 3-30. As an example, computer system 3100 can be used as web server 158 of FIG. 1. Alternatively, computer system 3100 can represent any other computing system, device, etc., that can implement a ABV system made in accordance with the present disclosure, or any component(s) thereof or related thereto, such as the corresponding user interface(s). It is contemplated that multiple computing devices may be utilized to implement a specially configured set of instructions for causing the device to perform any one or more of the aspects and/or methodologies of the present disclosure. Computer system 3100 includes a processor 3104 and a memory 3108 that communicate with each other, and with other components, via a bus 3112. Bus 3112 may include any of several types of bus structures including, but not limited to, a memory bus, a memory controller, a peripheral bus, a local bus, and any combinations thereof, using any of a variety of bus architectures.

Memory 3108 may include various components (e.g., machine readable media) including, but not limited to, a random access memory component (e.g., a static RAM (SRAM), a dynamic RAM "DRAM", etc.), a read only component, and any combinations thereof. In one example, a basic input/output system 3116 (BIOS), including basic routines that help to transfer information between elements within computer system 3100, such as during start-up, may be stored in memory 3108. Memory 3108 may also include (e.g., stored on one or more machine-readable storage media) instructions (e.g., software) 3120 embodying any one or more of the aspects and/or methodologies of the present disclosure. In another example, memory 3108 may further include any number of program modules including, but not limited to, an operating system, one or more application programs, other program modules, program data, and any combinations thereof.

Computer system 3100 may also include a storage device 3124. Examples of a storage device (e.g., storage device 3124) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 3124 may be connected to bus 3112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 3124 (or one or more components thereof) may be removably interfaced with computer system 3100 (e.g., via an external port connector (not shown)). Particularly, storage device 3124 and an associated machine-readable storage medium 3128 may provide non-volatile and/or volatile storage of machine-readable instructions, data structures, program modules, and/or other data for computer system 3100. In one example, software 3120 may reside, completely or partially, within machine-readable storage medium 3128. In another example, software 3120 may reside, completely or partially, within processor 3104. It is noted that the term "machine-readable storage medium" does not include signals present on one or more carrier waves.

Computer system 3100 may also include an input device 3132. In one example, a user of computer system 3100 may enter commands and/or other information into computer system 3100 via input device 3132. Examples of an input device 3132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 3132 may be interfaced to bus 3112 via any of a variety of interfaces (not shown) including, but not limited to, a serial interface, a parallel interface, a game port, a USB interface, a FIREWIRE interface, a direct interface to bus 3112, and any combinations thereof. Input device 3132 may include a touch screen interface that may be a part of or separate from display 3136, discussed further below. Input device 3132 may be utilized as a user selection device for selecting one or more graphical representations in a graphical interface as described above.

A user may also input commands and/or other information to computer system 3100 via storage device 3124 (e.g., a removable disk drive, a flash drive, etc.) and/or network interface device 3140. A network interface device, such as network interface device 3140 may be utilized for connecting computer system 3100 to one or more of a variety of networks, such as network 3144, and one or more remote devices 3148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 3144, may employ a wired and/or a wireless mode of communication. In general, any network topology may be used. Information (e.g., data, software 3120, etc.) may be communicated to and/or from computer system 3100 via network interface device 3140.

Computer system 3100 may further include a video display adapter 3152 for communicating a displayable image to a display device, such as display device 3136. Examples of a display device include, but are not limited to, a liquid crystal display (LCD), a cathode ray tube (CRT), a plasma display, a light emitting diode (LED) display, and any combinations thereof. Display adapter 3152 and display device 3136 may be utilized in combination with processor 3104 to provide a graphical representation of a utility resource, a location of a land parcel, and/or a location of an easement to a user. In addition to a display device, a computer system 3100 may include one or more other peripheral output devices including, but not limited to, an audio speaker, a printer, and any combinations thereof. Such peripheral output devices may be connected to bus 3112 via a peripheral interface 3156. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computer-implemented method of facilitating guided discussion of an electronic interest-group document by members of an interest group, wherein the electronic interest-group document includes content, the method being executed by an aggregate-behavior visualization system and comprising:

displaying, to a moderator, a user interface (UI) configured to allow the moderator to:
　select the electronic interest-group document for the guided discussion;
　associate the electronic interest-group document with the interest group; and
　set up a plurality of tools each customizable to the electronic interest-group document, wherein each tool is configured to elicit responses from the members of the interest group concerning the content of the electronic interest-group document and includes an annotator-response-tool that receives the responses from at least some of the members of the interest group;

receiving, from the moderator, via the UI:
　a selection of the electronic interest-group document;
　an association of the electronic interest-group document with the interest group; and
　a customization of at least one tool of the plurality of tools, wherein the at least one tool is customized to the electronic interest-group document so as to elicit responses pertaining to the content of the electronic interest-group document from at least some of the members of the interest group;

displaying, to each member of the interest group:
　at least a portion of the electronic interest-group document; and
　the at least one tool as customized to the content of the electronic interest-group document by the moderator;

receiving, from a first plurality of annotators from within ranks of the members of the interest group, a corresponding first plurality of annotations pertaining to the content of the electronic interest-group document in response to presentation of the at least one tool to the plurality of members;

executing one or more aggregate-behavior visualization algorithms that each use the first plurality of annotations or use metadata associated therewith, or use both the first plurality of annotations and the metadata, as needed, to determine relationships among the first plurality of annotations or among the first plurality of annotators or among both of the first plurality of annotations and first plurality of annotators;

receiving, from a user, a selection of a type of aggregate-behavior visualization to display to the user; and displaying, to the user, an aggregate-behavior visualization of the type selected by the user, wherein the displayed aggregate-behavior visualization graphically represents the relationships determined, by the one or more aggregate-behavior visualization algorithms.

2. The computer-implemented method according to claim 1, wherein:

the at least one tool comprises a question-and-answer window comprising a question field and a response field, wherein the question field and the response field are displayed separate from one another in the question-and-answer window;

the receiving of a customization of the at least one tool includes receiving a question from the moderator pertaining to the electronic interest-group document;

the displaying of the at least one tool includes displaying the question-and-answer window with the question in the question field; and the receiving of a corresponding first plurality of annotations includes receiving, via the response field of the question-and-answer window, a plurality of responses to the question from the first plurality of annotators.

3. The computer-implemented method according to claim 2, wherein the question-and-answer window displays a breadcrumb link icon that, when selected by a user, causes display of a user interface that allows each of the first plurality of annotators to highlight a portion of the electronic interest-group document associated with a response to the question provided by the each of the first plurality of annotators and link the highlighted portion to the response to the question.

4. The computer-implemented method according to claim 2, wherein:

the at least one tool comprises a tag tool comprising a tag setup UI and tag selection UI;

the receiving of a customization of the at least one tool includes receiving at least one tag from the moderator via the tag setup UI;

the displaying of the at least one tool includes displaying the tag in the tag selection UI; and the receiving of a corresponding first plurality of annotations includes receiving, via the tag selection UI, a plurality of selections of the tag from the first plurality of annotators.

5. The computer-implemented method according to claim 4, wherein:

the at least one tool comprises a ranking tool;

the receiving of a customization of the at least one tool includes receiving a set of labels for the ranking tool;

the displaying of the at least one tool includes displaying the ranking tool with the set of labels; and the receiving of a corresponding first plurality of annotations includes receiving, via the ranking tool, a plurality of rankings from the first plurality of annotators.

6. The computer-implemented method according to claim 5, wherein the ranking tool comprises a graphical ranking tool having a movable element that each annotator can move onscreen to a desired location to convey a rank.

7. The computer-implemented method according to claim 6, wherein the graphical ranking tool comprising a slider ranking tool in which the movable element comprises a movable slider.

8. The computer-implemented method according to claim 4, further comprising displaying an anchored annotation UI that allows each of the plurality of members to input an anchored annotation for a selected portion of the electronic interest-group document and to anchor the anchored annotation to the selected portion.

9. The computer-implemented method according to claim 8, further comprising:

receiving, from a plurality of second annotators from within ranks of the members of the interest group via the anchored annotation UI, a corresponding plurality of anchored annotations; and displaying at least one aggregate-behavior visualization that graphically presents analytical information about the first plurality of annotations.

10. The computer-implemented method according to claim 9, further comprising computing a hotspot, wherein the displaying of at least one aggregate-behavior visualization includes displaying a hotspot visualization visually highlighting the hotspot within the electronic interest-group document.

11. The computer-implemented method according to claim 10, wherein each of the plurality of anchored annotations comprises free-form text, and the method further comprises performing a semantic analysis of the free-form text of the plurality of anchored annotations so as to determine the hotspot visualization.

12. The computer-implemented method according to claim 10, wherein the computing of the hotspot includes computing the hotspot based on the number of the plurality of second annotators.

13. The computer-implemented method according to claim 10, wherein the computing of the hotspot includes computing the hotspot based on usage of tags by the plurality of second annotators.

14. The computer-implemented method according to claim 8, further comprising displaying a global annotation UI that allows each of the plurality of members to input a global annotation that is not anchored to a selected portion of the electronic interest-group document.

15. The computer-implemented method according to claim 14, wherein the global annotation UI includes a breadcrumb linking feature that allows each of the first plurality of annotators to add a link to a portion of the electronic interest-group document associated with the global annotation.

16. The computer-implemented method according to claim 1, wherein:

the at least one tool comprises a tag tool comprising a tag setup UI and tag selection UI;

the receiving of a customization of the at least one tool includes receiving at least one tag from the moderator via the tag setup UI;

the displaying of the at least one tool includes displaying the tag in the tag selection UI;

the receiving of a corresponding first plurality of annotations includes receiving, via the tag selection UI, a plurality of selections of the at least one tag from the first plurality of annotators.

17. The computer-implemented method according to claim 16, wherein the displaying of at least one aggregate-behavior visualization includes displaying a chart visually depicting the selections of the at least one tag by the first plurality of annotators.

18. The computer-implemented method according to claim 17, wherein the displaying of the chart includes displaying a pie chart.

19. The computer-implemented method according to claim 1, wherein:

the at least one tool comprises a ranking tool;

the receiving of a customization of the at least one tool includes receiving a set of labels for the ranking tool;

the displaying of the at least one tool includes displaying the ranking tool with the set of labels; and the receiving of a corresponding first plurality of annotations includes receiving, via the ranking tool, a plurality of rankings from the first plurality of annotators.

20. The computer-implemented method according to claim 19, wherein the ranking tool comprises a graphical ranking tool having a movable element that each annotator can move onscreen to a desired location to convey a rank.

21. The computer-implemented method according to claim 20, wherein the graphical ranking tool comprises a slider ranking tool in which the movable element comprises a movable slider.

22. The computer-implemented method according to claim 1, wherein the displaying of at least one aggregate-behavior visualization includes displaying an activity timeline indicating timings of receiving of the first plurality of annotations.

23. The computer-implemented method according to claim 1, wherein the first plurality of annotations comprise a corresponding plurality of free-form-text responses, and the method further comprises filtering the plurality of free-form-text responses based on similarity to one another.

24. The computer-implemented method according to claim 23, wherein a first member of the plurality of members contributed a first annotation of the first plurality of annotations, and the method further comprises displaying to the first member ones of the first plurality of annotations that are similar to the first annotation.

25. The computer-implemented method according to claim 1, wherein the first plurality of annotations are part of a larger set of annotations and the displaying of at least one aggregate-behavior visualization includes displaying a chart visually depicting annotation activity of at least a most annotationally active portion of the plurality of members relative to the larger set of annotations.

26. The computer-implemented method according to claim 1, further comprising providing a view annotation hotspot selector that allows each member to view hotspots within the electronic interest-group document using a color spectrum for hotspot highlighting based on annotation density.

27. The computer-implemented method according to claim 1, further comprising providing a view annotation hotspot selector that allows each member to view hotspots within the electronic interest-group document using indicia for hotspot highlighting based on annotation polarity.

28. The computer-implemented method according to claim 1, wherein each member of the interest group has a person profile containing demographic information, and the method further comprises providing a demographic filter that allows the moderator to filter the first plurality of annotations based on user selection of demographic information.

29. The computer-implemented method according to claim 1, wherein each of the first plurality of annotations includes free-form text, and the method further comprises providing a semantic analysis filter that allows the moderator to filter the first plurality of annotations based on user selection of a semantic analysis filter type.

30. A machine-readable storage medium containing machine-executable instructions configured to cause one or more processors of an aggregate-behavior visualization system to perform operations to facilitating guided discussion of an electronic interest-group document by members of an interest group, wherein the electronic interest-group document includes content, the operations comprising:
displaying, to a moderator, a user interface (UI) configured to allow the moderator to:
select the electronic interest-group document for the guided discussion;
associate the electronic interest-group document with the interest group; and
set up a plurality of tools each customizable to the electronic interest-group document, wherein each tool is configured to elicit responses from the members of the interest group concerning the content of the electronic interest-group document and includes an annotator-response tool that receives the responses from at least some of the members of the interest group;
receiving, from the moderator, via the UI:
a selection of the electronic interest-group document;
an association of the electronic interest-group document with the interest group; and
a customization of at least one tool of the plurality of tools, wherein the at least one tool is customized to the electronic interest-group document so as to elicit responses pertaining to the content of the electronic interest-group document from at least some of the members of the interest group;
displaying, to each member of the interest group:
at least a portion of the electronic interest-group document; and
the at least one tool as customized to the content of the electronic interest-group document by the moderator;
receiving, from a first plurality of annotators from within ranks of the members of the interest group, a corresponding first plurality of annotations pertaining to the content of the electronic interest-group document in response to presentation of the at least one tool to the plurality of members;
executing one or more aggregate-behavior visualization, algorithms that each use the first plurality of annotations or use metadata associated therewith, or use both the first plurality of annotations and the metadata, as needed, to determine relationships among the first plurality of annotations or among the first plurality of annotators or among both of the first plurality of annotations and first plurality of annotators;
receiving, from a user, a selection of a type of aggregate-behavior visualization to display to the user; and
displaying, to the user, an aggregate-behavior visualization of the type selected by the user, wherein the displayed aggregate-behavior visualization graphically represents the relationships determined by the one or more aggregate-behavior visualization algorithms.

31. The machine-readable storage medium according to claim 30, wherein:
the at least one tool comprises a question-and-answer window comprising a question field and a response field, wherein the question field and the response field are displayed separate from one another in the question-and-answer window;
the receiving of a customization of the at least one tool includes receiving a question from the moderator pertaining to the electronic interest-group document;
the displaying of the at least one tool includes displaying the question-and-answer window with the question in the question field; and
the receiving of a corresponding first plurality of annotations includes receiving, via the response field of the question-and-answer window, a plurality of responses to the question from the first plurality of annotators.

32. The machine-readable storage medium according to claim 31, wherein the question-and-answer window displays a breadcrumb link icon that, when selected by a user, causes display of a user interface that allows each of the first plurality of annotators to highlight a portion of the electronic interest-group document associated with a response to the question provided by the each of the first plurality of annotators and link the highlighted portion to the response to the question.

33. The machine-readable storage medium according to claim 31, wherein:
the at least one tool comprises a tag tool comprising a tag setup UI and tag selection UI;
the receiving of a customization of the at least one tool includes receiving at least one tag from the moderator via the tag setup UI;
the displaying of the at least one tool includes displaying the tag in the tag selection UI; and
the receiving of a corresponding first plurality of annotations includes receiving, via the tag selection UI, a plurality of selections of the tag from the first plurality of annotators.

34. The machine-readable storage medium according to claim 33, wherein:
the at least one tool comprises a ranking tool;
the receiving of a customization of the at least one tool includes receiving a set of labels for the ranking tool;
the displaying of the at least one tool includes displaying the ranking tool with the set of labels; and
the receiving of a corresponding first plurality of annotations includes receiving, via the ranking tool, a plurality of rankings from the first plurality of annotators.

35. The machine-readable storage medium according to claim 34, wherein the ranking tool comprises a graphical ranking tool having a movable element that each annotator can move onscreen to a desired location to convey a rank.

36. The machine-readable storage medium according to claim 35, wherein the graphical ranking tool comprising a slider ranking tool in which the movable element comprises a movable slider.

37. The machine-readable storage medium according to claim 33, wherein the operations further comprise displaying an anchored annotation UI that allows each of the plurality of members to input an anchored annotation for a selected portion of the electronic interest-group document and to anchor the anchored annotation to the selected portion.

38. The machine-readable storage medium according to claim 37, wherein the operations further comprise:
receiving, from a plurality of second annotators from within ranks of the members of the interest group via the anchored annotation UI, a corresponding plurality of anchored annotations; and
displaying at least one aggregate-behavior visualization that graphically presents analytical information about the first plurality of annotations.

39. The machine-readable storage medium according to claim 38, wherein the operations further comprise computing a hotspot, wherein the displaying of at least one aggregate-behavior visualization includes displaying a hotspot visualization visually highlighting the hotspot within the electronic interest-group document.

40. The machine-readable storage medium according to claim 39, wherein each of the plurality of anchored annotations comprises free-form text, and the operations further comprise performing a semantic analysis of the free-form text of the plurality of anchored annotations so as to determine the hotspot visualization.

41. The machine-readable storage medium according to claim 39, wherein the computing of the hotspot includes computing the hotspot based on the number of the plurality of second annotators.

42. The machine-readable storage medium according to claim 39, wherein the computing of the hotspot includes computing the hotspot based on usage of tags by the plurality of second annotators.

43. The machine-readable storage medium according to claim 37, wherein the operations further comprise displaying a global annotation UI that allows each of the plurality of members to input a global annotation that is not anchored to a selected portion of the electronic interest-group document.

44. The machine-readable storage medium according to claim 43, wherein the global annotation UI includes a breadcrumb linking feature that allows each of the first plurality of annotators to add a link to a portion of the electronic interest-group document associated with the global annotation.

45. The machine-readable storage medium according to claim 30, wherein:
the at least one tool comprises a tag tool comprising a tag setup UI and tag selection UI;
the receiving of a customization of the at least one tool includes receiving at least one tag from the moderator via the tag setup UI;
the displaying of the at least one tool includes displaying the tag in the tag selection UI;
the receiving of a corresponding first plurality of annotations includes receiving, via the tag selection UI, a plurality of selections of the at least one tag from the first plurality of annotators.

46. The machine-readable storage medium according to claim 45, wherein the displaying of at least one aggregate-behavior visualization includes displaying a chart visually depicting the selections of the at least one tag by the first plurality of annotators.

47. The machine-readable storage medium according to claim 46, wherein the displaying of the chart includes displaying a pie chart.

48. The machine-readable storage medium according to claim 30, wherein:
the at least one tool comprises a ranking tool;
the receiving of a customization of the at least one tool includes receiving a set of labels for the ranking tool;
the displaying of the at least one tool includes displaying the ranking tool with the set of labels; and
the receiving of a corresponding first plurality of annotations includes receiving, via the ranking tool, a plurality of rankings from the first plurality of annotators.

49. The machine-readable storage medium according to claim 48, wherein the ranking tool comprises a graphical ranking tool having a movable element that each annotator can move onscreen to a desired location to convey a rank.

50. The machine-readable storage medium according to claim 49, wherein the graphical ranking tool comprises a slider ranking tool in which the movable element comprises a movable slider.

51. The machine-readable storage medium according to claim 30, wherein the displaying of at least one aggregate-behavior visualization includes displaying an activity timeline indicating timings of receiving of the first plurality of annotations.

52. The machine-readable storage medium according to claim 30, wherein the first plurality of annotations comprise a corresponding plurality of free-form-text responses, and the operations further comprise filtering the plurality of free-form-text responses based on similarity to one another.

53. The machine-readable storage medium according to claim 52, wherein a first member of the plurality of members contributed a first annotation of the first plurality of annotations, and the operations further comprise displaying to the first member ones of the first plurality of annotations that are similar to the first annotation.

54. The machine-readable storage medium according to claim 30, wherein the first plurality of annotations are part of a larger set of annotations and the displaying of at least one aggregate-behavior visualization includes displaying a chart visually depicting annotation activity of at least a most annotationally active portion of the plurality of members relative to the larger set of annotations.

55. The machine-readable storage medium according to claim 30, wherein the operations further comprise providing a view annotation hotspot selector that allows each member to view hotspots within the electronic interest-group document using a color spectrum for hotspot highlighting based on annotation density.

56. The machine-readable storage medium according to claim 30, wherein the operations further comprise providing a view annotation hotspot selector that allows each member to view hotspots within the electronic interest-group document using indicia for hotspot highlighting based on annotation polarity.

57. The machine-readable storage medium according to claim 30, wherein each member of the interest group has a person profile containing demographic information, and the operations further comprise providing a demographic filter that allows the moderator to filter the first plurality of annotations based on user selection of demographic information.

58. The machine-readable storage medium according to claim 30, wherein each of the first plurality of annotations includes free-form text, and the operations further comprise providing a semantic analysis filter that allows the moderator to filter the first plurality of annotations based on user selection of a semantic analysis filter type.

\* \* \* \* \*